United States Patent
Bitto et al.

(10) Patent No.: US 8,863,589 B2
(45) Date of Patent: Oct. 21, 2014

(54) MEASURING TRANSDUCER OF VIBRATION TYPE AND MEASURING SYSTEM

(75) Inventors: Ennio Bitto, Aesch (CH); Peter Tschabold, Breitenbach (CH); Dieter Mundschin, Liestal (CH); Christian Schutze, Basel (CH); Martin Anklin, Dornach (CH)

(73) Assignee: Endress + Hauser Flowtec AG, Reinach (CH)

( * ) Notice: Subject to any disclaimer, the term of this patent is extended or adjusted under 35 U.S.C. 154(b) by 350 days.

(21) Appl. No.: 13/462,226

(22) Filed: May 2, 2012

(65) Prior Publication Data

US 2012/0279317 A1    Nov. 8, 2012

Related U.S. Application Data

(60) Provisional application No. 61/481,301, filed on May 2, 2011.

(30) Foreign Application Priority Data

May 2, 2011 (DE) .......................... 10 2011 075 084

(51) Int. Cl.
G01F 1/84 (2006.01)
G01F 15/00 (2006.01)
G01F 15/14 (2006.01)

(52) U.S. Cl.
CPC ............ *G01F 1/8477* (2013.01); *G01F 1/8409* (2013.01); *G01F 15/006* (2013.01); *G01F 15/14* (2013.01); *G01F 1/8418* (2013.01); *G01F 1/8413* (2013.01); *G01F 1/8422* (2013.01)
USPC .................................................. 73/861.355

(58) Field of Classification Search
USPC ............................................ 73/861.355, 861
See application file for complete search history.

(56) References Cited

U.S. PATENT DOCUMENTS

| 4,879,910 A | 11/1989 | Lew |
| 5,048,349 A | 9/1991 | Wolff |
| 5,090,253 A | 2/1992 | Kolpak |

FOREIGN PATENT DOCUMENTS

| DE | 102009027580 A1 | 1/2011 |
| EP | 0119638 A1 | 9/1984 |

OTHER PUBLICATIONS

Eng Trans of IPR, Nov. 14, 2013, WIPO, Geneva.
Intl Srch Rpt, Nov. 22, 2013, The Netherlands.

*Primary Examiner* — Lisa Caputo
*Assistant Examiner* — Jamel Williams
(74) *Attorney, Agent, or Firm* — Bacon & Thomas, PLLC

(57) ABSTRACT

A measuring transducer comprises a transducer housing, of which an inlet-side housing end is formed by means of an inlet-side flow divider having eight, mutually spaced flow openings and an outlet-side housing end is formed by means of an outlet-side flow divider having eight, mutually spaced flow openings as well as a tube arrangement with eight bent measuring tubes for the conveying flowing medium, which, forming flow paths connected for parallel flow, are connected to the flow dividers, wherein each of the eight measuring tubes in each case opens with an inlet-side measuring tube end into one of the flow openings of the flow divider, and in each case opens with an outlet-side measuring tube end into one of the flow openings of the flow divider. An electromechanical exciter mechanism of the measuring transducer serves for producing and/or maintaining mechanical oscillations of the measuring tubes.

38 Claims, 14 Drawing Sheets

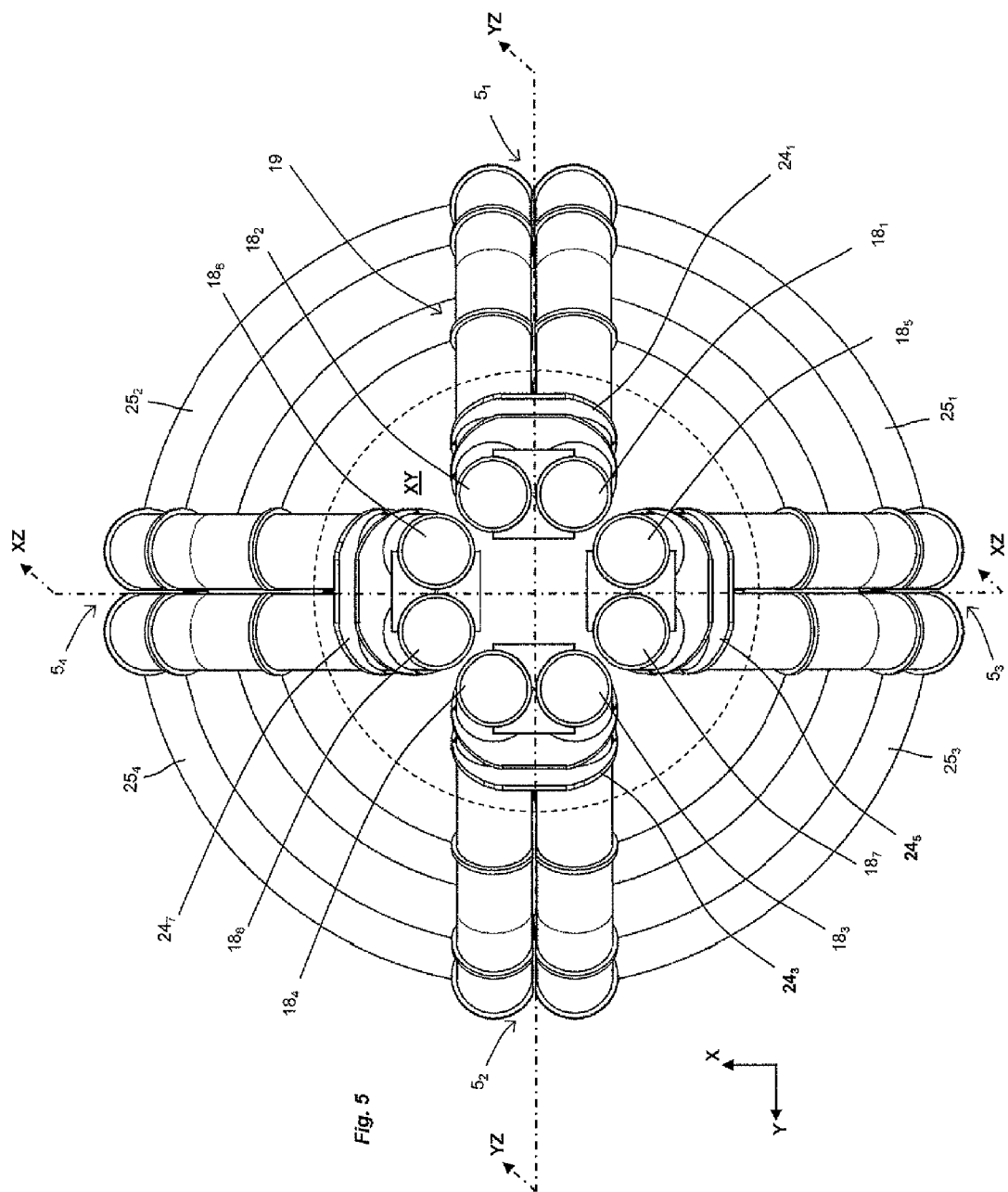

MEASURING TRANSDUCER OF VIBRATION TYPE AND MEASURING SYSTEM

CROSS-REFERENCE TO RELATED APPLICATION

This application is a Nonprovisional which claims the benefit of Provisional Application 61/481,301 filed on May 2, 2011.

FIELD OF THE INVENTION

The invention relates to a measuring transducer of vibration type for measuring a flowable medium conveyed in a pipeline, especially a medium in the form of a gas, a liquid, a powder or other flowable material, especially for measuring a density and/or a mass flow rate, especially also a total mass flow totaled over a time interval, of a medium flowing in a pipeline at least at times with a mass flow rate of more than 1000 t/h, especially more than 1500 t/h. Additionally, the invention relates to a measuring system with such a measuring transducer, for instance, one embodied as an in-line measuring device.

BACKGROUND OF THE INVENTION

In process measurements and automation technology, for measuring physical parameters—e.g. mass flow, density and/or viscosity—of media flowing in pipelines—for instance, a medium in the form of an aqueous liquid, a gas, a liquid-gas mixture, a vapor, an oil, a paste, a slurry or other flowable material—such in-line measuring devices are often used, which, by means of a measuring transducer of vibration type flowed through by the medium and a measuring and operating circuit connected thereto, effect reaction forces in the medium, e.g. Coriolis forces corresponding to the mass flow, inertial forces corresponding to the density of the medium and/or frictional forces corresponding to the viscosity of the medium, etc., and derived from these, produce a measurement signal representing the respective mass flow, the respective viscosity and/or the respective density of the medium. Such measuring transducers, which are especially embodied as Coriolis mass flow meters or Coriolis mass flow/densimeters, are described at length and in detail in, for example, EP-A 1 001 254, EP-A 553 939, US-A 2002/0157479, US-A 2006/0150750, U.S. Pat. Nos. 5,370,002, 5,796,011, 6,308,580, 6,415,668, 6,711,958, 6,920,798, 7,134,347, 7,392,709, or WO-A 03/027616.

Each of the measuring transducers includes a transducer housing, of which an inlet-side, first housing end is at least partially formed by means of a first flow divider having exactly two circularly cylindrical or conical flow openings mutually spaced apart from one another, and an outlet-side, second housing end at least partially formed by means of a second flow divider having exactly two flow openings mutually spaced apart from one another. In the case of some of the measuring transducers shown in U.S. Pat. Nos. 5,796,011, 7,350,421, or US-A 2007/0151368, the transducer housing comprises a rather thick-walled, circularly cylindrical tube segment, which forms at least a middle segment of the transducer housing.

For conveying medium flowing at least at times, and, in given cases, also extremely hot, the measuring transducers furthermore comprise, in each case, exactly two, bent, measuring tubes, which are connected for parallel flow, which are made of metal, especially steel or titanium, and which are placed within the transducer housing and held oscillatably therein by means of the aforementioned flow dividers. A first of the measuring tubes (which are most often equally constructed and extend parallel to one another) opens with an inlet-side, first measuring tube end into a first flow opening of the inlet-side, first flow divider, and opens with an outlet-side, second measuring tube end into a first flow opening of the outlet-side, second flow divider, and a second of the measuring tubes opens with an inlet-side, first measuring tube end into a second flow opening of the first flow divider, and opens with an outlet-side, second measuring tube end into a second flow opening of the second flow divider. Each of the flow dividers includes, additionally, flanges with sealing surfaces for fluid-tight connecting of the measuring transducer to tube segments of the pipeline serving, respectively, for supplying medium to and for removing medium from the measuring transducer.

For producing the above-mentioned reaction forces, the measuring tubes are caused to vibrate during operation, driven by an exciter mechanism serving for producing or maintaining mechanical oscillations, especially bending oscillations, of the measuring tubes in the so-called driven or wanted mode. The oscillations in the wanted mode are most often, especially in the case of application of the measuring transducer as a Coriolis mass flow meter and/or densimeter, at least partially embodied as lateral bending oscillations, and in the case of medium flowing through the measuring tubes, as a result of Coriolis forces induced therein, are superimposed upon by additional, equal-frequency oscillations in the so-called Coriolis mode. Accordingly, the—here most often electro-dynamic—exciter mechanism is embodied in such a manner that, therewith, the two measuring tubes are differentially excitable—thus via entry of exciter forces acting simultaneously along a shared line of action, but in opposed directions—in the wanted mode at least partially, especially also predominantly, to opposite-equal bending oscillations.

For registering vibrations (especially bending oscillations excited by means of the exciter mechanism) of the measuring tubes, and for producing oscillation signals representing vibrations, the measuring transducers additionally in each case have a sensor arrangement, which reacts to relative movements of the measuring tubes, and is most often likewise electrodynamic. Typically, the sensor arrangement is formed by means of an inlet-side oscillation sensor registering oscillations of the measuring tubes differentially—thus registering only relative movements of the measuring tubes—as well as an outlet-side oscillation sensor also registering oscillations of the measuring tubes differentially. Each of the oscillation sensors, which are usually constructed equally to one another, is formed by means of a permanent magnet held on the first measuring tube and a cylindrical coil held on the second measuring tube and permeated by the magnetic field of the magnet.

In operation, the above-described tube arrangement formed by means of the two measuring tubes is excited by means of the electro-mechanical exciter mechanism at least at times in the wanted mode to execite mechanical oscillations at least one dominating, wanted, oscillation frequency. In such case, usually selected as the oscillation frequency for the oscillations in the wanted mode is a natural, instantaneous resonance frequency of the tube arrangement, which, in turn, is dependent essentially both on the size, shape and material of the measuring tubes, as well as also on an instantaneous density of the medium; in given cases, this wanted oscillation frequency can also be significantly influenced by an instantaneous viscosity of the medium. As a result of the fluctuating density of the medium to be measured and/or as a result of media changes performed during operation of the measuring transducer, the wanted oscillation frequency is variable at least within a calibrated—and in this respect predetermined—wanted frequency band, which correspondingly shows a predetermined lower and a predetermined upper limit frequency.

For defining a wanted oscillatory length of the measuring tubes and, in association therewith, for adjusting the wanted frequency band, measuring transducers of the above-described type additionally most often comprise: At least one inlet-side coupling element for forming inlet-side oscillation nodes for opposite-equal vibrations, especially bending oscillations, of the two measuring tubes, wherein this inlet-side coupling element is affixed, spaced from both flow dividers, to both measuring tubes; as well as at least one outlet-side coupling element for forming outlet-side oscillation nodes for opposite-equal vibrations, especially bending oscillations, of the measuring tubes, wherein this outlet-side coupling element is affixed to both measuring tubes and spaced both from the two flow dividers as well as also from the inlet-side coupling element. In the case of curved measuring tubes, the length of a section of a bend line of the respective measuring tube extending between the inlet-side and the outlet-side coupling element, consequently an imaginary center line of said measuring tube connecting the areal centers of gravity of all imaginary cross sectional areas of the respective measuring tube, corresponds, in such case, to the wanted oscillatory length of the measuring tubes. By means of the coupling elements belonging, in this respect, to the tube arrangement, also an oscillation quality factor of the tube arrangement, as well as also the sensitivity of the measuring transducer as a whole, can additionally be influenced in such a manner that, for a minimum required sensitivity of the measuring transducer, at least one minimum wanted oscillatory length is to be provided.

Development in the field of measuring transducers of vibration type has by this point reached such a state that modern measuring transducers of the described type can, for practical purposes, satisfy highest requirements as regard precision and reproducibility of measurement results for a broad spectrum of applications in the field of flow measurement technology. Thus, such measuring transducers are in practice used for mass flow rates of only some few g/h (gram per hour) up to some t/min (tons per minute), at pressures of up to 100 bar for liquids or even over 300 bar for gases. The accuracy of measurement achieved in such case usually lies, for instance, at 99.9% of the actual value, or more, and, respectively, a measuring error of, for instance, 0.1%, wherein a lower limit of the guaranteed measurement range can, by all means, lie, for instance, at 1% of the measurement range end value. Due to the great bandwidth of opportunities for use, industrial grade measuring transducers of vibration type are available with nominal diameters (corresponding to the caliber of the pipeline to be connected to the measuring transducer or the caliber of the measuring transducer measured at the connecting flange), which lie in a nominal diameter range of between 1 mm and 250 mm, and in the case of a maximum nominal mass flow rate of 1000 t/h, are specified respectively for pressure losses of less than 3 bar. A caliber of the measuring tubes lies, in such case, in a range between, for instance, 80 mm and 100 mm.

In spite of the fact that, by this point, measuring transducers are available for use in pipelines with very high mass flow rates and, in association therewith, very large calibers of far over 100 mm, there still exists significant interest to use measuring transducers of high precision and low pressure loss also for still larger pipeline calibers, for instance, of 300 mm or more, or mass flow rates of 1500 t/h or more, for instance, for applications in the petrochemical industry or in the field of transport and handling of petroleum, natural gas, fuels, etc. This leads in the case of correspondingly scaled enlargement of measuring transducer designs known and already established in the state of the art, especially from EP-A 1 001 254, EP-A 553 939, US-A 2002/0157479, U.S. Pat. Nos. 5,370, 002, 5,796,011, 6,308,580, 6,711,958, 7,134,347, 7,350,421, or WO-A 03/027616, to geometric dimensions assuming exorbitantly high magnitudes, especially geometric dimensions due to the desired oscillation characteristics, the required load capacity as well as the maximum allowed pressure loss, especially the installed length corresponding a distance between the sealing surfaces of the two flanges and, in the case of curved measuring tubes, to a maximum lateral expanse of the measuring transducer. Associated therewith, the empty mass of the measuring transducer also increases unavoidably, wherein conventional measuring transducers of large nominal diameter are already implemented with an empty mass of, for instance, 400 kg. Investigations, which have been performed for measuring transducers with two bent measuring tubes—for instance, according to U.S. Pat. Nos. 7,350,421 or 5,796,011—as regards their scaled adapting to still greater nominal diameters, have, for example, had the result that, for nominal diameters of more than 300 mm, the empty mass of a conventional measuring transducer enlarged to scale would lie far over 500 kg, along with an installed length of more than 3000 mm and a maximal lateral expanse of more than 1000 mm.

SUMMARY OF THE INVENTION

Proceeding from the above-described state of the art, an object of the invention is therefore to provide a measuring transducer of high sensitivity and oscillation quality factor, which, also in the case of large mass flow rates of more than 1000 t/h, causes a small pressure loss of as much as possible less than 3 bar, and which, also with large nominal diameter of over 100 mm, has as compact a construction as possible, and not least of all is suitable also for applications with extremely hot or extremely cold media, and also not least of all gaseous media, and/or media with significantly fluctuating media temperatures.

For achieving the object, the invention resides in a measuring transducer of vibration type for registering at least one physical, measured variable of a flowable medium conveyed in a pipeline, for example, a gas, a liquid, a powder or other flowable material, and/or for producing Coriolis forces serving for registering a mass flow rate of a flowable medium conveyed in a pipeline, especially a gas, a liquid, a powder or other flowable material. According to the invention, the measuring transducer comprises, for example, an at least partially essentially tubular and/or at least partially outwardly circularly cylindrical, transducer housing, of which an inlet-side, first housing end is formed by means of an inlet-side, first flow divider having eight, mutually spaced apart and, for example, circularly cylindrical or conical, flow openings, and an outlet-side, second housing end formed by means of an outlet-side, second flow divider having eight mutually spaced apart and, for example, circularly cylindrical or conical, flow openings. Furthermore, the measuring transducer comprises a tube arrangement with eight bent, for example, at least sectionally V-shaped and/or at least sectionally circular arc shaped, measuring tubes for conveying flowing medium, which, forming flow paths connected for parallel flow, are connected to the (for example, equally-constructed) flow dividers, and which are held oscillatably in the transducer housing, especially only by means of said flow dividers, and/or are equally constructed, and/or are pairwise parallel to one another. Of the eight measuring tubes, which are, for example, constructed equally both as regards geometry as well as also as regards material, a first measuring tube opens with an inlet-side, first measuring tube end into a first flow opening of the first flow divider, and opens with an outlet-side, second measuring tube end into a first flow opening of the second flow divider; a second measuring tube at least sectionally parallel to the first measuring tube opens with an inlet-side, first measuring tube end into a second flow opening of the first flow divider and with an outlet-side, second measuring tube end into a second flow opening of the second flow divider; a third measuring tube opens with an inlet-side, first measuring tube end into a third flow opening of the first flow divider and with an outlet-side, second measuring tube end into a third flow opening of the second flow divider; and a fourth measuring tube at least sectionally parallel to the third measuring tube opens with an inlet-side, first measuring tube end into a fourth flow opening of the first flow divider and with an outlet-side, second measuring tube end into a fourth flow opening of the second flow divider; a fifth measuring tube opens with an inlet-side, first measuring tube end into a fifth flow opening of the first flow divider and with an outlet-side, second measuring tube end into a fifth flow opening of the second flow divider; a sixth measuring tube, which is, for example, at least sectionally parallel to the fifth measuring tube, opens with an inlet-side, first measuring tube end into a sixth flow opening of the first flow divider and with an outlet-side, second measuring tube end into a sixth flow opening of the second flow divider; a seventh measuring tube opens with an inlet-side, first measuring tube end into a seventh flow opening of the first flow divider and with an outlet-side, second measuring tube end into a seventh flow opening of the second flow divider; and an eighth measuring tube, which is, for example, at least sectionally parallel to the seventh measuring tube, opens with an inlet-side, first measuring tube end into an eighth flow opening of the first flow divider and with an outlet-side, second measuring tube end into an eighth flow opening of the second flow divider. Additionally, the measuring transducer comprises an electro-mechanical exciter mechanism, which is formed, for example, by means of one or more electro-dynamic oscillation exciters, and which serves for producing and/or maintaining mechanical oscillations, especially bending oscillations, of the eight measuring tubes.

Moreover, the invention resides in a measuring system for measuring a density and/or a mass flow rate, for example, also a total mass flow, totaled over a time interval, of a medium, for instance, a gas, a liquid, a powder or other flowable material, at least at times flowing in a pipeline, for example, also with a mass flow rate of more than 1000 t/h, wherein this measuring system, which is, for example, embodied as an in-line measuring device and/or measuring device in compact construction, comprises said measuring transducer as well as a transmitter electronics, which is electrically coupled with the measuring transducer and, for example, arranged in an electronics housing mechanically connected with the transducer housing, and serves for activating the measuring transducer, and not least of all also its exciter mechanism, and serves for evaluation of oscillation signals delivered by the measuring transducer. The invention also resides in the application of said measuring system for measuring a density and/or a mass flow rate, and not least of all also a total mass flow totalled over a time interval, and/or a viscosity and/or a Reynolds number of a medium flowing in a process line—for instance, a pipeline—at least at times with a mass flow rate of more than 1000 t/h for example, more than 1500 t/h—such as, for example a gas, a liquid, a powder or other flowable material.

According to a first embodiment of the measuring transducer of the invention, the exciter mechanism is embodied in such a manner that therewith, each of the eight measuring tubes is excitable, for example, also simultaneously, to execute bending oscillations, for instance, to execute bending oscillations in a natural oscillatory mode inherent to the tube arrangement and/or at a resonance frequency associated with this.

According to a second embodiment of the measuring transducer of the invention, the exciter mechanism is embodied in such a manner that therewith, the first measuring tube and the second measuring tube are excitable to opposite-equal bending oscillations and the third measuring tube and the fourth measuring tube are excitable to opposite-equal bending oscillations, and/or that therewith, the fifth measuring tube and the seventh measuring tube are excitable to opposite-equal bending oscillations, and the sixth measuring tube and the eighth measuring tube are excitable to opposite-equal, for example, also to opposite-equal bending oscillations.

According to a third embodiment of the measuring transducer of the invention, the measuring tubes are embodied and arranged in the measuring transducer in such a manner that the tube arrangement shows a first imaginary longitudinal section plane which lies between the first imaginary longitudinal section plane and the second imaginary longitudinal section plane of the measuring transducer, and which is in each case parallel to the first imaginary longitudinal section plane of the measuring transducer and to the second imaginary longitudinal section plane of the measuring transducer, and relative to which the tube arrangement is mirror symmetrical, and the measuring tubes are embodied and arranged in the measuring transducer in such a manner that the tube arrangement shows a second imaginary longitudinal section plane, which is perpendicular to its imaginary first longitudinal section plane, and relative to which the tube arrangement is likewise mirror symmetrical. Developing this embodiment of the invention further, it is additionally provided that the tube arrangement shows a imaginary cross sectional plane, which is in each case perpendicular both to the first imaginary longitudinal section plane as well as also to the second imaginary longitudinal section plane, and within which a center of mass of the tube arrangement lies, and/or relative to which the tube arrangement is likewise mirror symmetrical.

According to a fourth embodiment of the measuring transducer of the invention, it is additionally provided that the two flow dividers are additionally embodied and arranged in the measuring transducer in such a manner that an imaginary first connecting axis of the measuring transducer imaginarily connecting the first flow opening of the first flow divider with the first flow opening of the second flow divider extends parallel to an imaginary second connecting axis of the measuring transducer imaginarily connecting the second flow opening of the first flow divider with the second flow opening of the second flow divider, that an imaginary third connecting axis of the measuring transducer imaginarily connecting the third flow opening of the first flow divider with the third flow opening of the second flow divider extends parallel to an imaginary fourth connecting axis of the measuring transducer imaginarily connecting the fourth flow opening of the first flow divider with the fourth flow opening of the second flow divider, that an imaginary fifth connecting axis of the measuring transducer imaginarily connecting the fifth flow opening of the first flow divider with the fifth flow opening of the second flow divider extends parallel to an imaginary sixth connecting axis of the measuring transducer imaginarily connecting the sixth flow opening of the first flow divider with the sixth flow opening of the second flow divider, and that an imaginary seventh connecting axis of the measuring transducer imaginarily connecting the seventh flow opening of the first flow divider with the seventh flow opening of the second flow divider extends parallel to an imaginary eighth connecting axis of the measuring transducer imaginarily connecting the eighth flow opening of the first flow divider with the eighth flow opening of the second flow divider.

Developing this embodiment of the invention further, it is additionally provided, for example, that the two flow dividers are embodied and arranged in the measuring transducer in such a manner that a first imaginary longitudinal section plane of the measuring transducer, within which the first imaginary connecting axis—which is, for example, parallel to a principal flow axis of the measuring transducer aligning with the pipeline—and the second imaginary connecting axis extend, is parallel to a second imaginary longitudinal section plane of the measuring transducer, within which the imaginary third connecting axis and the imaginary fourth connecting axis extend; that a third imaginary longitudinal section plane of the measuring transducer, within which the imaginary first connecting axis and the imaginary third connecting axis extend, is parallel to a fourth imaginary longitudinal section plane of the measuring transducer, within which the imaginary second connecting axis and the imaginary fourth connecting axis extend; and that a fifth imaginary longitudinal section plane of the measuring transducer, within which the imaginary fifth connecting axis and the imaginary sixth connecting axis extend, is parallel to a sixth imaginary longitudinal section plane of the measuring transducer, within which the imaginary seventh connecting axis and the imaginary eighth connecting axis extend; and that a seventh imaginary longitudinal section plane of the measuring transducer, within which the imaginary fifth connecting axis and the imaginary seventh connecting axis extend, is parallel to an eighth imaginary longitudinal section plane of the measuring transducer, within which the imaginary sixth connecting axis and the imaginary eighth connecting axis extend. Developing this embodiment of the invention further, it is additionally provided, for example, that the first imaginary longitudinal section plane of the tube arrangement extends between the fifth imaginary longitudinal section plane of the measuring transducer and the sixth imaginary longitudinal section plane of the measuring transducer, for example in such a manner that the first imaginary longitudinal section of plane of the tube arrangement is parallel to the fifth imaginary longitudinal section plane of the measuring transducer and parallel to the sixth imaginary longitudinal section plane of the measuring transducer, and/or that the second imaginary longitudinal section of plane of the tube arrangement extends between the third imaginary longitudinal section plane of the measuring transducer and the fourth imaginary longitudinal section plane of the measuring transducer, for example in such a manner that the second imaginary longitudinal section plane of the tube arrangement is parallel to the third imaginary longitudinal section plane of the measuring transducer and parallel to the fourth imaginary longitudinal section plane of the measuring transducer.

According to a fifth embodiment of the measuring transducer of the invention, it is additionally provided that the eight flow openings of the first flow divider are arranged in such a manner that imaginary areal centers of gravity associated with cross sectional areas, especially circularly shaped, cross sectional areas, of the flow openings of the first flow divider form the vertices of an imaginary regular octagon, wherein said cross sectional areas lie in a shared imaginary cross sectional cutting plane of the first flow divider.

According to a sixth embodiment of the measuring transducer of the invention, it is additionally provided that the eight flow openings of the second flow divider are arranged in such a manner that imaginary areal centers of gravity associated with cross sectional areas, especially circularly shaped, cross sectional areas, of the flow openings of the second flow divider form the vertices of an imaginary regular octagon, wherein said cross sectional areas lie in a shared imaginary cross sectional cutting plane of the second flow divider.

According to a seventh embodiment of the measuring transducer of the invention, it is additionally provided that each of the eight measuring tubes—especially equally large measuring tubes—shows a caliber, which amounts to more than 40 mm, especially more than 60 mm. Developing this embodiment of the invention further, it is additionally provided that the measuring tubes are bent and are arranged in such a manner that a caliber-to-height ratio of the tube arrangement, defined by a ratio of the caliber of the first measuring tube to a maximal lateral expanse of the tube arrangement, measured from a peak of the first measuring tube to a peak of the third measuring tube amounts to more than 0.05, especially more than 0.07 and/or less than 0.5, especially less than 0.4.

According to an eighth embodiment of the measuring transducer of the invention, it is additionally provided that the first flow divider includes a flange, especially a flange having a mass of more than 50 kg, for connecting the measuring transducer to a pipe segment of the pipeline serving for supplying medium to the measuring transducer, and the second flow divider includes a flange, especially a flange having a mass of more than 50 kg, for connecting the measuring transducer to a pipe segment of the pipeline serving for removing medium from the measuring transducer. Developing this embodiment of the invention further, each of the flanges includes a sealing surface for fluid-tight connecting of the measuring transducer with the respective corresponding pipe segment of the pipeline, wherein a distance between the sealing surfaces of both flanges defines an installed length of the measuring transducer, especially one amounting to more than 1000 mm and/or amounting to less than 3000 mm. The measuring transducer is especially additionally embodied in such a manner that, in such case, a measuring tube length of the first measuring tube corresponding to a length of a section of the bend line of the first measuring tube extending between the first flow opening of the first flow divider and the first flow opening of the second flow divider is selected in such a manner that a measuring tube length to installed length ratio of the measuring transducer, defined by a ratio of the measuring tube length of the first measuring tube to the installed length of the measuring transducer, amounts to more than 0.7, especially more than 0.8 and/or less than 1.2, and/or that a caliber to installed length ratio of the measuring transducer, defined by a ratio of a caliber of the first measuring tube to the installed length of the measuring transducer, amounts to more than 0.02, especially more than 0.05 and/or less than 0.09. Alternatively thereto or in supplementation thereof, the measuring transducer is embodied in such a manner that a nominal diameter to installed length ratio of the measuring transducer, defined by a ratio of the nominal diameter of the measuring transducer to the installed length of the measuring transducer, is less than 0.3, especially less than 0.2 and/or greater than 0.1, wherein the nominal diameter corresponds to a caliber of the pipeline, in whose course the measuring transducer is to be used.

According to a ninth embodiment of the measuring transducer of the invention, it is additionally provided that a measuring tube length of the first measuring tube corresponding to a length of a section of the bend line of the first measuring tube extending between the first flow opening of the first flow divider and the first flow opening of the second flow divider amounts to more than 1000 mm, especially more than 1200 mm and/or less than 3000 mm, especially less than 2500.

According to a tenth embodiment of the measuring transducer of the invention, it is additionally provided that a mass ratio of an empty mass of the entire measuring transducer to an empty mass of the first measuring tube is greater than 10, especially greater than 15 and less than 25.

According to an eleventh embodiment of the measuring transducer of the invention, it is additionally provided that an empty mass, $M_{18}$, of the first measuring tube, and especially of each of the measuring tubes, is greater than 20 kg, especially greater than 30 kg and/or less than 50 kg.

According to a twelfth embodiment of the measuring transducer of the invention, it is additionally provided that an empty mass of the measuring transducer is greater than 200 kg, especially greater than 300 kg.

According to a thirteenth embodiment of the measuring transducer of the invention, it is additionally provided that a nominal diameter of the measuring transducer, which corresponds to a caliber of the pipeline, in whose course the measuring transducer is to be used, amounts to more than 50 mm, and is especially greater than 100 mm. Advantageously, the measuring transducer is additionally embodied in such a manner that a mass-to-nominal-diameter ratio of the measuring transducer, defined by a ratio of the empty mass of the measuring transducer to the nominal diameter of the measuring transducer, is less than 2 kg/mm, especially less than 1 kg/mm and/or greater than 0.5 kg/mm.

According to a fourteenth embodiment of the measuring transducer of the invention, it is additionally provided that a caliber to nominal diameter ratio of the measuring transducer, defined by a ratio of a caliber of the first measuring tube to a nominal diameter of the measuring transducer corresponding to a caliber of the pipeline, in whose course the measuring transducer is to be used, is less than 0.4, especially less than 0.35 and/or greater than 0.21.

According to a fifteen embodiment of the measuring transducer of the invention, it is additionally provided that the eight measuring tubes are of equal construction as regards material, of which their tube walls are composed, and/or as regards their geometric tube dimensions, especially a measuring tube length, a tube wall thickness, a tube outer diameter and/or a caliber.

According to a sixteenth embodiment of the measuring transducer of the invention, it is additionally provided that a material, of which the tube walls of the eight measuring tubes are at least partially composed, comprises titanium and/or zirconium, and/or, for example, stainless and/or high strength steel, duplex steel and/or super duplex steel, or Hastelloy.

According to a seventeenth embodiment of the measuring transducer of the invention, it is additionally provided that the transducer housing, the flow dividers and tube walls of the measuring tubes are in each case composed of steel, for example, stainless steel.

According to an eighteenth embodiment of the measuring transducer of the invention, it is additionally provided that the exciter mechanism is formed by means of a first oscillation exciter, for example, an electrodynamic first oscillation exciter and/or one differentially exciting oscillations of the first measuring tube relative to the second measuring tube. The exciter mechanism is additionally formed by means of a second oscillation exciter, for example, an electrodynamic second oscillation exciter and/or one differentially exciting oscillations of the third measuring tube relative to the fourth measuring tube. In such case, it is additionally provided that the first and second oscillation exciters are electrically interconnected in series, in such a manner that a common driver signal excites shared oscillations of the first and third measuring tube relative to the second and fourth measuring tube. The oscillation exciter of the exciter mechanism can be formed, for example, by means of a permanent magnet held on the first measuring tube and a cylindrical coil held on the second measuring tube and permeated by the magnetic field of the permanent magnet, wherein the second oscillation exciter is formed by means of a permanent magnet held on the third measuring tube and a cylindrical coil held on the fourth measuring tube and permeated by the magnetic field of the permanent magnet. Additionally, the exciter mechanism can have other oscillation exciters, for example, electrodynamic oscillation exciters, namely third and fourth oscillation exciters in each case differentially exciting oscillations of the fifth measuring tube relative to the seventh measuring tube, and, respectively, the sixth measuring tube relative to the eighth measuring tube.

According to a first further development of the measuring transducer the invention, such further comprises at least eight coupling elements of first type, which are, for example, in each case, plate-shaped, and each of which, for setting the eigenfrequencies of natural oscillation modes of the tube arrangement not least of all usable for generating Coriolis forces in the medium flowing through the measuring tubes and/or for measuring a mass flow rate of the medium flowing through the measuring tubes, and/or for forming inlet-side or outlet-side oscillation nodes for vibrations, for instance, also bending oscillations, of the measuring tubes, is in each case affixed, spaced apart from both the first as well as also from the second flow divider, to two of the measuring tubes on the inlet side or on the outlet side, especially only on said two measuring tubes, but otherwise to no others of the eight measuring tubes.

Additionally, according to a further embodiment of the invention, the measuring transducer includes at least four coupling elements of second type—which are, for example, in each case plate shaped or rod, or bar, shaped—for setting the eigenfrequencies of natural oscillation modes of the tube arrangement, and which are not least of all also usable for generating Coriolis forces in the medium flowing through the measuring tubes and/or for measuring a mass flow rate of the medium flowing through the measuring tubes, and each of which is affixed, in each case spaced apart both from the first flow divider as well as also from the second flow divider, as well as also from the coupling elements of first type, to two of the eight measuring tubes, and especially otherwise to no others of the eight measuring tubes.

According to a second further development of the invention, the measuring transducer further comprises a sensor arrangement, for example, an electro-dynamic sensor arrangement and/or one formed by means of oscillation sensors constructed equally to one another, reacting to vibrations (especially bending oscillations excited by means of the exciter mechanism) of the measuring tubes for producing oscillation signals representing vibrations, especially bending oscillations, of the measuring tubes.

According to a first embodiment of the measuring system of the invention, it is additionally provided that the transmitter electronics, based on electrical excitation power converted in the exciter mechanism, generates a viscosity measured value representing the viscosity of the flowing medium; and/or that the transmitter electronics, based on oscillation signals delivered by the measuring transducer, generates a mass flow measured value representing the mass flow rate of the flowing medium and/or a density measured value representing the density of the flowing medium.

A basic idea of the invention is to use, instead of the pipe arrangements with two parallelly flowed-through, bent measuring tubes usually used in the case of conventional measuring transducers of large nominal diameter, pipe arrangements with eight parallelly flowed through, bent—for example, V shaped or circular arc shaped—measuring tubes, and thus, on the one hand, to enable an optimal exploitation of the limited space available, and, on the other hand, to be able to assure an acceptable pressure loss throughout a broad measuring range, especially also in the case of very high mass flow rates of far over 1000 t/h. Moreover, the effective flow cross section of the tube arrangement resulting from the total cross section of the eight measuring tubes can be directly increased by more than 20% in comparison to conventional measuring transducers of equal nominal diameter and equal empty mass having only two measuring tubes, and, consequently, a flow resistance of the measuring transducer co-determined thereby can be correspondingly lessened.

An advantage of the invention lies additionally in the fact that, among other things, due to the symmetry characteristics of the tube arrangement, transverse forces caused by bending oscillations of curved measuring tubes can largely be neutralized, transverse forces, which—as is, among other things, discussed in the previously mentioned EP-A 1 248 084 and U.S. Pat. No. 7,350,421—act essentially perpendicularly to the longitudinal section planes of the respective measuring transducer or its tube arrangement, and can be quite damaging for the accuracy of measurement of measuring transducers of vibration type. Additionally, in the case of measuring transducers of the aforementioned type, in comparison to conventional measuring transducers with only one or two bent measuring tubes, an increased oscillation quality factor of the measuring transducer as a whole could be detected, this not least of all also as a result of a significantly lessened dissipation of oscillatory energy from the measuring transducer into the pipeline connected thereto, for instance, as a result of actually undesired deformations of the flow dividers. Moreover, the oscillations of the measuring tubes of measuring transducers according to the present invention also exhibit—in comparison to conventional measuring transducers—a significantly lessened pressure jolt, or sound, dependence.

A further advantage of the measuring transducer of the invention is additionally also to be seen in the fact that predominantly established structural designs, such as concern, for instance, the materials used, the joining technology, the manufacturing steps, etc., can be applied or need only be modified slightly, whereby also manufacturing costs as a whole are quite comparable to conventional measuring transducers. In this respect, a further advantage of the invention is to be seen in the fact that not only is an opportunity created to implement comparatively compact measuring transducers of vibration type even with large nominal diameters of over 150 mm, especially with a nominal diameter of larger than 250 mm, with manageable geometric dimensions and empty masses, but these can also additionally be implemented in an economically sensible manner.

The measuring transducer of the invention is, consequently, especially suitable for measuring flowable media conveyed in a pipeline with a caliber of larger than 150 mm, especially of 300 mm or more. In addition, the measuring transducer is also suitable for measuring even mass flows, which are, at least at times, greater than 1000 t/h, especially, at least at times, greater than 1500 t/h, such as can occur, for example, in the case of applications for measuring petroleum, natural gas or other petrochemical materials.

BRIEF DESCRIPTION OF THE DRAWINGS

The invention, as well as other advantageous embodiments thereof, will now be explained in greater detail on the basis of the appended drawing, in which examples of embodiments are presented. Equal parts are provided in all figures with equal reference characters; when required for reasons of perspicuity or when it otherwise appears sensible, already mentioned reference characters are omitted in subsequent figures. Other advantageous embodiments or further developments, especially also combinations of aspects the invention initially explained only individually, will additionally become evident from the figures the drawing, as well as also from the dependent claims as such. The figures of the drawing show as follows:

FIG. 3b in perspective side view, the tube arrangement of FIG. 3a;

FIG. 5 projection of a tube arrangement of FIG. 3b into an end view;

DETAILED DESCRIPTION OF EXEMPLARY EMBODIMENTS

Figure 1:
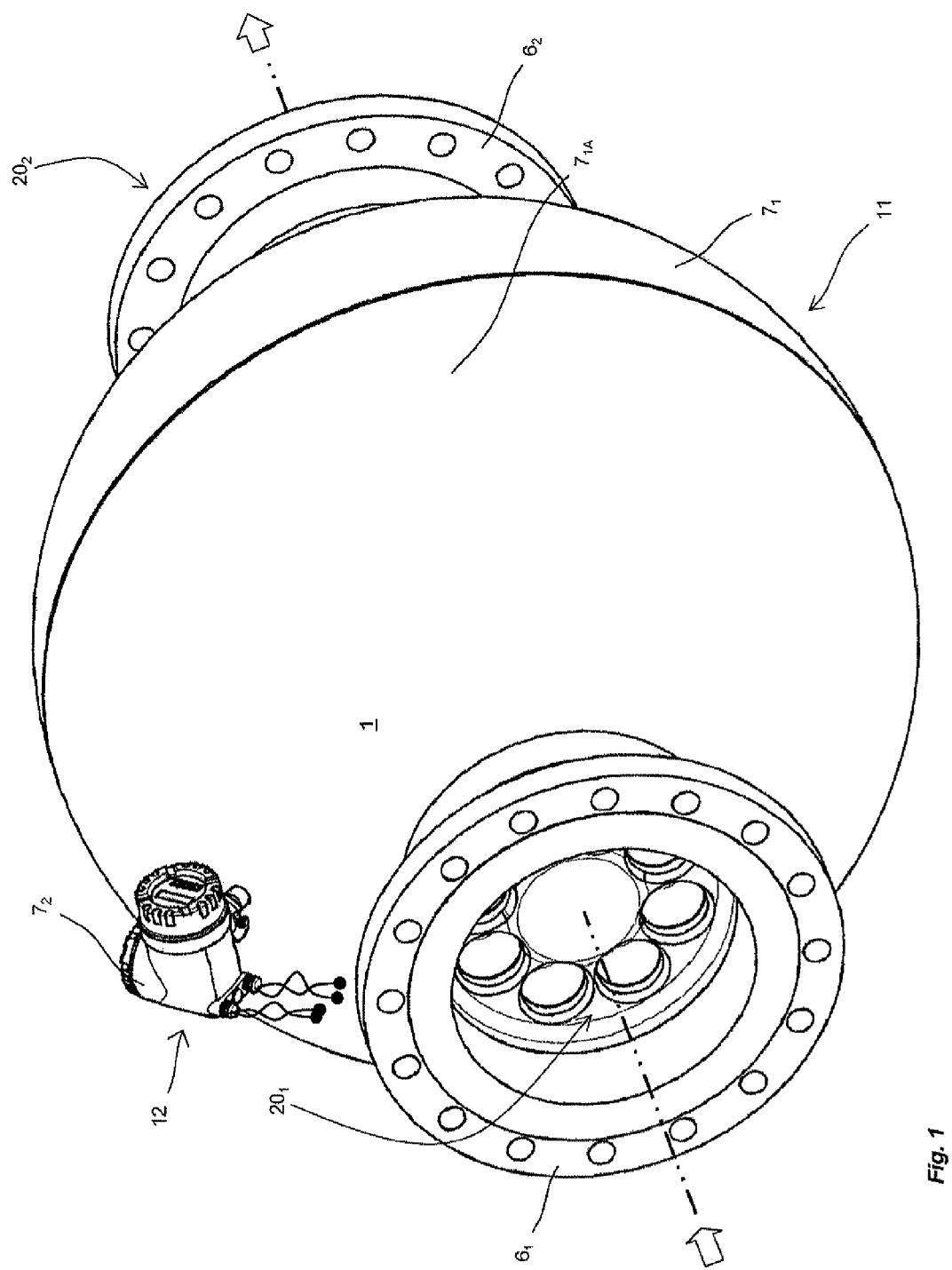
FIG. 1 an in-line measuring device serving, for example, as a Coriolis flow/density/viscosity measuring device, in perspective.

While the invention is susceptible to various modifications and alternative forms, exemplary embodiments thereof have been shown by way of example in the drawings and will herein be described in detail. It should be understood, however, that there is no intent to limit the invention to the particular forms disclosed, but on the contrary, the intention is to cover all modifications, equivalents, and alternatives falling within the spirit and scope of the invention as defined by the intended claims.

FIG. 1 shows schematically a measuring system 1, especially one embodied as a Coriolis mass flow, and/or density, measuring device, which not least of all serves to register a mass flow m of a medium flowing in a pipeline—not shown here for reasons of perspicuity—and to present this in a mass flow measured value instantaneously representing this mass flow. The medium can be practically any flowable material, for example, a powder, a liquid, a gas, a vapor or the like. Alternatively or in supplementation, the measuring system 1 can, in given cases, also be used to measure a density $\rho$ and/or a viscosity $\eta$ of the medium. The measuring system 1 is especially provided to measure media—such as, for example, petroleum, natural gas or other petrochemical materials—which flow in a pipeline with a caliber of more than 250 mm, especially a caliber of 300 mm or over. The in-line measuring device is also particularly provided to measure flowing media of the aforementioned type, which are caused to flow with a mass flow rate of greater than 1000 t/h, especially greater than 1500 t/h.

For this, the measuring system 1—shown here as an in-line measuring device, namely a measuring device insertable into the course of the pipeline, in compact construction—comprises a measuring transducer 11 of vibration type flowed through during operation by the medium to be measured, as well as a transmitter electronics 12—not shown in detail here—which is electrically connected with the measuring transducer 11, and serves for activating the measuring transducer and for evaluation of oscillation signals delivered by the measuring transducer. Advantageously, the transmitter electronics 12, which is formed, for example, by means of one or more microprocessors and/or by means of one or more digital signal processors can, for example, be designed in such a manner that, during operation of the measuring system 1, it can, via a data transmission system (for example, a hardwired fieldbus system) and/or wirelessly via radio, exchange measuring data and/or other operating data with a measured value processing unit superordinated to the measuring system, for example, a programmable logic controller (PLC), a personal computer and/or a work station. Furthermore, the transmitter electronics 12 can be designed in such a manner that it can be fed by an external energy supply, for example, also via the aforementioned fieldbus system. For the case, in which the measuring system 1 is provided for coupling to a fieldbus or other communication system, the transmitter electronics 12, which is, for example, also (re)programmable on-site and/or via a communication system, can have a corresponding communication interface for data communication, e.g. for sending measured data to the already mentioned programmable logic controller or to a superordinated process control system, and/or for receiving settings data for the measuring system.

FIGS. 4a, 4b, 5a, 5b, 6a, 6b, show, in different representations, an example of an embodiment for a measuring transducer 11 of vibration type suited for the measuring system 1, especially one serving as a Coriolis mass flow measuring transducer, a density measuring transducer and/or a viscosity transducer, wherein measuring transducer 11 is inserted into the course of a pipeline (not shown here) flowed through, during operation, by the respective medium to be measured, for instance, a powdered, liquid, gaseous or vaporous medium. The measuring transducer 11 serves, as already mentioned, to produce, in a medium flowing through such, mechanical reaction forces, especially Coriolis forces dependent on the mass flow rate, inertial forces dependent on the density of the medium and/or frictional forces dependent on the viscosity of the medium, which forces react measurably on the measuring transducer, especially in a manner registerable by sensor. Derived from these reaction forces describing the medium, by means of evaluating methods correspondingly implemented in the transmitter electronics, the mass flow rate, and consequently mass flow, for example, and/or the density and/or the viscosity of the medium can be measured in manner known to those skilled in the art.

The measuring transducer 11 includes a—here at least partially essentially ellipsoidally shaped or also at least partially spherically shaped—transducer housing $7_1$, in which other components of the measuring transducer 11 serving for registering the at least one measured variable are accommodated and protected against external, environmental influences, thus e.g. dust or water spray, or also possibly forces acting externally on the measuring transducer, etc.

A—here essentially circularly cylindrical—inlet-side, first housing end of the transducer housing $7_1$ is formed by means of an inlet-side, first flow divider $20_1$ and a—here essentially circularly cylindrical—outlet-side, second housing end of the transducer housing $7_1$ is formed by means of an outlet-side, second flow divider $20_2$. Each of the two flow dividers $20_1$, $20_2$, insofar as they are formed as integral components of the housing, includes exactly eight, mutually spaced flow openings $20_{1A}$, $20_{1B}$, $20_{1C}$, $20_{1D}$, $20_{1E}$, $20_{1F}$, $20_{1G}$, $20_{1H}$, and, respectively, $20_{2A}$, $20_{2B}$, $20_{2C}$, $20_{2D}$, $20_{2E}$, $20_{2F}$, $20_{2G}$, $20_{2H}$, which are, for example, circularly cylindrical or conical, or in each case embodied as an inner cone. Moreover, each of the flow dividers $20_1$, $20_2$, which are, for example, manufactured from steel, is in each case provided with a flange, respectively, $6_1$ or $6_2$, which is, for example, manufactured from steel, and serves for connecting the measuring transducer 11 to a pipe segment of the pipeline serving for supplying medium to the measuring transducer, or to a pipe segment of the mentioned pipeline serving for removing medium from the measuring transducer. According to an embodiment of the invention, each of the two flanges $6_1$, $6_2$ shows a mass of more than 50 kg, especially of more than 60 kg and/or less than 100 kg.

Moreover, the material for the transducer housing $7_1$ can be—depending on application—any steels usually used for such housings, such as, for instance, even structural steel, or stainless steel, or also other high strength materials suitable, or usually suitable, for this. For most applications of industrial measurements technology, especially also in the petrochemicals industry, also measuring tubes of stainless steel, for example, also duplex steel, super duplex steel or other (high strength) stainless steel can additionally satisfy the requirements regarding mechanical strength, chemical resistance as well as meeting thermal requirements, so that in numerous cases of application, the transducer housing $7_1$, the flow dividers $20_1$, $20_2$, as well as also the tube walls of the measuring tubes can in each case be composed of steel of, in each case, sufficiently high quality, which especially can be advantageous as regards the material and manufacturing costs, as well as also the thermally related expansion behavior of the measuring transducer 11 during operation. Moreover, the transducer housing $7_1$ can additionally advantageously be embodied and dimensioned in such a manner that, in the event of possible damage to one or more of the measuring tubes, e.g. due to crack formation or bursting, the housing can completely hold back outflowing medium up to a required maximal positive pressure in the interior of the transducer housing 7 as long as possible, wherein such critical state—as is, for example, also mentioned in the previously cited U.S. Pat. No. 7,392,709—can be registered and signaled as early as possible by means of corresponding pressure sensors and/or, based on the mentioned transmitter electronics 12, by means of operating parameters internally produced during operation. For simplifying transport of the measuring transducer or of the entire in-line measuring device formed therewith—as is, for example, also provided in the previously mentioned U.S. Pat. No. 7,350,421—lifting rings can additionally be provided, externally affixed on the transducer housing on the inlet side and on the outlet side.

For leakage-free and especially fluid-tight connecting of the measuring transducer with the respective corresponding pipe segments of the pipeline, each of the flanges additionally includes, in each case, a corresponding sealing surface, respectively, $6_{1A}$, or $6_{2A}$, which is as planar as possible. A distance between the two sealing surfaces $6_{1A}$, $6_{2A}$ of both flanges thus defines, for practical purposes, an installed length, $L_{11}$, of the measuring transducer 11. The flanges are, especially as regards their inner diameter, their respective sealing surfaces as well as the flange bores serving for accommodating corresponding connection bolts, dimensioned corresponding to the nominal diameter provided for the measuring transducer 11—as well, in given cases, industrial standards relevant therefor. The nominal diameter is a caliber of the pipeline, in whose course the measuring transducer is to be used. As a result of the large nominal diameter particularly desired for the measuring transducer, the installed length $L_{11}$ of the measuring transducer amounts to more than 1200 mm in an embodiment of the invention. It is, however, additionally provided that the installed length of the measuring transducer 11 is to be kept as small as possible, especially less than 3000 mm. For this, the flanges $6_1$, $6_2$ can, as is also directly evident from FIG. 4a, and as is quite usual in the case of such measuring transducers, be arranged as near to the flow openings of the flow dividers $20_1$, $20_2$ as possible, in order to thus provide as short as possible an inlet or outlet region in the flow dividers, and thus to provide as short a total installed length $L_{11}$ of the measuring transducer as possible, especially of less than 3000 mm. For as compact a measuring transducer as possible—not least of all also in the case of desired high mass flow rates of over 1000 t/h—according to another embodiment of the invention, the installed length and the nominal diameter of the measuring transducer are dimensioned, matched to one another, in such a manner that a nominal diameter to installed length ratio $D_{11}/L_{11}$ of the measuring transducer, defined by a ratio of the nominal diameter $D_{11}$ of the measuring transducer to the installed length $L_{11}$ of the measuring transducer, is less than 0.3, especially less than 0.2 and/or greater than 0.1. In the example of an embodiment shown here, at least a middle segment $7_{1A}$ of the transducer housing $7_1$ is formed by means of an ellipsoidally shaped shell—here even spherically shaped and initially formed from two hemispherical shells—so that, for example, also cost effective deep drawn parts made of sheet steel can be used for manufacturing the transducer housing $7_1$.

For conveying the medium flowing, at least at times, through the pipeline and measuring transducer, the measuring transducer of the invention additionally comprises a tube arrangement with—here exactly—eight bent measuring tubes $18_1$, $18_2$, $18_3$, $18_4$, $18_5$, $18_6$, $18_7$, $18_8$ held oscillatably in the transducer housing 10, for example, tubes which are, at least sectionally, circular arc shaped and/or—as schematically presented here—at least sectionally V shaped. The eight measuring tubes $18_1$, $18_2$, $18_3$, $18_4$, $18_5$, $18_6$, $18_7$, $18_8$—which here are of equal length, as well as extending pairwise parallel to one another—communicate, in each case, with the pipeline connected to the measuring transducer, and, during operation, are, at least at times, especially also simultaneously, caused to vibrate in at least one actively excited oscillatory mode—the so-called wanted mode—suitable for ascertaining the physical, measured variable.

Of the eight measuring tubes, a first measuring tube $18_1$ opens with an inlet-side, first measuring tube end into a first flow opening $20_{1A}$ of the first flow divider $20_1$ and with an outlet-side, second measuring tube end into a first flow opening $20_{2A}$ of the second flow divider $20_2$, a second measuring tube $18_2$ opens with an inlet-side, first measuring tube end into a second flow opening $20_{1B}$ of the first flow divider $20_1$ and with an outlet-side, second measuring tube end into a second flow opening $20_{2B}$ of the second flow divider $20_2$, a third measuring tube $18_3$ opens with an inlet-side, first measuring tube end into a third flow opening $20_{1C}$ of the first flow divider $20_1$ and with an outlet-side, second measuring tube end into a third flow opening $20_{2C}$ of the second flow divider $20_2$, a fourth measuring tube $18_4$ opens with an inlet-side, first measuring tube end into a fourth flow opening $20_{1D}$ of the first flow divider $20_1$ and with an outlet-side, second measuring tube end into a fourth flow opening $20_{2D}$ of the second flow divider $20_2$, a fifth measuring tube $18_5$ opens with an inlet-side, first measuring tube end into a fifth flow opening $20_{1E}$ of the first flow divider $20_1$ and with an outlet-side, second measuring tube end into a fifth flow opening $20_{2E}$ of the second flow divider $20_2$, a sixth measuring tube $18_6$ opens with an inlet-side, first measuring tube end into a sixth flow opening $20_{1F}$ of the first flow divider $20_1$ and with an outlet-side, second measuring tube end into a sixth flow opening $20_{2F}$ of the second flow divider $20_2$, a seventh measuring tube $18_7$ opens with an inlet-side, first measuring tube end into a seventh flow opening $20_{1G}$ of the first flow divider $20_1$ and with an outlet-side, second measuring tube end into a seventh flow opening $20_{2G}$ of the second flow divider $20_2$, and an eighth measuring tube $18_8$ opens with an inlet-side, first measuring tube end into an eighth flow opening $20_{1H}$ of the first flow divider $20_1$ and with an outlet-side, second measuring tube end into an eighth flow opening $20_{2H}$ of the second flow divider $20_2$.

The eight measuring tubes $18_1$, $18_2$, $18_3$, $18_4$, $18_5$, $18_6$, $18_7$, $18_8$ are thus connected to the flow dividers $20_1$, $20_2$ especially equally constructed flow dividers $20_1$, $20_2$, for forming flow paths for parallel flow, and indeed in a manner enabling vibrations, especially bending oscillations, of the measuring tubes relative to the transducer housing, or also at least in each case pairwise relative to one another. Additionally, it is provided that the measuring tubes $18_1$, $18_2$, $18_3$, $18_4$, $18_5$, $18_6$, $18_7$, $18_8$, are in each case held oscillatably in the transducer housing $7_1$ only by means of said flow dividers $20_1$, $20_2$. Suitable as material for the tube walls of the measuring tubes is, for example, stainless steel, in given cases, also high strength stainless steel, titanium, zirconium or tantalum, or alloys formed thereof, or even super alloys, such as, for instance, Hastelloy, Inconel, etc. Moreover, however, practically any other material usually applied or at least suitable therefor can also serve as material for the measuring tubes $18_1$, $18_2$, $18_3$, $18_4$, $18_5$, $18_6$, $18_7$, $18_8$, especially such with as small a thermal expansion coefficient as possible and an as high a yield point as possible. Advantageously, the eight measuring tubes $18_1$, $18_2$, $18_3$, $18_4$, $18_5$, $18_6$, $18_7$, $18_8$ are implemented so as to be of equal construction as regards a material of which their tube walls are composed, and/or as regards their geometric tube dimensions, especially a measuring tube length, a tube wall thickness, a tube outer diameter, a shape of the particular bend line and/or a caliber, and especially in such a manner that, as a result, at least one minimum bending oscillation resonance frequency of each of the—empty or uniformly flowed through by a homogeneous medium—measuring tubes $18_1$, $18_2$, $18_3$, $18_4$, $18_5$, $18_6$, $18_7$, $18_8$ is essentially equal to the respective minimum bending oscillation resonance frequencies of the remaining other measuring tubes.

Figure 2A:
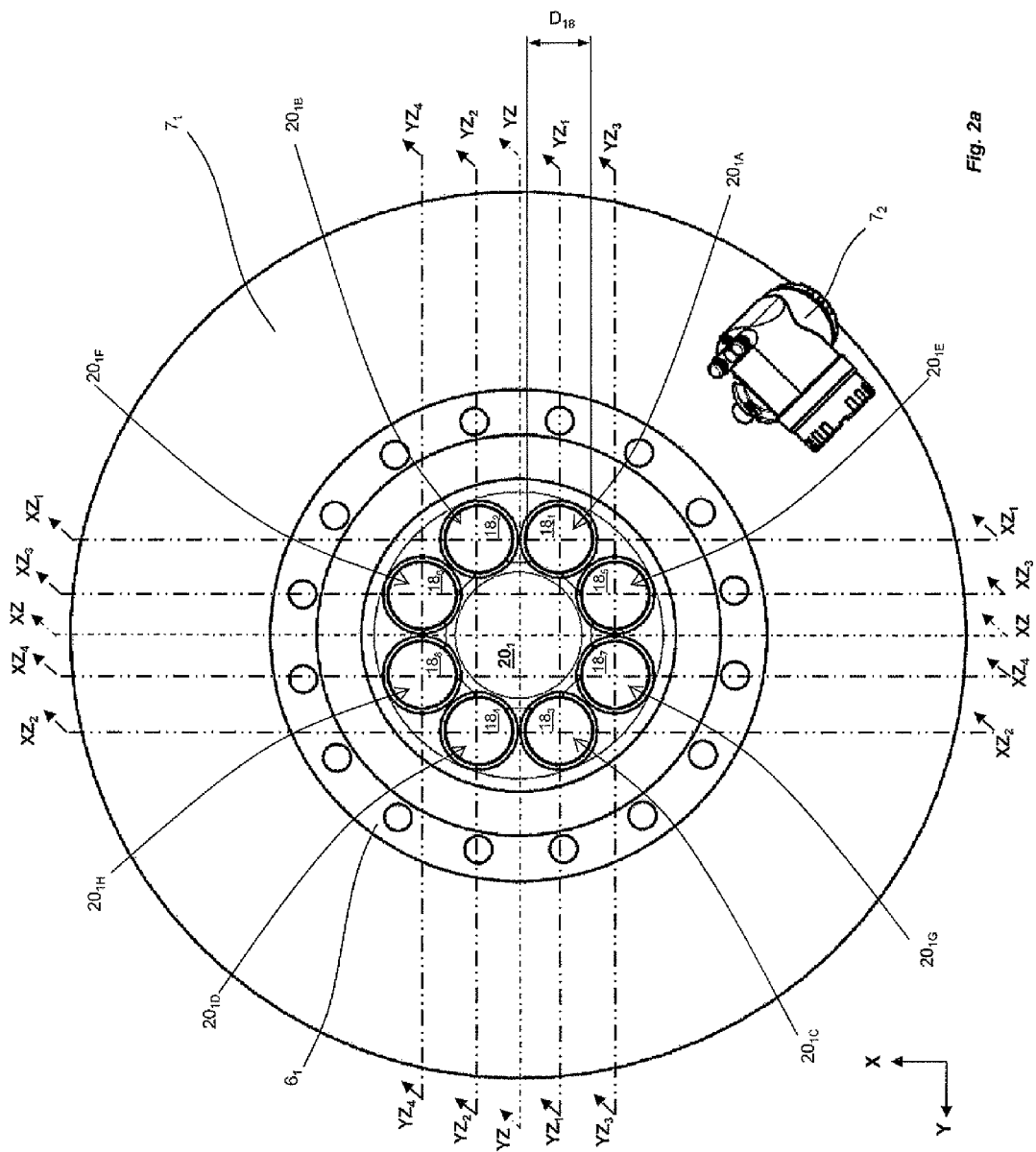
FIGS. 2a, b projections of the in-line measuring device according to FIG. 1 in the two end views.
Figure 2B:
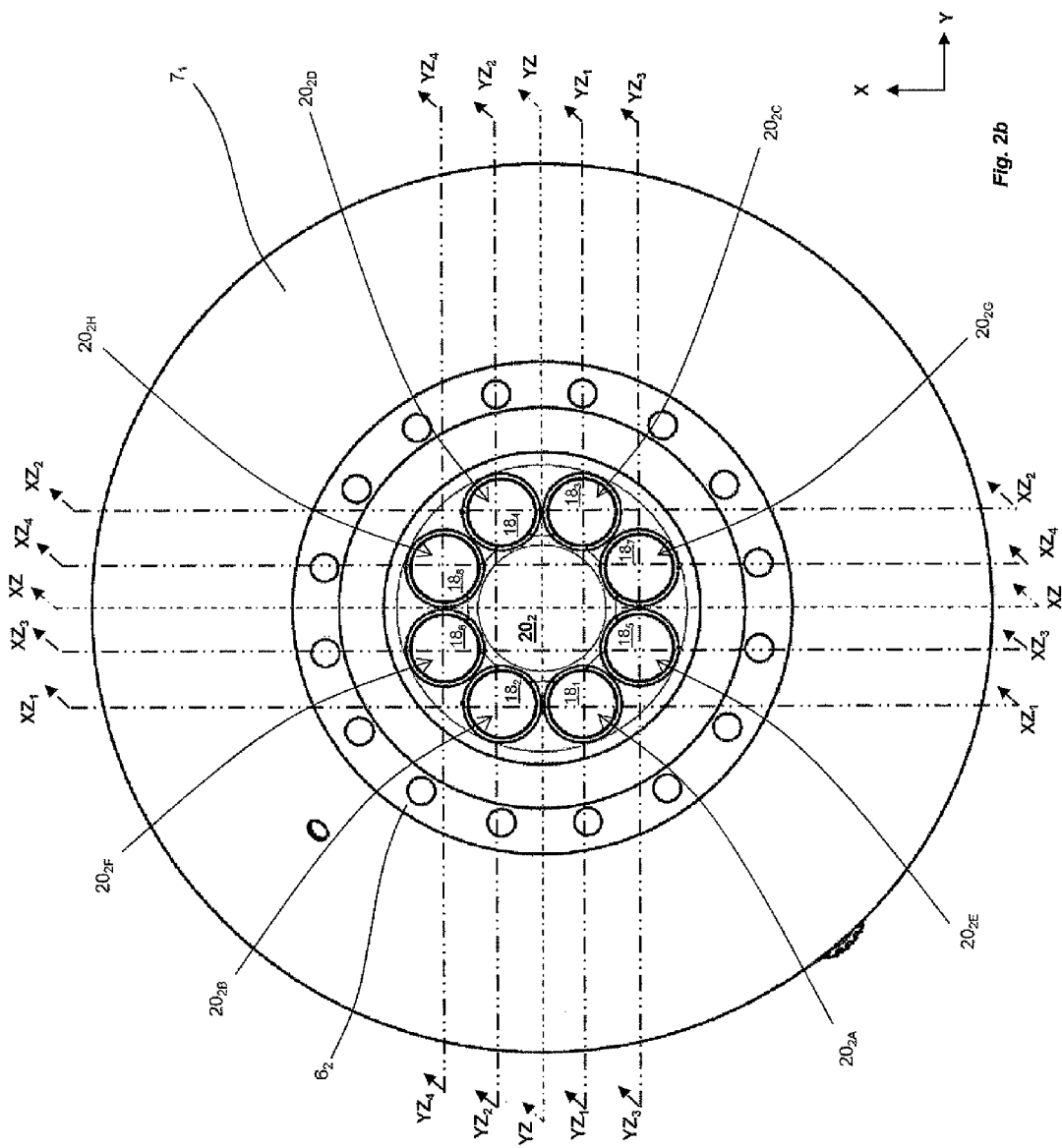
Figure 4A:
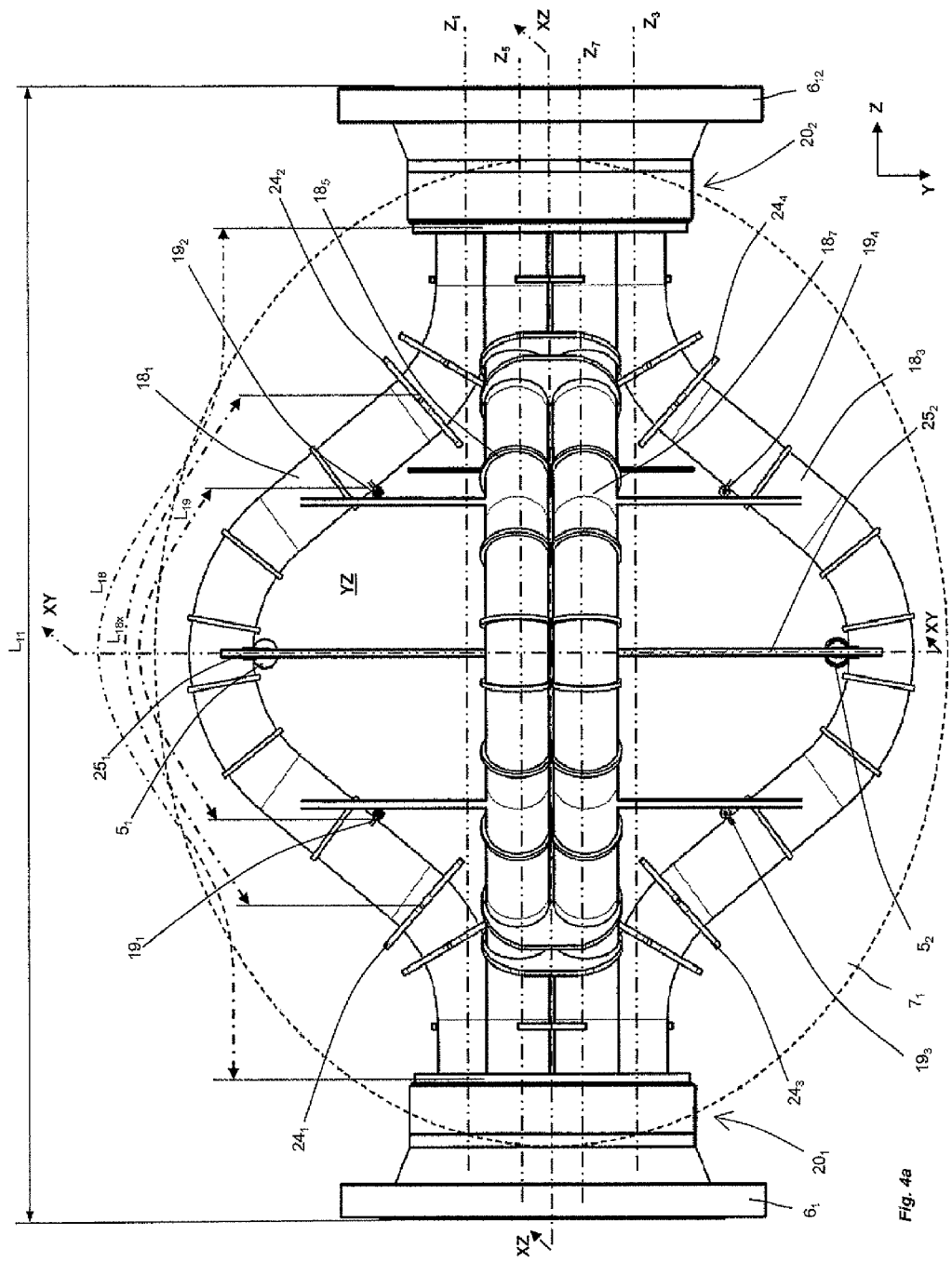
FIGS. 4a-d projections of the measuring transducer of FIG. 4a into four different side views.
Figure 4B:
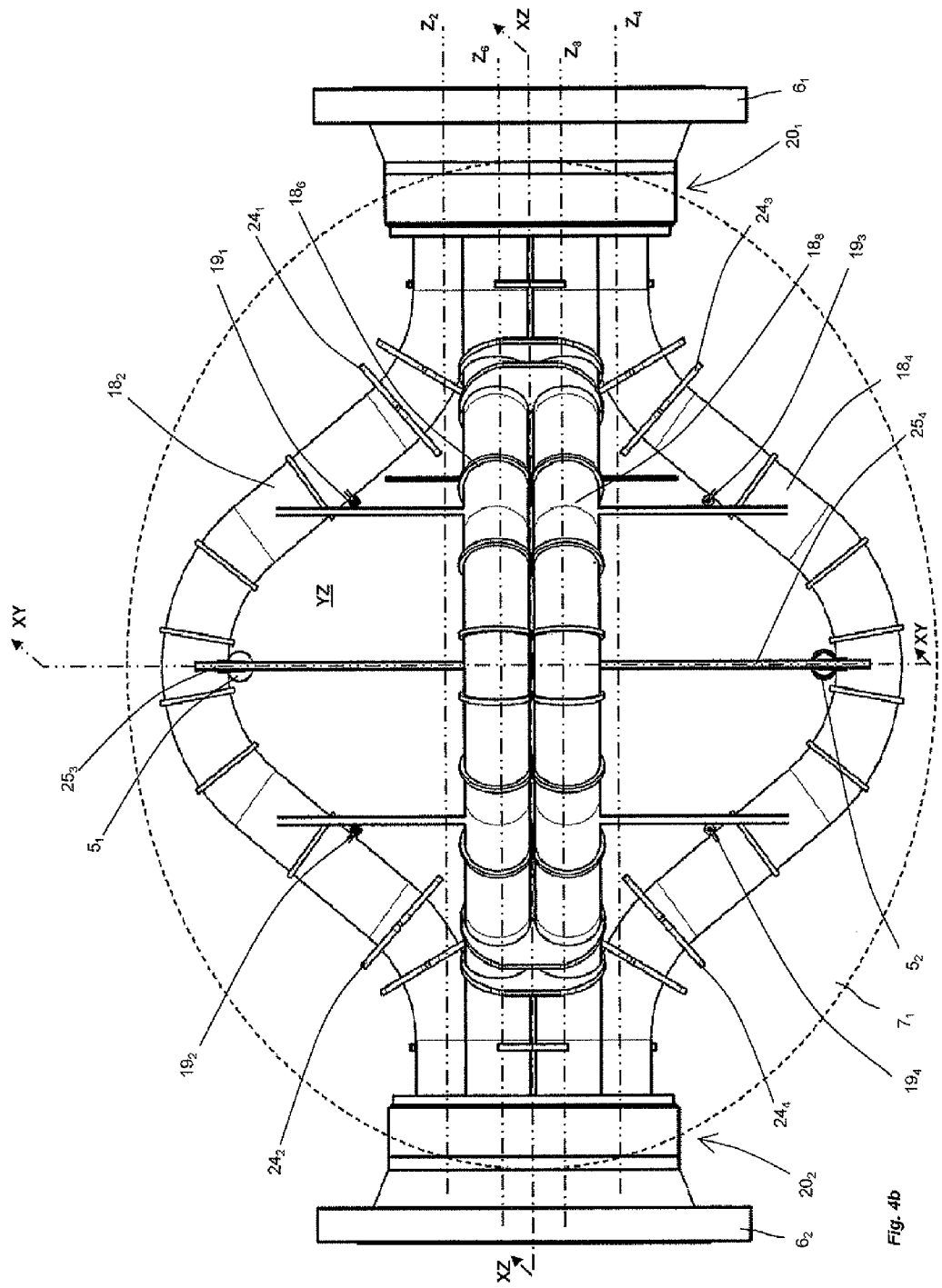
Figure 4C:
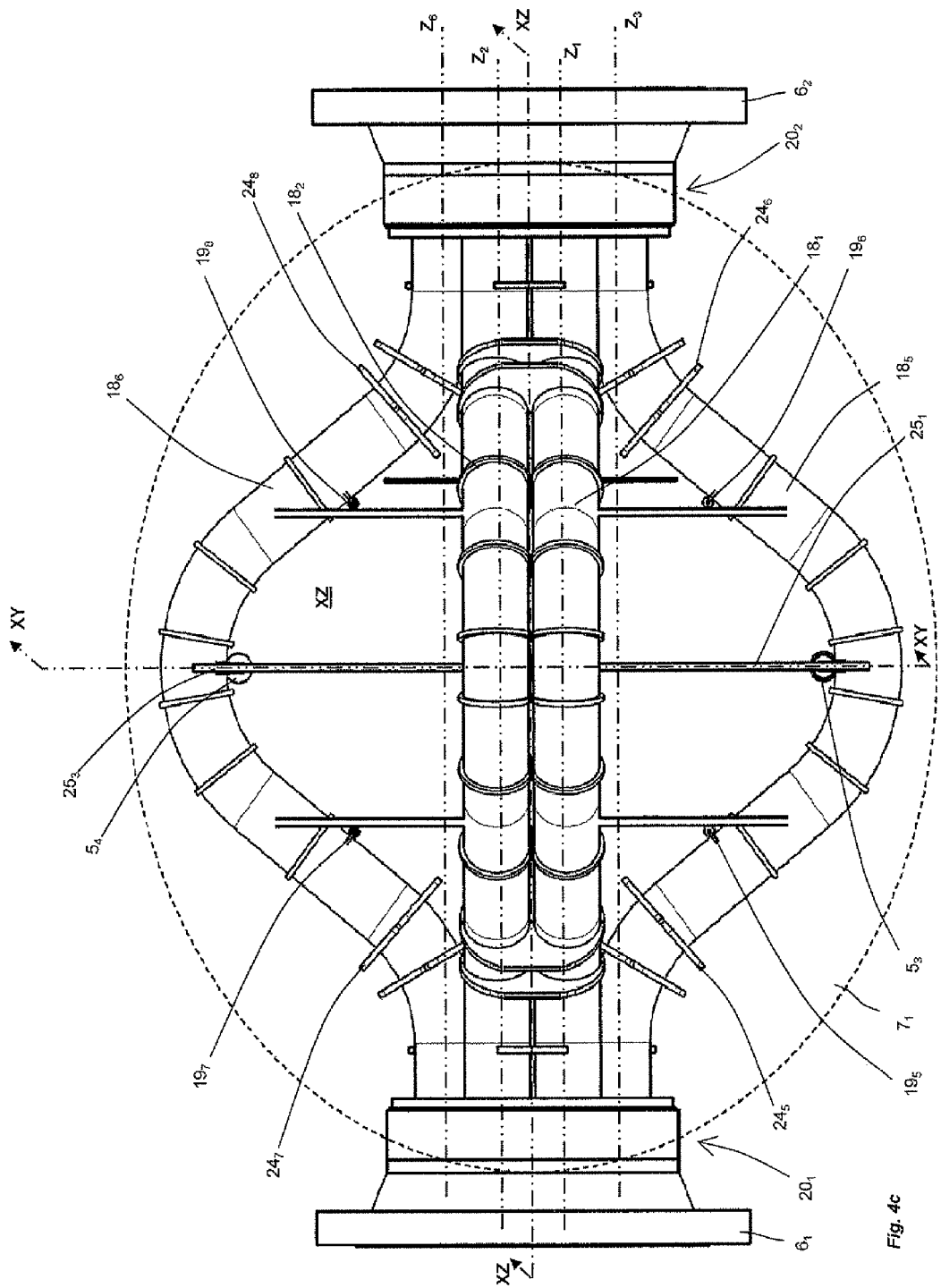
Figure 4D:
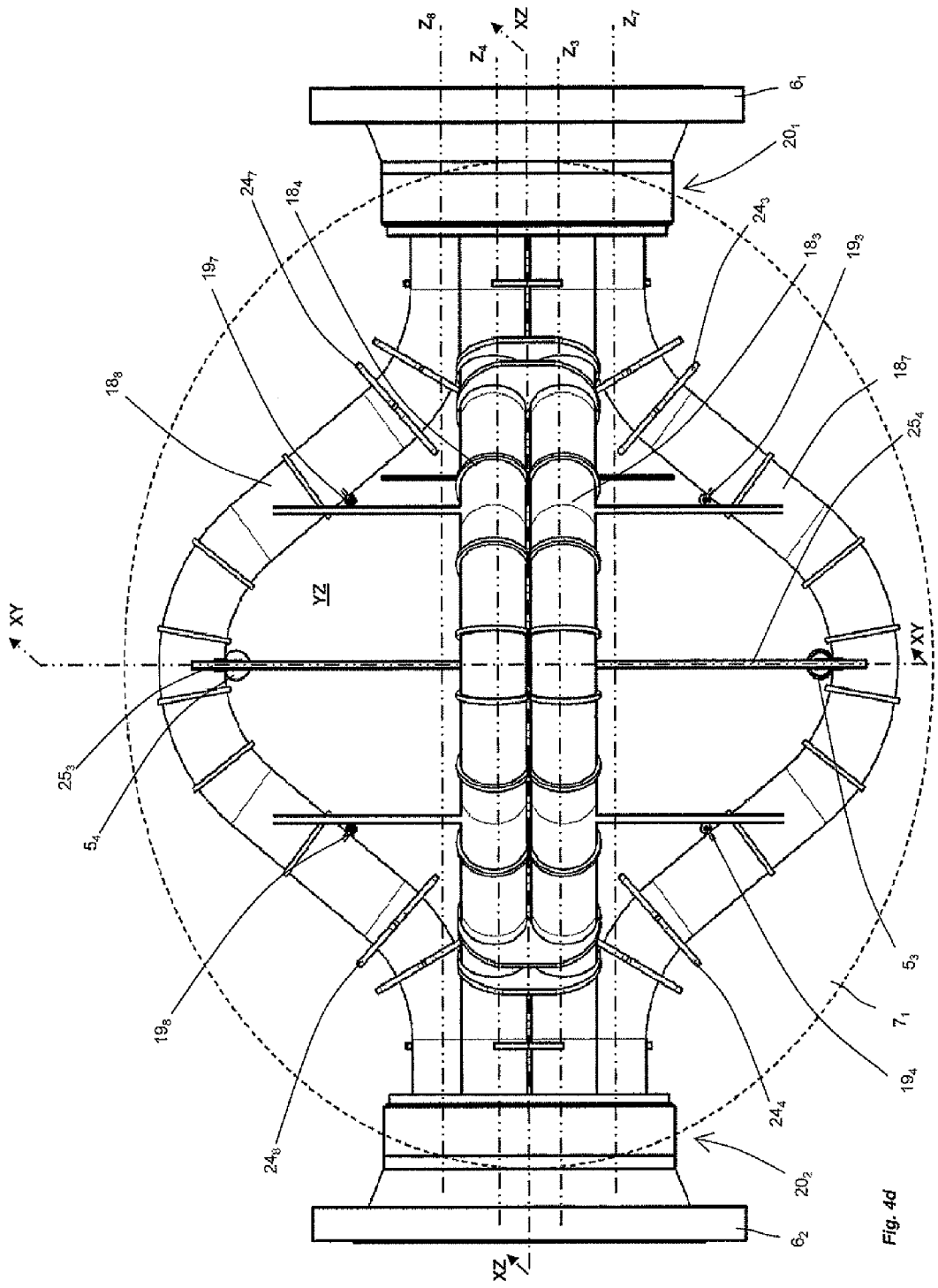

In an additional embodiment of the invention, the eight measuring tubes, as is also directly evident from the combination of FIGS. 2, 4a and 4b, are additionally embodied and arranged in the measuring transducer in such a manner that the tube arrangement shows a first imaginary longitudinal section plane XZ lying both between the first measuring tube $18_1$ and the third measuring tube $18_3$ as well as also between the second measuring tube $18_2$ and the fourth measuring tube $18_4$, relative to which the tube arrangement is mirror symmetrical, and in such a manner that the tube arrangement furthermore shows, perpendicular to its imaginary first longitudinal section plane XZ, a second imaginary longitudinal section plane YZ lying both between the fifth measuring tube and sixth measuring tube, as well as also between the seventh measuring tube and eighth measuring tube, relative to which the tube arrangement is likewise mirror symmetrical. Said first imaginary longitudinal section plane XZ additionally lies both between the fifth measuring tube and seventh measuring tube, as well as also between the sixth measuring tube and the eighth measuring tube, while said second imaginary longitudinal section plane YZ additionally extends both between the first measuring tube $18_1$ and second measuring tube $18_2$, as well as also between the third measuring tube $18_3$ and the fourth measuring tube $18_4$.

As a result of this, not only are mechanical stresses generated by possible thermally related expansion of the measuring tubes within the tube arrangement minimized, but transverse forces possibly induced by the bending oscillations of the bent measuring tubes within the tube arrangement and acting essentially perpendicular to line of intersection of the two aforementioned imaginary longitudinal section planes can also largely be neutralized, not least of all also those transverse forces mentioned, among other things, also in the previously cited EP-A 1 248 084 and U.S. Pat. No. 7,350,421, which are directed essentially perpendicular to the first imaginary longitudinal section plane XZ. As is not least of all also evident from FIGS. 4a, 4b, 5a, 5b, in the example of an embodiment shown here, each of the measuring tubes in each case has a measuring tube peak, defined as the greatest perpendicular distance of the respective measuring tube from the first imaginary longitudinal section plane XZ. Additionally, the tube arrangement shows, as is also directly evident from the combination of FIGS. 4a-6b, an imaginary cross sectional plane XY perpendicular both to the first imaginary longitudinal section plane XZ as well as also to the second imaginary longitudinal section plane YZ. In an advantageous embodiment of the invention, the tube arrangement is additionally embodied in such a manner that a center of mass of the tube arrangement lies in the imaginary cross sectional plane XY, or that the tube arrangement is mirror symmetrical relative to the imaginary cross sectional plane XY, for instance in such a manner that the imaginary cross sectional plane XY intersects each of the measuring tubes in its respective measuring tube peak.

In the example of an embodiment shown here, the eight measuring tubes are advantageously—not least of all also for the purpose of achieving as high an oscillation quality factor for the tube arrangement as possible—additionally embodied in such a manner and arranged in such a manner that the first imaginary longitudinal section plane XZ in each case extends parallel to the fifth, sixth, seventh and eighth measuring tube, and that second imaginary longitudinal section plane YZ in each case extends parallel to the first, second, third and fourth measuring tube. As a result of this, the tube arrangement shows, at least for the above-described case, in which all of the eight measuring tubes are of equal construction to one another and the two imaginary longitudinal section planes XZ, YZ are perpendicular to one another, in projection on the imaginary cross sectional plane XY a silhouette, which, as is also directly recognizable from FIG. 5, essentially corresponds to a foreshortened cross, namely one formed from four equally long cross arms ("Greek cross").

For additional symmetrization of the measuring transducer and, in this respect, also for additional simplifying of its construction, according to an additional embodiment of the invention, the two flow dividers $20_1$, $20_2$ are additionally embodied in such a manner and arranged in the measuring transducer in such a manner that, as is also schematically presented in FIGS. 4a and 4b, an imaginary first connecting axis $Z_1$ of the measuring transducer imaginarily connecting the first flow opening $20_{1A}$ of the first flow divider $20_1$ with the first flow opening $20_{2A}$ of the second flow divider $20_2$ extends parallel to an imaginary second connecting axis $Z_2$ of the measuring transducer imaginarily connecting the second flow opening $20_{1B}$ of the first flow divider $20_1$ with the second flow opening $20_{2B}$ of the second flow divider $20_2$, and that an imaginary third connecting axis $Z_3$ of the measuring transducer imaginarily connecting the third flow opening $20_{1C}$ of the first flow divider $20_4$ with the third flow opening $20_{2C}$ of the second flow divider $20_2$ extends parallel to an imaginary fourth connecting axis $Z_4$ of the measuring transducer imaginarily connecting the fourth flow opening $20_{1C}$ of the first flow divider $20_1$ with the fourth flow opening $20_{2B}$ of the second flow divider $20_2$. Furthermore, the two flow dividers $20_1$, $20_2$ are advantageously additionally also embodied and arranged in the measuring transducer in such a manner that an imaginary fifth connecting axis $Z_5$ of the measuring transducer imaginarily connecting the fifth flow opening $20_{1E}$ of the first flow divider $20_1$ with the fifth flow opening $20_{2E}$ of the second flow divider $20_2$ extends parallel to an imaginary sixth connecting axis $Z_6$ of the measuring transducer imaginarily connecting the sixth flow opening $20_{1F}$ of the first flow divider $20_1$ with the sixth flow opening $20_{2F}$ of the second flow divider $20_2$, and that an imaginary seventh connecting axis $Z_7$ of the measuring transducer imaginarily connecting the seventh flow opening $20_{10}$ of the first flow divider $20_1$ with the seventh flow opening $20_{2G}$ of the second flow divider $20_2$ extends parallel to an imaginary eighth connecting axis $4$ of the measuring transducer imaginarily connecting the eighth flow opening $20_{1H}$ of the first flow divider $20_1$ with the eighth flow opening $20_{2H}$ of the second flow divider $20_2$.

As shown in FIGS. 4a and 4b, the flow dividers are additionally embodied in such a manner and arranged in the measuring transducer in such a manner that the connecting axes $Z_1, Z_2, Z_3, Z_4, Z_5, Z_6, Z_7, Z_8$ of the measuring transducer also are parallel to a principal flow axis L of the measuring transducer essentially aligning with the pipeline and/or coincident with aforementioned line of intersection of the two imaginary longitudinal section planes XZ, YZ of the tube arrangement. Furthermore, the two flow dividers $20_1$, $20_2$ are advantageously also embodied in such a manner and arranged in the measuring transducer in such a manner that a first imaginary longitudinal section plane $XZ_1$ of the measuring transducer, within which its first imaginary connecting axis $Z_1$ and its second imaginary connecting axis $Z_2$ extend, is parallel to a second imaginary longitudinal section plane $XZ_2$ of the measuring transducer, within which its imaginary third connecting axis $Z_3$ and its imaginary fourth connecting axis $Z_4$ extend. Additionally, the two flow dividers $20_1$, $20_2$ can in such case advantageously also be embodied and arranged in the measuring transducer in such a manner that, as a result, also a fifth imaginary longitudinal section plane $XZ_3$ of the measuring transducer, within which its fifth and sixth imaginary connecting axes $Z_5$, and $Z_6$ extend—here in each case parallel to the mentioned principal flow axis of the measuring transducer—, is parallel to a sixth imaginary longitudinal section plane $XZ_4$ of the measuring transducer, within which its imaginary seventh and eighth connecting axes $Z_7$, and $Z_8$ extend, and/or that a seventh imaginary longitudinal section plane $YZ_3$ of the measuring transducer, within which its fifth and seventh imaginary connecting axes $Z_5$, or $Z_7$ extend, is parallel to an eighth imaginary longitudinal section plane $YZ_4$ of the measuring transducer, within which its sixth and eighth imaginary connecting axes $Z_6$, and $Z_8$ extend.

Figure 3A:
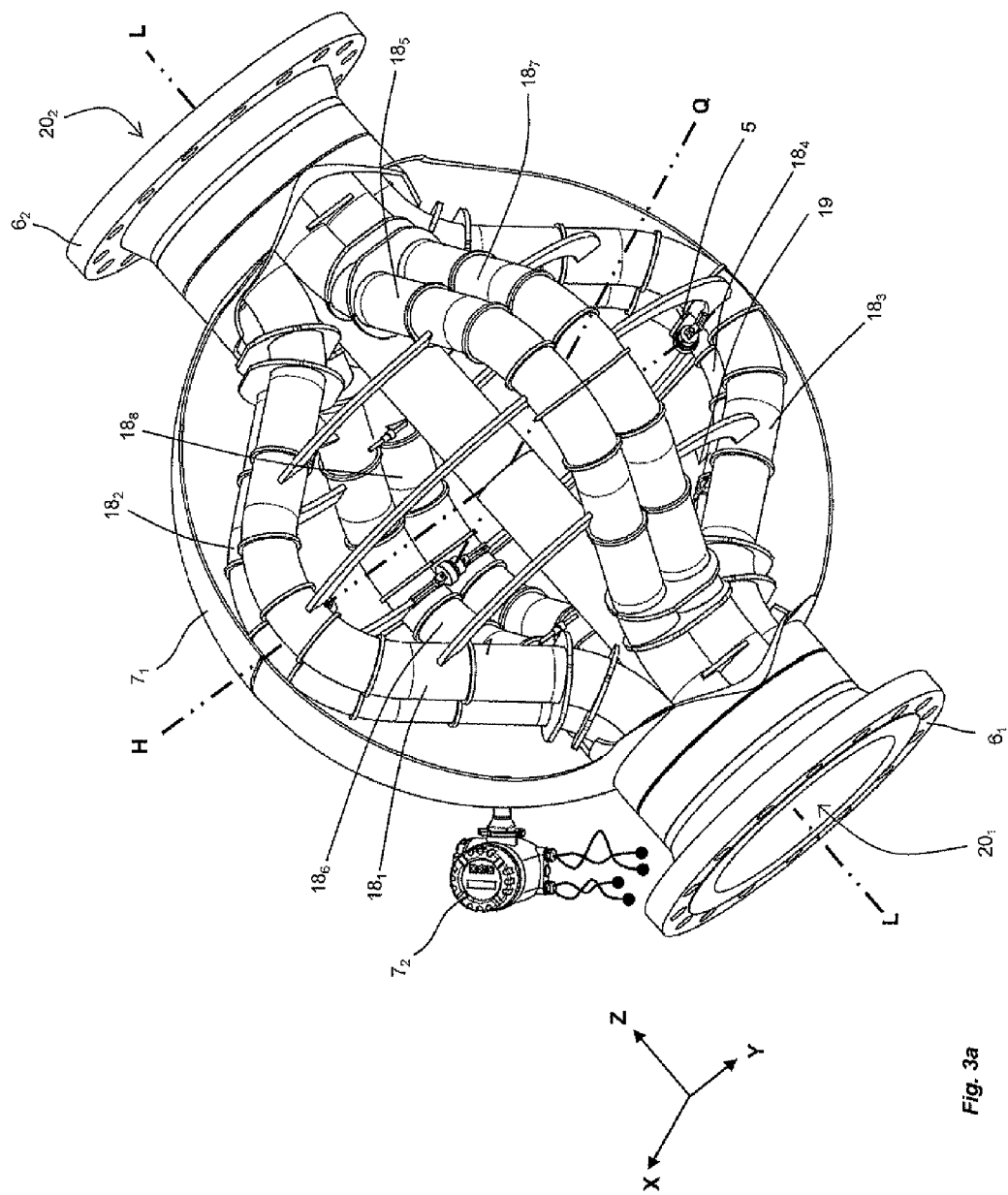
FIG. 3a in perspective side view, a measuring transducer of vibration type with a tube arrangement formed by means of eight bent measuring tubes, installed in an in-line measuring device according to FIG. 1.

Moreover, according to an additional embodiment of the invention, the measuring tubes are additionally embodied in such a manner and arranged in the measuring transducer in such a manner that the imaginary first longitudinal section plane XZ of the tube arrangement—as is, among other things, also evident from the combination of FIGS. 3a and 4a—lies between the aforementioned first imaginary longitudinal section plane $XZ_1$ of the measuring transducer and the aforementioned second imaginary longitudinal section plane $XZ_2$ of the measuring transducer, and, for example, also in such a manner that the first longitudinal section plane XZ of the tube arrangement is parallel to the first and second longitudinal section planes $XZ_1$, $XZ_2$ of the measuring transducer. Additionally, the measuring tubes are embodied and arranged in the measuring transducer in such a manner that likewise also the second imaginary longitudinal section plane YZ of the tube arrangement extends between the third imaginary longitudinal section plane $YZ_1$ of the measuring transducer and the fourth imaginary longitudinal section plane $YZ_2$ of the measuring transducer, for instance in such a manner that the second imaginary longitudinal section plane YZ of the tube arrangement is parallel to the third imaginary longitudinal section plane $YZ_1$ of the measuring transducer and parallel to the fourth imaginary longitudinal section plane $YZ_2$ of the measuring transducer.

In the measuring transducer shown here, whose longitudinal axis L extends within the two imaginary longitudinal section planes XZ, YZ of the tube arrangement, the first imaginary longitudinal section plane XZ of the tube arrangement additionally lies between the fifth and sixth imaginary longitudinal section plane $XZ_3$, $XZ_4$ of the measuring transducer, and, respectively, the second imaginary longitudinal section plane YZ of the tube arrangement lies between the fifth and sixth imaginary longitudinal section plane $YZ_3$, $YZ_4$ of the measuring transducer. Additionally, in such case, the first imaginary longitudinal section plane XZ of the tube arrangement is also parallel to the fifth and sixth imaginary longitudinal section plane $XZ_3$, $XZ_4$ of the measuring transducer, and, respectively, the second imaginary longitudinal section plane YZ of the tube arrangement is parallel to the seventh and eighth imaginary longitudinal section plane $YZ_3$, $YZ_4$ of the measuring transducer. At least for the mentioned case, in which the first imaginary longitudinal section plane XZ in each case extends parallel to the fifth, sixth, seventh and eight measuring tubes, and the second imaginary longitudinal section plane YZ in each case extends parallel to the first, second, third and fourth measuring tubes, as a result, the third imaginary longitudinal section plane $YZ_1$ of the measuring transducer (imaginarily) lengthwise intersects both the first measuring tube as well as also the third measuring tube, the fourth imaginary longitudinal section plane $YZ_2$ of the measuring transducer lengthwise intersects both the second measuring tube as well as also the fourth measuring tube, the fifth imaginary longitudinal section plane $XZ_3$ of the measuring transducer lengthwise intersects both the fifth measuring tube as well as also the sixth measuring tube, and the sixth imaginary longitudinal section plane $XZ_4$ of the measuring transducer lengthwise intersects both the seventh measuring tube as well as also the eighth measuring tube.

In the example of an embodiment shown here, the tube arrangement is, as is directly evident from the combination of FIGS. 4a, 4b, 5a, 5b and 6a, additionally embodied in such a manner and placed in the transducer housing in such a manner that, as a result, not only is the shared line of intersection of the first and second imaginary longitudinal section planes XZ, YZ of the tube arrangement parallel to or coincident with the longitudinal axis L, but also a shared line of intersection of the first longitudinal section plane XZ and the cross sectional plane XY is parallel to or coincident with an imaginary transverse axis Q of the measuring transducer perpendicular to the longitudinal axis L, and a shared line of intersection of the second longitudinal section plane YZ and the cross sectional plane XY is parallel to or coincident with an imaginary vertical axis H of the measuring transducer perpendicular to the longitudinal axis L.

In an additional advantageous embodiment of the invention, the flow openings of the first flow divider $20_1$ are additionally arranged in such a manner that those imaginary areal center of gravity, which belong to the—here circularly shaped—cross sectional areas of the flow openings of the first flow divider form the vertices of an imaginary regular octagon, wherein said cross sectional areas, in turn, can lie in a shared imaginary cross sectional plane of the first flow divider extending perpendicular to a longitudinal axis L of the measuring transducer,—, for example, a longitudinal axis L extending within the first longitudinal section plane XZ of the tube arrangement or parallel to or even coincident with the mentioned principal flow axis of the measuring transducer— or also perpendicular to the longitudinal section planes of the measuring transducer. Additionally, the flow openings of the second flow divider $20_2$ are also arranged in such a manner that imaginary areal centers of gravity associated with—here likewise circularly shaped—cross sectional areas of the flow openings of the second flow divider $20_2$ form the vertices of an imaginary regular octagon, wherein said cross sectional areas, in turn, can lie in a shared imaginary cross sectional plane of the second flow divider extending perpendicular to the mentioned main flow axis or also longitudinal axis L of the measuring transducer, or perpendicular to the longitudinal section planes of the measuring transducer. As a result of this, also the first, second, fourth and fifth longitudinal section planes of the measuring transducer thus in each case extend parallel to one another. Equally parallel to one another are thus also the third, fourth, seventh and eighth longitudinal section planes of the measuring transducer.

In an additional embodiment of the invention, the measuring tubes are bent in such a manner and arranged in the measuring transducer in such a manner that a caliber to height ratio $D_{18}/Q_{18}$ of the tube arrangement, defined by a ratio of a caliber, $D_{18}$, of the first measuring tube to a maximal lateral expanse, $Q_{18}$, of the tube arrangement, measured from a peak of the first measuring tube to a peak of the third measuring tube, or measured from a peak of the second measuring tube to a peak of the fourth measuring tube, amounts to more than 0.05, especially more than 0.07 and/or less than 0.5, especially less than 0.4.

As already previously mentioned, in the case of the measuring transducer 11, the reaction forces required for the measuring are effected in the respective medium to be measured by (for example, simultaneously) causing the eight measuring tubes $18_1$, $18_2$, $18_3$, $18_4$, $18_5$, $18_6$, $18_7$, $18_8$ to oscillate in an actively excited, oscillatory mode, the so-called wanted mode. For exciting oscillations of the measuring tubes, not least of all also those in the wanted mode, the measuring transducer additionally comprises an exciter mechanism 5 formed by means of at least one electro-mechanical—for example, electro-dynamic—oscillation exciter acting directly, especially differentially, on at least two of the measuring tubes, wherein the exciter mechanism 5 serves to cause each of the measuring tubes operationally, at least at times, to execute oscillations, especially bending oscillations, in the wanted mode, these oscillations being in each case suitable for the particular measuring, and having oscillation amplitudes in each case sufficiently large for producing and registering the above named reaction forces in the medium. The at least one oscillation exciter, and consequently the exciter mechanism formed therewith, thus serves, in such case, to convert especially an electrical excitation power $P_{exc}$ fed in from the transmitter electronics—for instance, by means of at least one electrical driver signal—into such exciter forces $F_{exc}$, e.g. pulsating or harmonic exciter forces $F_{exc}$, which act as close to simultaneously as possible, and uniformly but in opposite directions on at least two of the measuring tubes—for instance, the first and second measuring tubes—and, in given cases, are also further mechanically coupled from the two measuring tubes to the other two measuring tubes, and thus effect oscillations in the wanted mode. The exciter forces $F_{exo}$—generated by converting electrical excitation power $P_{exc}$ fed into the exciter mechanism—can be adjusted as regards their amplitude in the manner known to those skilled in the art, e.g. by means of an operating circuit provided in the transmitter electronics 12 and ultimately delivering the driver signal, for instance, by means of electrical current controllers and/or voltage controllers implemented in the operating circuit, and can be adjusted as regards their frequency, for example, by means of a phase control loop (PLL) likewise provided in the operating circuit; compare for this, for example, also U.S. Pat. Nos. 4,801,897 or 6,311,136, In an additional embodiment of the invention, it is, consequently, additionally provided that, for generating the required exciter forces, the transmitter electronics feeds electrical excitation power into the exciter mechanism by means of at least one electrical driver signal, which is supplied to the oscillation exciter and consequently the exciter mechanism, for example, via connecting lines, and/or which is, at least at times, periodic, and which is variable with at least one signal frequency corresponding to a resonance frequency of a natural mode of oscillation of the tube arrangement. For example, the at least one driver signal can also have a plurality of signal components with signal frequencies differing from one another, of which at least one signal component—for instance, one dominating as regards a signal power—has a signal frequency corresponding to a resonance frequency of a natural mode of oscillation of the tube arrangement, in which each of the measuring tubes executes bending oscillations. Moreover, it can additionally be advantageous—for instance, for the purpose of matching the fed-in excitation power to that actually instantaneously necessary for a sufficient oscillation amplitude—to embody the at least one driver signal so as to be variable as regards a maximal voltage level (voltage amplitude) and/or a maximal electrical current level (electrical current amplitude)—for instance, in such a manner that, for example, the cylindrical coil of the at least one oscillation exciter is flowed through by an exciter current driven by a variable exciter voltage provided by means of said driver signal.

The goal of the active exciting of the measuring tubes to oscillations is especially—not least of all also for the case, in which the measuring system ultimately formed by means of the measuring transducer should be used for measuring the mass flow—to induce by means of the measuring tubes vibrating in the wanted mode sufficiently strong Coriolis forces in the medium flowing through, that, as a result, an additional deformation of each of the measuring tubes, and consequently one corresponding to a higher order oscillatory mode of the tube arrangement—the so-called Coriolis mode—can be effected with oscillation amplitudes sufficient for the measuring. For example, the measuring tubes $18_1$, $18_2$, $18_3$, $18_4$ can be excited by means of the electro-mechanical exciter mechanism held thereon to execute bending oscillations, especially simultaneous bending oscillations, especially at an instantaneous mechanical resonance frequency of the tube arrangement formed by means of the eight measuring tubes $18_1$, $18_2$, $18_3$, $18_4$, $18_5$, $18_6$, $18_7$, $18_8$, in the case of which they are—at least predominantly—laterally deflected, and, as directly evident for those skilled in the art from the combination of FIGS. 3a, 3b, 6a, 6b, 6c, are caused to oscillate pairwise essentially opposite-equally to one another. This especially occurs in such a manner that vibrations executed at the same time during operation by each of the eight measuring tubes are, at least at times, and/or at least partially in each case embodied as bending oscillations about an imaginary oscillatory axis connecting the first and the respective associated second measuring tube ends of the respective measuring tube and in each case lying parallel to the mentioned connecting axes $Z_1$, $Z_2$, $Z_3$, $Z_4$, $Z_5$, $Z_6$, $Z_7$, $Z_8$, wherein the oscillatory axes shown in the example of an embodiment here are likewise parallel to one another, as well as also to the imaginary longitudinal axis L of the entire measuring transducer connecting the two flow dividers imaginarily and extending through a center of mass of the measuring transducer. In other words, the measuring tubes, as is quite usual in the case of measuring transducers of vibration type with one or more bent measuring tubes, can, in each case, be caused to oscillate at least sectionally in the manner of cantilever clamped at one end, and consequently thus can execute cantilever bending oscillations about an imaginary oscillation axis in each case parallel to at least two of the imaginary connecting axes $Z_1$, $Z_2$, $Z_3$, $Z_4$, $Z_5$, $Z_6$, $Z_7$, $Z_8$.

Figure 6A:
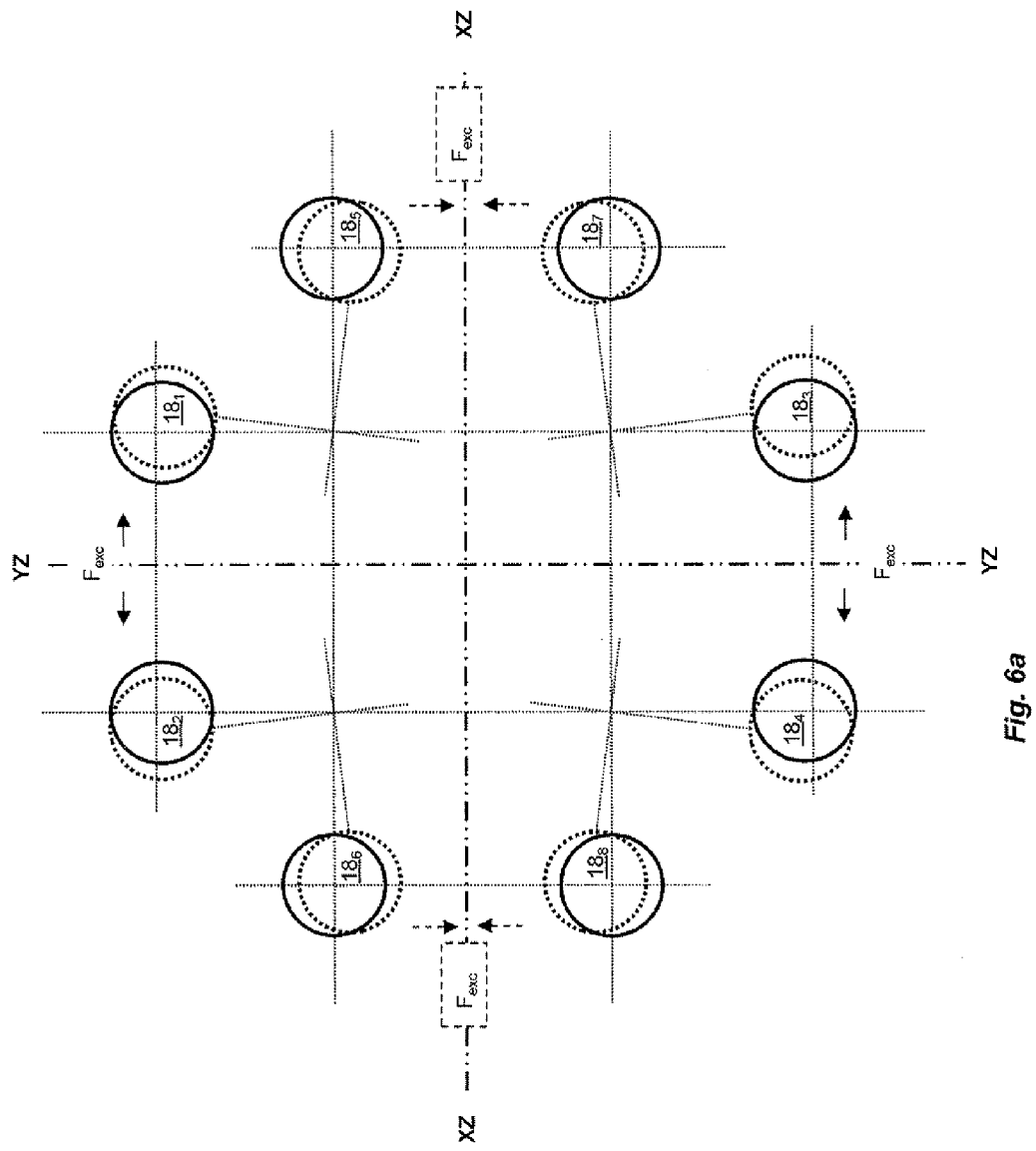
FIGS. 6a, b, c schematically, oscillation modes of a tube arrangement of FIG. 3b, in each case in projection onto an imaginary cross sectional plane of said tube arrangement.
Figure 6B:
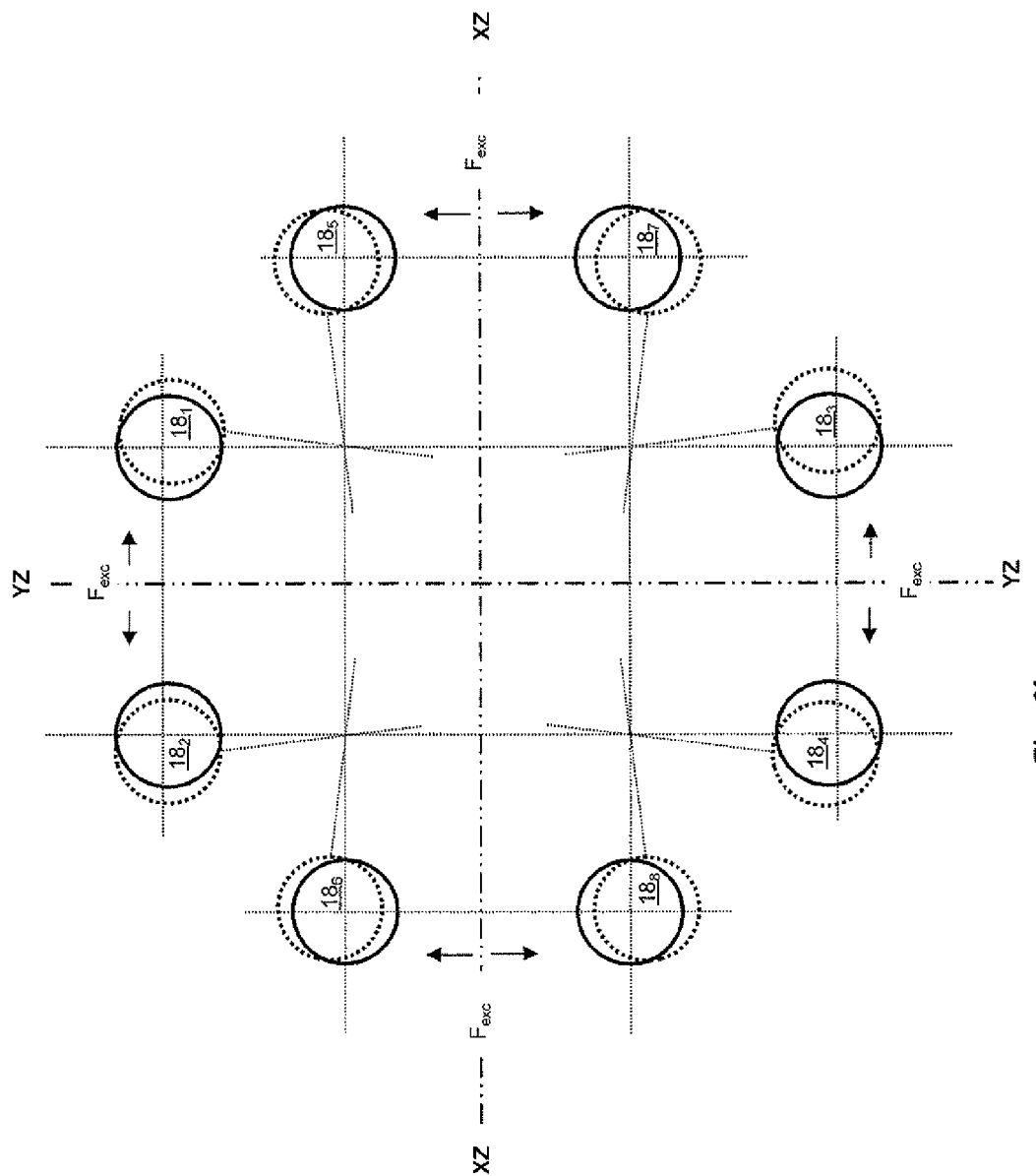
Figure 6C:
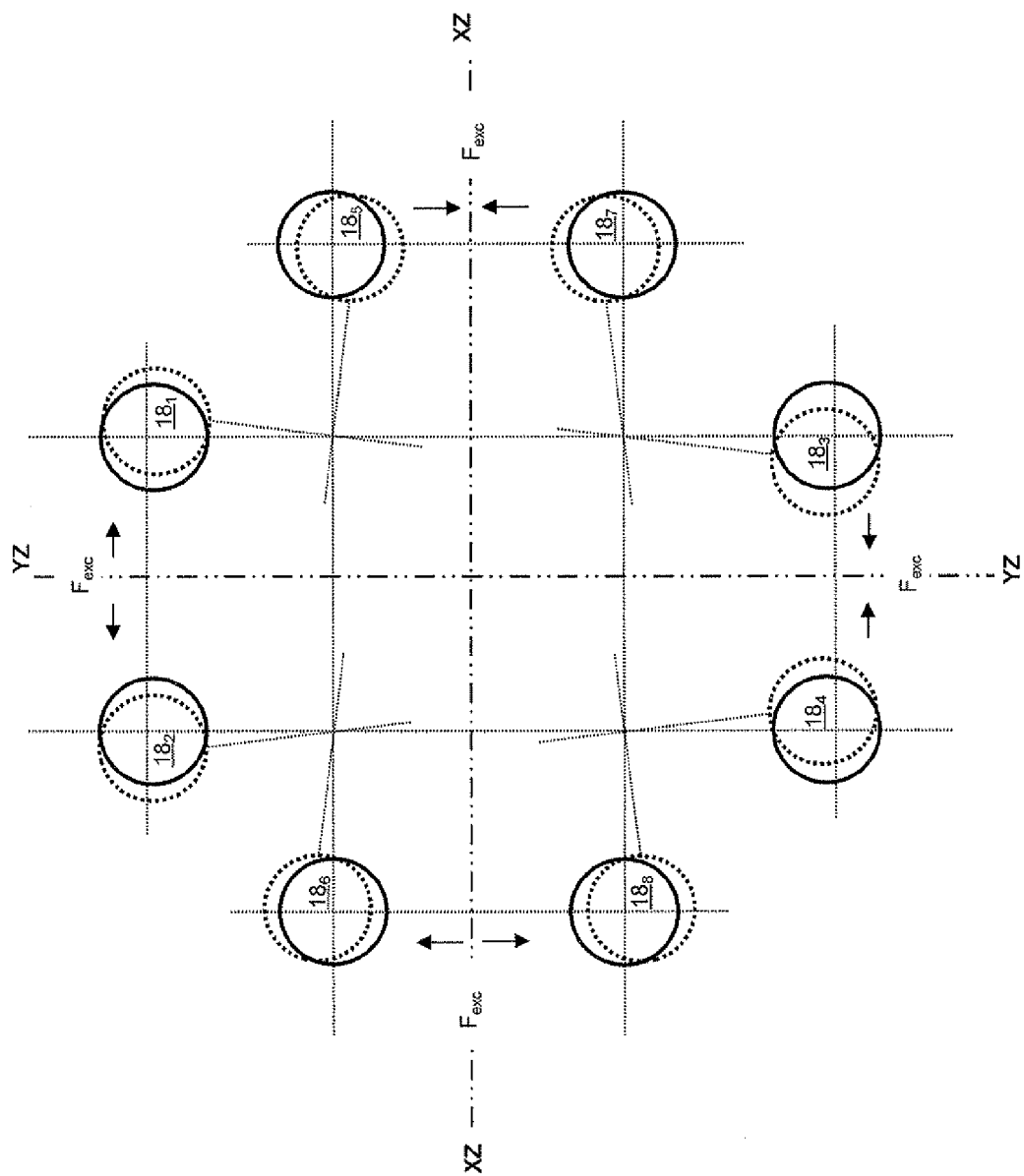

Suitable for the wanted mode—not least of all also usable for generating Coriolis forces in the medium flowing through the measuring tubes—in the case of the tube arrangement of the measuring transducer of the invention, are especially such natural oscillation modes inherent to the tube arrangement, wherein, in these oscillation modes, as is also schematically presented in FIGS. 6a, 6b, 6c for a cross section parallel to the imaginary cross sectional plane XY, both the first measuring tube and the third measuring tube execute bending oscillations which are opposite-equal relative to the first imaginary longitudinal section plane XZ, in each case about a static resting position associated with the respective measuring tube, and the second measuring tube and the fourth measuring tube execute or can execute bending oscillations which are opposite-equal relative to the first imaginary longitudinal section plane, in each case about a static resting position associated with the respective measuring tube; and/or wherein, in these oscillation modes, both the fifth measuring tube and the seventh measuring tube execute or can execute bending oscillations which are opposite-equal relative to the first imaginary longitudinal section plane XZ, in each case about a static resting position associated with the respective measuring tube, and the sixth measuring tube and the eighth measuring tube bending oscillations which are opposite-equal relative to the first imaginary longitudinal section plane XZ, in each case about a static resting position associated with the respective measuring tube; and/or wherein, in these oscillation modes, the first measuring tube and the fifth measuring tube execute or can execute bending oscillations synchronously—namely of equal phase at least in the imaginary cross sectional plane XY—in each case about a static resting position associated with the respective measuring tube, the second measuring tube and the sixth measuring tube execute or can execute bending oscillations synchronously in each case about a static resting position associated with the respective measuring tube, third measuring tube and the seventh measuring tube execute or can execute bending oscillations synchronously in each case about a static resting position associated with the respective measuring tube, and the fourth measuring tube and the eighth measuring tube execute or can execute bending oscillations synchronously in each case about a static resting position associated with the respective measuring tube.

In an embodiment of the invention, the exciter mechanism is additionally embodied in such a manner that the first measuring tube $18_1$ and the second measuring tube $18_2$ are excitable to execute bending oscillations, which are opposite-equal relative to the second imaginary longitudinal section plane YZ and especially also symmetric relative to the second imaginary longitudinal section plane YZ, and the third measuring tube $18_3$ and the fourth measuring tube $18_4$ are excitable to execute bending oscillations, which are opposite-equal relative to the second imaginary longitudinal section plane YZ, and especially also symmetric relative to the second imaginary longitudinal section plane YZ. Alternatively thereto or in supplementation thereof, according to an additional embodiment of the invention, the exciter mechanism additionally is embodied in such a manner that therewith, the first measuring tube $18_1$ and the third measuring tube $18_3$ are excitable to execute bending oscillations, which are opposite-equal relative to the first imaginary longitudinal section plane XZ and, for example, also symmetric relative to the first imaginary longitudinal section plane XZ, and the second measuring tube $18_2$ and the fourth measuring tube $18_4$ are excitable to execute bending oscillations which are opposite-equal relative to the first imaginary longitudinal section plane XZ and, for example, symmetric relative to the first imaginary longitudinal section plane XZ. Additionally, according to an embodiment of the invention, the exciter mechanism is also set up so as to excite the fifth measuring tube $18_5$ and the seventh measuring tube $18_7$ to execute bending oscillations, which are opposite-equal relative to the first imaginary longitudinal section plane XZ and, for example, also symmetric relative to the first imaginary longitudinal section plane XZ, as well as to excite the sixth measuring tube $18_6$ and the eighth measuring tube $18_8$ to execute bending oscillations which are opposite-equal relative to the first imaginary longitudinal section plane XZ and, for example, symmetric relative to the first imaginary longitudinal section plane XZ. Additionally, the exciter mechanism 5 can additionally also be set up in such a manner so as to excite the fifth measuring tube $18_5$ and the sixth measuring tube $18_6$ to execute bending oscillations which are opposite-equal relative to the second imaginary longitudinal section plane YZ and, for example, also symmetric relative to the second imaginary longitudinal section plane YZ, as well as to excite the seventh measuring tube $18_7$ and the eighth measuring tube $18_8$ to execute bending oscillations, which are opposite-equal relative to the second imaginary longitudinal section plane YZ and, for example, symmetric to relative to the second imaginary longitudinal section plane YZ.

In an additional embodiment of the invention, by means of the exciter mechanism 5, the eight measuring tubes are excited during operation in the wanted mode additionally at least partially and especially predominantly to execute bending oscillations, which have a bending oscillation frequency, which is, for instance, equal to an instantaneous mechanical resonance frequency of the tube arrangement comprising the eight measuring tubes, and consequently corresponds to an instantaneous resonance frequency of an oscillatory mode of the tube arrangement, or which at least lies in the vicinity of such an eigenfrequency or resonance frequency. As is known, the instantaneous mechanical resonance frequencies of bending oscillations are to a special degree dependent on the size, shape and material of the measuring tubes, as well as also on an instantaneous density of the medium flowing through the measuring tubes, and can, in this respect, be variable during operation of the measuring transducer within a wanted frequency band of quite some kilohertz in width. In the case of exciting the measuring tubes to an instantaneous resonance frequency, thus, on the one hand, based on the instantaneously excited oscillation frequency, an average density of the medium instantaneous flowing through the measuring tubes can be easily ascertained. On the other hand, the electrical power instantaneously required for the maintaining the oscillations excited in the wanted mode can thus also be minimized. The eight measuring tubes, driven by the exciter mechanism, are especially, at least at times, additionally caused to oscillate with essentially equal oscillation frequency, especially in each case with one and the same frequency, and in this respect a shared, natural, mechanical resonance frequency. Advantageously, the oscillatory behavior of the tube arrangement formed by means of the eight measuring tubes $18_1$, $18_2$, $18_3$, $18_4$, $18_5$, $18_6$, $18_7$, $18_8$, as well as also the driver signals controlling the exciter mechanism are additionally matched to one another in such a manner that at least the oscillations of the measuring tubes excited in the wanted mode are embodied in such a manner that the first and the second measuring tubes $18_1$, $18_2$ oscillate—for instance, in the manner of two tuning fork tines—essentially opposite-equally to one another, namely at least in the imaginary cross sectional plane XY with an opposing phase shift of, for instance, 180°, and consequently oscillate in opposite phase, and also the third and the fourth measuring tubes $18_3$, $18_4$, as well as also the fifth and the seventh measuring tube $18_5$, $18_7$, or the sixth and the eighth measuring tubes $18_5$, $18_8$ likewise in each case oscillate essentially opposite-equally to one another.

Further investigations with measuring systems with a measuring transducer of the type being discussed have additionally shown that suitable as the wanted mode, not least of all also for ascertaining the mass flow rate as well as the density of the medium conveyed in the measuring transducer, is especially that natural oscillatory mode inherent to the tube arrangement, additionally referred to as the oscillatory mode of first type, in which—as is schematically presented in FIG. 6a for two oscillatory phases—the first measuring tube and the second measuring tube execute bending oscillations which are opposite-equal relative to the second imaginary longitudinal section plane YZ, in each case about a static resting position associated with the respective measuring tube, the third measuring tube and the fourth measuring tube execute bending oscillations which are opposite-equal relative to the second imaginary longitudinal section plane, in each case about a static resting position associated with the respective measuring tube, the fifth measuring tube and the seventh measuring tube execute opposite-equal bending oscillations, in each case about a static resting position associated with the respective measuring tube, and the sixth measuring tube and the eighth measuring tube execute opposite-equal bending oscillations, in each case about a static resting position associated with the respective measuring tube. This especially occurs in such a manner that, on the one hand, relative to the first imaginary longitudinal section plane XZ, both said bending oscillations of the first measuring tube are opposite-equal to said bending oscillations of the third measuring tube and said bending oscillations of the second measuring tube are opposite-equal to said bending oscillations of the fourth measuring tube, and that, relative to the second imaginary longitudinal section plane YZ, both said bending oscillations of the fifth measuring tube are opposite-equal to said bending oscillations of the sixth measuring tube and said bending oscillations of the seventh measuring tube are opposite-equal to said bending oscillations of the eighth measuring tube, and that, on the other hand, as is also evident from FIG. 6a, the bending oscillations of the first measuring tube are in the common mode, namely at least equal phase in the imaginary cross sectional plane XY, with the bending oscillations of the fifth measuring tube, the bending oscillations of the second measuring tube are synchronously with the bending oscillations of the sixth measuring tube, the bending oscillations of the third measuring tube are synchronously with the bending oscillations of the seventh measuring tube, and the bending oscillations of the fourth measuring tube are synchronously with the bending oscillations of the eighth measuring tube.

The special suitability of the aforementioned mode of oscillation of first type as the wanted mode for measuring transducers with eight bent measuring tubes could, in such case, not least of all also be attributed to the resulting stress distribution in the measuring transducer, which is in such case as a whole very favorable for the oscillatory behavior of the measuring transducer—viewed both spatially as well as also with respect to time—not least of all also the stress distribution in the region of the two flow dividers, as well as also to the equally favorable, and consequently very small oscillation-related deformations of the measuring transducer in general, as well as the flow dividers especially. Moreover, said oscillatory mode, as regards its eigenfrequency, can be separated comparatively simply from all other oscillation modes equally inherent to the tube arrangement.

Besides the aforementioned oscillatory mode, the tube arrangement additionally also shows a natural oscillatory mode of second type, in which—as schematically presented in FIG. 6b for two oscillatory phases—the first measuring tube and the second measuring tube execute bending oscillations which are opposite-equal relative to the second imaginary longitudinal section plane YZ, and the third measuring tube and the fourth measuring tube execute bending oscillations which are opposite-equal relative to the second imaginary longitudinal section plane YZ, or the fifth measuring tube and the seventh measuring tube execute bending oscillations which are opposite-equal relative to the first imaginary longitudinal section plane XZ, and the sixth measuring tube and the eighth measuring tube in turn execute bending oscillations which are opposite-equal relative to the first imaginary longitudinal section plane XZ, in each case around a respective associated static resting position, and consequently also, relative to the first imaginary longitudinal section plane XZ, both said bending oscillations of the first measuring tube are opposite-equal to said bending oscillations of the third measuring tube, and said bending oscillations of the second measuring tube are opposite-equal to said bending oscillations of the fourth measuring tube, and also, relative to the second imaginary longitudinal section plane YZ, both said bending oscillations of the fifth measuring tube are opposite-equal to said bending oscillations of the sixth measuring tube and said bending oscillations of the seventh measuring tube are opposite-equal to said bending oscillations of the eighth measuring tube.

This is in contrast to the bending oscillations in the aforementioned oscillatory mode of first type, however, in the manner, that—as is also shown in FIG. 6b —the bending oscillations of the first measuring tube are opposite-equal, and consequently in opposite phase, to execute bending oscillations of the fifth measuring tube, the bending oscillations of the second measuring tube are opposite-equal to the bending oscillations of the sixth measuring tube, the bending oscillations of the third measuring tube are opposite-equal to the bending oscillations of the seventh measuring tube, and the bending oscillations of the fourth measuring tube are opposite-equal to the bending oscillations of the eighth measuring tube.

In order to assure a separate, and not least of all also defined exciting of the mode of oscillation of first type and/or of the mode of oscillation of second type across as broad an operating range of the measuring transducer as possible—influenced, among other things, also by densities, mass flow rates, temperature distributions in the measuring transducer, etc. fluctuating during operation—according to an additional embodiment of the invention, the tube arrangement formed by means of the eight measuring tubes, and consequently the measuring transducer formed therewith, is dimensioned in such a manner that an eigenfrequency $f_{18-I}$—for example, an eigenfrequency measurable in the case of a tube arrangement only filled with air—of the oscillatory mode of first type is different from an eigenfrequency $f_{18-II}$ of the oscillatory mode of second type, especially one measurable in the case of a tube arrangement filled only with air or measurable at the same time as the eigenfrequency $f_{18-I}$ of the oscillatory mode of first type, for example in such a manner that the eigenfrequencies $f_{18-I}$; $f_{18-II}$ of the two aforementioned oscillation modes deviate from one another by 10 Hz or more. Especially not least of all also for the case of large nominal diameters of more than 150 mm, the tube arrangement is embodied in such a manner that, said eigenfrequency $f_{18-I}$ of the oscillatory mode of first type is more than 10 Hz greater than said eigenfrequency $f_{18-II}$ of the oscillatory mode of second type. Advantageously, said eigenfrequency, $f_{18-II}$ of the oscillatory mode of first type is additionally set in such a manner that it is different from each eigenfrequency—for instance, measurable in the case of a tube arrangement filled only with air, or measurable at the same time as eigenfrequency $f_{18-I}$ of the oscillatory mode of first type—of each other mode of oscillation inherent to the tube arrangement but differing from the oscillatory mode of first type, for example, deviating by more than 10 Hz.

According to an additional embodiment of the invention, the exciter mechanism is, consequently, embodied in such a manner that therewith, the first measuring tube $18_1$ and the second measuring tube $18_2$ are excitable during operation to opposite-equal bending oscillations, and the third measuring tube $18_3$ and the fourth measuring tube $18_4$ are excitable during operation opposite-equal bending oscillations, especially also bending oscillations corresponding to the oscillatory mode of first type at their instantaneous resonance frequency $f_{18-I}$, or bending oscillations corresponding to the oscillatory mode of second type at their instantaneous resonance frequency $f_{18-I}$, the latter bending oscillations, in given cases, also being simultaneous with the bending oscillations corresponding to the oscillatory mode of first type.

In an additional embodiment of the invention, the exciter mechanism 5, not least of all also for the purpose of exciting opposite-equal bending oscillations of the first and second measuring tube and/or of the third and fourth measuring tube, is formed by means of a first oscillation exciter $5_1$, especially one acting differentially on the first measuring tube $18_1$ and the second measuring tube $18_2$. Additionally, it is provided that, serving as the first oscillation exciter $5_1$ is an oscillation exciter of electrodynamic type acting especially differentially on at least two—here, in each case, exactly two—of the measuring tubes.

Accordingly, the first oscillation exciter $5_1$ is additionally formed by means of a permanent magnet held on the first measuring tube and a cylindrical coil held on the second measuring tube and permeated by the magnetic field of the permanent magnet, especially in the manner of a coil plunging arrangement, in the case of which the cylindrical coil is arranged coaxially to the permanent magnet and the latter is embodied as a plunging armature moved within the coil.

For the purpose of increasing the efficiency of the exciter mechanism, or for the purpose of increasing the exciter forces generated therewith in the case of at the same time as symmetric a construction as possible, according to a further development of the invention, the exciter mechanism additionally comprises a second oscillation exciter $5_2$, especially an electrodynamic second oscillation exciter $5_2$ and/or one acting differentially on the third measuring tube $18_3$ and the fourth measuring tube $18_4$. The second oscillation exciter $5_2$ is advantageously embodied with equal construction to the first oscillation exciter $5_1$, at least insofar as it works analogously to the latter's principle of action; for example, is likewise of electrodynamic type. In an additional embodiment, the second oscillation exciter $5_2$, is, consequently, formed by means of a permanent magnet held on the third measuring tube and a cylindrical coil held on the fourth measuring tube and permeated by the magnetic field of the permanent magnet. The two oscillation exciters $5_1$, $5_2$ of the exciter mechanism 5 can advantageously be electrically interconnected in series, especially in such a manner that a common driver signal excites common and consequently simultaneous oscillations of the measuring tubes $18_1$, $18_3$, $18_2$, $18_4$, for instance, bending oscillations in the oscillatory mode of first type or second type. Particularly for the earlier mentioned case, in which both bending oscillations in the oscillatory mode of first type as well as also bending oscillations in the oscillatory mode of second type should actively be excited by means of the two oscillation exciters $5_1$, $5_2$, it can be of advantage to dimension the oscillation exciters $5_1$, $5_2$ in such a manner and to apply them on the tube arrangement in such a manner that, as a result, a transmission factor of the first oscillation exciter $5_1$, defined by a ratio of electrical excitation power fed therein to an exciter force produced therewith and effecting oscillations of the measuring tubes, at least within a frequency band comprising the oscillatory mode of first type and the oscillatory mode of second type, is different from a transmission factor of the second oscillation exciter $5_1$, defined by a ratio of electrical excitation power fed therein to an exciter force produced therewith and effecting oscillations of the measuring tubes, for instance in such a manner that said transmission factors deviate from one another by 10% or more. This enables, for example, also a separated exciting of the mode of oscillation of the first or second type, not least of all also in the case of serial switching of the two oscillation exciters $5_1$, $5_2$ and/or supplying of the two oscillation exciters $5_1$, $5_2$ with a single shared driver signal, and can, in the case of electrodynamic oscillation exciters $5_1$, $5_2$ be achieved, for example, in a very simple manner by application of cylindrical coils with different impedances, or different numbers of turns and/or of permanent magnets which are differently dimensioned or composed of different magnetic materials. It should at this point additionally be mentioned, that, although the oscillation exciter or oscillation exciters of the exciter mechanism shown in the example of an embodiment in each case act for instance centrally on the respective measuring tubes, alternatively or in supplementation, oscillation exciters instead acting on the particular measuring tube on the inlet side and on the outlet side can also be used, for instance, in the manner of the exciter mechanisms proposed in U.S. Pat. Nos. 4,823,614, 4,831,885, or US-A2003/0070495.

For the purpose of an additional improving of the effect of the exciter mechanism, according to an additional embodiment of the invention, the exciter mechanism is additionally also formed by means of a third oscillation exciter $5_3$ serving for conversion of electrical excitation power fed into the exciter mechanism by means of the transmitter electronics into mechanical exciter forces effecting bending oscillations of the measuring tubes, for example, a third oscillation exciter $5_3$ which acts differentially on the fifth and seventh measuring tube, which is electro-dynamic and which is constructed equally to the first oscillation exciter, or the exciter mechanism is formed by means of a fourth oscillation exciter $5_4$, which, for example, acts differentially on the sixth and eighth measuring tube, is electro-dynamic and is constructed equally to the first oscillation exciter. Also the third and fourth oscillation exciters can, like the first oscillation exciter, be formed by means of a permanent magnet held on one of the measuring tubes and a cylindrical coil held on the other, oppositely lying measuring tube and permeated by the magnetic field of the permanent magnet, or they can also be electrically interconnected in series with one another and/or with the first oscillation exciter.

As evident from each of FIGS. 3a, 3b, 4a, 4b, 4c, 4d, or 5, and as is usual in the case of measuring transducers of the type being discussed, additionally provided in the measuring transducer 11 is a sensor arrangement 19 reacting to vibrations—especially inlet-side or outlet-side vibrations, especially bending oscillations excited by means of the exciter mechanism 5—of the measuring tubes, for example, an electro-dynamic, sensor arrangement 19, which serves for producing oscillation signals representing vibrations, especially bending oscillations, of the measuring tubes, which are, for example, co-influenced as regards a frequency, a signal amplitude and/or a phase relationship—relative to one another and/or relative to the driver signal—by the measured variable to be registered, such as, for instance, the mass flow rate and/or the density or a viscosity of the medium.

In an additional embodiment of the invention, the sensor arrangement is formed by means of a inlet-side, first oscillation sensor $19_1$, especially an electrodynamic first oscillation sensor $19_1$ and/or one differentially registering at least oscillations of the first measuring tube $18_1$ relative to the second measuring tube $18_2$, as well as by means of an outlet-side, second oscillation sensor $19_2$, especially an electrodynamic second oscillation sensor $19_2$, and/or one differentially registering at least oscillations of the first measuring tube $18_1$ relative to the second measuring tube $18_2$, wherein both oscillation sensors, in each case reacting to movements of the measuring tubes $18_1$, $18_2$, $18_3$, $18_4$, especially their lateral deflections and/or deformations, deliver a first or second oscillatory signal, respectively. This especially occurs in the manner, that at least two of the oscillation signals delivered by the sensor arrangement 19 have a mutual phase shift, which corresponds with the instantaneous mass flow rate of the medium flowing through the measuring tubes or is dependent thereon, as well as in each case have a signal frequency, which is dependent on an instantaneous density of the medium flowing in the measuring tubes. For this, the two oscillation sensors $19_1$, $19_2$, which are, for example, constructed equally to one another, can—as is quite usual in the case of measuring transducers of the type being discussed—be placed in the measuring transducer 11 essentially equidistant from the first oscillation exciter $5_1$. Moreover, the oscillation sensors of the sensor arrangement 19 can be embodied so as to be of equal construction to the at least one oscillation exciter of the exciter mechanism 5, at least insofar as they work analogously to its principle of action; for example, are likewise of electrodynamic type. In a further development of the invention, the sensor arrangement 19 is additionally also formed by means of an inlet-side, third oscillation sensor $19_3$ especially an electrodynamic third oscillation sensor $19_3$ and/or one differentially registering oscillations of the third measuring tube $18_3$ relative to the fourth measuring tube $18_4$, as well as by means of an outlet-side, fourth oscillation sensor $19_4$, especially an electrodynamic fourth oscillation sensor $19_4$ and/or one differentially registering oscillations of the third measuring tube $18_3$ relative to the fourth measuring tube $18_4$. For additional improving of the signal quality, as well as also for simplifying the transmitter electronics 12 receiving the measurement signals, the first and third oscillation sensors $19_1$, $19_3$ can furthermore be electrically interconnected in series, for example in such a manner that a common oscillatory signal represents shared inlet-side oscillations of the first and third measuring tube $18_1$, $18_3$ relative to the second and fourth measuring tube $18_2$, $18_4$. Alternatively or in supplementation, also the second and fourth oscillation sensor $19_2$, $19_4$ can be electrically interconnected in series in such a manner that a common oscillatory signal of both oscillation sensors $19_2$, $19_4$ represents shared outlet-side oscillations of the first and third measuring tubes $18_1$, $18_3$ relative to the second and fourth measuring tubes $18_2$, $18_4$.

According to an additional embodiment of the invention, for the purpose of further improving the quality of the oscillation signals delivered by the sensor arrangement 19, sensor arrangement 19 is additionally formed by means of an inlet-side, fifth oscillation sensor $19_5$—for example, an electrodynamic fifth oscillation sensor $19_5$ and/or one differentially registering oscillations of the fifth measuring tube $18_5$ relative to the sixth measuring tube $18_6$ and/or electrically connected in series with the first oscillation sensor $19_1$—as well as by means of an outlet-side, sixth oscillation sensor $19_6$, for example, an electrodynamic sixth oscillation sensor $19_6$ and/or one differentially registering oscillations of the fifth measuring tube $18_5$ relative to the sixth measuring tube $18_6$ and/or electrically connected in series with the second oscillation sensor $19_2$. In supplementation, the sensor arrangement 19 can advantageously furthermore be additionally formed by means of an inlet-side, seventh oscillation sensor $19_7$—for example, an electrodynamic seventh oscillation sensor $19_7$ and/or one differentially registering oscillations of the seventh measuring tube $18_7$ relative to the eighth measuring tube $18_8$ and/or electrically connected in series with the first oscillation sensor $19_1$—as well as by means of an outlet-side, eighth oscillation sensor $19_8$, for example, an electrodynamic eighth oscillation sensor $19_8$ and/or one differentially registering oscillations of the seventh measuring tube $18_7$ relative to the eighth measuring tube $18_8$ and/or electrically connected in series with the second oscillation sensor $19_2$.

For the aforementioned case, in which the oscillation sensors of the sensor arrangement 19—which are especially constructed equally to one another—should register oscillations of the measuring tubes differentially and electrodynamically, the first oscillation sensor $19_1$ is formed by means of a permanent magnet held on the first measuring tube—here in the region of oscillations to be registered on the inlet side—and a cylindrical coil held on the second measuring tube—here likewise correspondingly in the region of oscillations to be registered on the inlet side—and permeated by the magnetic field of the permanent magnet, and the second oscillation sensor $19_2$ is formed by means of a permanent magnet held on the first measuring tube—in the region of oscillations to be registered on the outlet side—and a cylindrical coil held on the second measuring tube—here likewise correspondingly in the region of oscillations to be registered on the outlet side—and permeated by the magnetic field of the permanent magnet. Equally, also the third oscillation sensor $19_3$, in given cases, provided can additionally correspondingly be formed by means of a permanent magnet held on the third measuring tube and a cylindrical coil held on the fourth measuring tube and permeated by the magnetic field of the permanent magnet, and the fourth oscillation sensor $19_4$, in given cases, provided can be formed by means of a permanent magnet held on the third measuring tube and a cylindrical coil held on the fourth measuring tube and permeated by the magnetic field of the permanent magnet, or the fifth and sixth oscillation sensors $19_5$, $19_6$, in given cases, provided can correspondingly in each case be formed by means of a permanent magnet held on the fifth measuring tube and a cylindrical coil held on the seventh measuring tube and permeated by the magnetic field of the permanent magnet, and the seventh and eighth oscillation sensors $19_7$, $19_8$—in given cases, provided can in each case be formed by means of a permanent magnet held on the sixth measuring tube and a cylindrical coil held on the eighth measuring tube and permeated by the magnetic field of the permanent magnet.

It should additionally be noted here that, although in the case of the oscillation sensors of the sensor arrangement 19 shown in the example of an embodiment are in each case of electrodynamic type, and thus in each case involves oscillation sensors implemented by means of a cylindrical magnet coil affixed on a the measuring tubes and a permanent magnet plunging into the former and correspondingly affixed on an oppositely lying measuring tube, additionally, also other oscillation sensors known to those skilled in the art, e.g. opto-electronic oscillation sensors, can be used for forming the sensor arrangement. Furthermore, as is quite usual in the case of measuring transducers of the type being discussed, in addition to the oscillation sensors, other sensors, especially sensors registering auxiliary variables or disturbance variables, can be provided in the measuring transducer, such as, for example, acceleration sensors for registering movements of the entire measuring system caused by outer forces and/or asymmetries in the tube arrangement, strain gages for registering expansions of one or more the measuring tubes and/or of the transducer housing, pressure sensors for registering a static pressure reigning in the transducer housing and/or temperature sensors for registering temperatures of one or more the measuring tubes and/or of the transducer housing, by means of which, for example, the ability of the measuring transducer to function and/or changes in the sensitivity of the measuring transducer to the primarily measured variables to be registered, especially the mass flow rate and/or the density, as a result of cross sensitivities or outer disturbances is monitored and, in given cases, can correspondingly be compensated for. For assuring as high a sensitivity of the measuring transducer to the mass flow as possible, according to an additional embodiment of the invention, the measuring tubes and the oscillation sensors are arranged in the measuring transducer in such a manner that a measuring length, $L_{19}$, of the measuring transducer corresponding to a distance measured along a bend line of the first measuring tube between the first oscillation sensor $19_1$ and the second oscillation sensor $19_2$ amounts to more than 500 mm, especially more than 600 mm. Particularly for creation of a measuring transducer which is as compact as possible, but nevertheless as sensitive as possible to the mass flow, according to an additional embodiment of the invention, the oscillation sensors $19_1$, $19_2$, matched to the installed length $L_{11}$ of the measuring transducer, are arranged in the measuring transducer in such a manner that a measuring-length-to-installed length ratio $L_{19}/L_{11}$ of the measuring transducer, which is defined by a ratio of the measuring length to the installed length of the measuring transducer, amounts to more than 0.3, especially more than 0.4 and/or less than 0.7. Alternatively or in supplementation, according to an additional embodiment of the invention, the oscillation sensors, matched to the measuring tubes, are placed in the measuring transducer in such a manner that a caliber-to-measuring-length ratio $D_{18}/L_{19}$, of the measuring transducer, which is defined by a ratio of the caliber $D_{18}$ of the first measuring tube to the mentioned measuring length $L_{19}$ of the measuring transducer, amounts to more than 0.05, especially more than 0.09.

The sensor arrangement 19 is additionally, as is usual in the case of such measuring transducers, coupled in a suitable manner—for example, hardwire d via connecting lines— with a measuring circuit which is correspondingly provided in the transmitter electronics, and is, for example, formed by means of at least one microprocessor and/or by means of at least one digital signal processor. The measuring circuit receives the oscillation signals of the sensor arrangement 19 and generates therefrom—, in given cases, also taking into consideration electrical excitation power fed into the exciter mechanism by means of the at least one driver signal and consequently also converted therein—the previously mentioned measured values, which, for example, can represent a mass flow rate, a totalled mass flow and/or a density and/or a viscosity of the medium to be measured, and which, in given cases, can be displayed a on-site and/or also sent in the form of digital measured data to a data processing system superordinated to the measuring system, and correspondingly be further processed there. The measuring circuit, and consequently the transmitter electronics formed therewith, is especially additionally provided and designed, based on electrical excitation power converted in the exciter mechanism, for example, periodically recurringly and/or on demand, to generate a viscosity measured value representing the viscosity of the flowing medium, and/or based on oscillation signals delivered by the measuring transducer, for example, periodically recurringly and/or on demand, to generate a mass flow measured value representing the mass flow rate of the flowing medium and/or, for example, periodically recurringly and/or on demand, to generate a density measured value representing the density of the flowing medium.

The above mentioned application of differentially acting oscillation exciters or oscillation sensors introduces, in such case, among other things, also the advantage, that for operating the measuring transducer of the invention, also such established measuring and operating circuits can be used, as have for example, already found broad use in conventional Coriolis mass flow/density measuring devices.

The transmitter electronics 12, including the measuring and operating circuit implemented therein, can furthermore, for example, be accommodated in a separate electronics-housing $7_2$, which is arranged at a distance from the measuring transducer, or, as shown in FIG. 1, is affixed, forming a single compact device, directly on the measuring transducer 1, for example, externally on the transducer housing $7_1$. In the case of the example of an embodiment shown here, consequently, a necklike transition piece serving for holding the electronics-housing $7_2$ is additionally placed on the transducer housing $7_1$. Within of the transition piece, a hermetically sealed and/or pressure-resistant feedthrough for the electrical connecting lines, for example, one produced by means of glass and/or plastic potting compound, can additionally be arranged between measuring transducer 11, especially the oscillation exciters and sensors placed therein, and the mentioned transmitter electronics 12.

As already mentioned several times, the in-line measuring device and, in this respect, also the measuring transducer 11, is especially provided for measurements also of high mass flows of more than 1000 t/h in a pipeline of large calibers of more than 250 mm. Taking this into consideration, according to an additional embodiment of the invention, the nominal diameter of the measuring transducer 11, which, as already mentioned, corresponds to a caliber of the pipeline, in whose course the measuring transducer 11 is to be used, is selected in such a manner that it amounts to more than 50 mm, especially, however, more than 100 mm. Additionally, according to an additional embodiment of the measuring transducer, it is provided that each of the measuring tubes $18_1$, $18_2$, $18_3$, $18_4$, in each case has a caliber $D_{18}$ corresponding to a respective tube inner diameter, wherein this caliber $D_{18}$ amounts to more than 40 mm. The measuring tubes $18_1$, $18_2$, $18_3$, $18_4$ are especially additionally embodied in such a manner that each has a caliber $D_{18}$ of more than 60 mm. Alternatively thereto or in supplementation thereof, according to another embodiment of the invention, the measuring tubes $18_1$, $18_2$, $18_3$, $18_4$ are additionally dimensioned in such a manner that they each have a measuring tube length $L_{18}$ of at least 1000 mm. In the example of an embodiment shown here with equal length measuring tubes $18_1$, $18_2$, $18_3$, $18_4$, the measuring tube length $L_{18}$ corresponds in each case, to a length of a section of the bend line of the first measuring tube extending between the first flow opening of the first flow divider and the first flow opening of the second flow divider. The measuring tubes $18_1$, $18_2$, $18_3$, $18_4$, are in such case especially designed in such a manner that their measuring tube length $L_{18}$, is in each case greater than 1200 mm. Accordingly, at least for the mentioned case, in which the measuring tubes $18_1$, $18_2$, $18_3$, $18_4$ are made of steel, in the case of the usually used wall thicknesses of over 1 mm, there results a mass of in each case at least 20 kg, especially more than 30 kg. It is, however, additionally desired that the empty mass each of the measuring tubes $18_1$, $18_2$, $18_3$, $18_4$ be kept less than 50 kg.

In consideration of the fact that, as already mentioned, in the case measuring transducer of the invention, each of the measuring tubes $18_1$, $18_2$, $18_3$, $18_4$ weigh well over 20 kg and, in such case, as directly evident from the above dimensional specifications, can have a capacity of easily 10 l or more, the tube arrangement surrounding the four measuring tubes $18_1$, $18_2$, $18_3$, $18_4$ can then, at least in the case of medium with high density flowing through, reach a total mass of far over 80 kg. Especially in the case of application of measuring tubes with a comparatively large caliber $D_{18}$, large wall thickness and large measuring tube length $L_{18}$, the mass of the tube arrangement formed from the measuring tubes $18_1$, $18_2$, $18_3$, $18_4$ can, however, also easily be greater than 100 kg, or at least with medium flowing through, e.g. oil or water, be more than 120 kg. As a result of this, an empty mass $M_{11}$ of the measuring transducer as a whole also amounts to far more than 200 kg, and in the case of nominal diameters $D_{11}$ of essentially greater than 250 mm, even more than 300 kg. As a result, in the case of measuring transducers of the of the invention a mass ratio $M_{11}/M_{18}$ of an empty mass $M_{11}$ of the total measuring transducer to an empty mass $M_{18}$ of the first measuring tube can easily be greater than 10, especially greater than 15. In the case of the mentioned high empty masses $M_{11}$ of the measuring transducer, in order to use the total material applied therefor as optimally as possible and, in this respect, to utilize the—most often also very expensive—material as a whole as efficiently as possible, according to an additional embodiment, the nominal diameter $D_{11}$ of the measuring transducer is, matched its empty mass $M_{11}$, dimensioned in such a manner that a mass-to-nominal-diameter ratio $M_{11}/D_{11}$ of the measuring transducer 11, defined by a ratio of the empty mass $M_{11}$ of the measuring transducer 11 to the nominal diameter $D_{11}$ of the measuring transducer 11, is less than 2 kg/mm, especially, however, to the greatest extent possible, less than 1 kg/mm. In order to assure a sufficiently high stability of the measuring transducer 11, the mass-to-nominal-diameter ratio $M_{11}/D_{11}$ of the measuring transducer 11 is, however, at least in the case of the use of the above mentioned conventional materials, to be selected so as to be, to the greatest extent possible, greater than 0.5 kg/mm. Additionally, according to an additional embodiment of the invention, for additional improving of the efficiency of the installed material, it is provided that the mentioned mass ratio $M_{11}/M_{18}$ be kept less than 25. For creation of a measuring transducer of sufficiently high oscillation quality factor and as little pressure drop as possible which is nevertheless as compact as possible, according to an additional embodiment of the invention, the measuring tubes, matched to the above mentioned installed length $L_{11}$ of the measuring transducer 11, are dimensioned in such a manner that a caliber to installed length ratio $D_{18}/L_{11}$ of the measuring transducer, defined by a ratio of the caliber $D_{18}$ at least of the first measuring tube to the installed length $L_{11}$ of the measuring transducer 11, amounts to more than 0.02, especially more than 0.05 and/or less than 0.09, especially less than 0.07. Alternatively or in supplementation, the measuring tubes $18_1$, $18_2$, $18_3$, $18_4$, matched to the above mentioned installed length $L_{11}$ of the measuring transducer, are dimensioned in such a manner that a measuring tube length to installed length ratio $L_{18}/L_{11}$ of the measuring transducer, defined by a ratio of the above cited measuring tube length $L_{18}$ at least of the first measuring tube to the installed length $L_{11}$ of the measuring transducer, amounts to more than 0.7, especially more than 0.8 and/or less than 1.2.

In an additional embodiment of the invention, for setting the eigenfrequencies of natural oscillation modes of the tube arrangement not least of all usable also for generating Coriolis forces in the medium flowing through the measuring tubes and/or for measuring a mass flow rate of the medium flowing through the measuring tubes, and/or for forming inlet-side or outlet-side oscillation nodes for vibrations of the measuring tubes, the tube arrangement comprises a first coupling element $24_1$ of first type, for example, a plate shaped first coupling element $24_1$, which, as is directly evident from FIGS. 3b, 4a, 4b, 5, is affixed on the inlet side, spaced apart from the first flow divider, on the first measuring tube and on the second measuring tube, as well as a second coupling element $24_2$ of first type, for instance, one constructed equally to the first coupling element of first type, which is affixed on the outlet side, spaced apart from the second flow divider $20_2$, on the first measuring tube $18_1$ and on the second measuring tube $18_2$. Equally, the tube arrangement includes a third coupling element $24_3$ of first type, for instance, an again plate shaped third coupling element $24_3$ of first type or one constructed equally to the first coupling element $24_1$ of first type, which is affixed on the inlet side, spaced apart from the first flow divider, on the third measuring tube and on the fourth measuring tube, as well as a fourth coupling element $24_4$ of first type, for instance, a fourth coupling element $24_4$ of first type constructed equally to the first coupling element $24_1$ of first type, which is affixed on the outlet side, spaced apart from the second flow divider, also on the third measuring tube and on the fourth measuring tube. Like the measuring tubes $18_1$, $18_2$, $18_3$, $18_4$ also the other four measuring tubes $18_5$, $18_6$, $18_7$, $18_8$—as is also evident from the combination of FIGS. 3a, 3b, 4a, 4b, 4c, 4d—are additionally coupled with one another by means of corresponding coupling elements of first type; specifically, the fifth measuring tube and seventh measuring tube are coupled with one another on the inlet side by means of a fifth coupling element $24_5$ of first type—for instance, constructed equally to the first coupling element $24_1$ of first type or plate shaped fifth coupling element $24_6$ of first type— affixed thereto, spaced apart from the first flow divider, on the inlet side, and by means of a sixth coupling element $24_6$ of first type—for instance, a plate shaped sixth coupling element $24_6$ of first type or one constructed equally to the first coupling element $24_1$ of first type—affixed thereto, spaced apart from the second flow divider, on the outlet side, and the sixth measuring tube and eighth measuring tube are coupled with one another on the inlet side by means of a seventh coupling element $24_7$ of first type—for instance, a plate shaped seventh coupling element $24_7$ of first type or one equally constructed to the first coupling element $24_1$ of first type—affixed thereto, spaced apart from the first flow divider, on the inlet side, and by means of an eighth coupling element $24_8$ of first type eighth coupling element $24_8$ of first type—for instance, a plate shaped eighth coupling element $24_8$ of first type or one equally constructed to the first coupling element $24_1$ of first type—affixed thereto, spaced apart from the second flow divider, on the outlet side. This especially occurs in such a manner that—as evident from FIGS. 4a, 4b, 4c, or 4d—at least the first and fourth coupling elements of first type are in each case parallel to one another, the second and third coupling elements of first type are in each case parallel to one another, the fifth and eighth coupling elements of first type are in each case parallel to one another and the sixth and seventh coupling elements of first type are in each case parallel to one another.

As is additionally evident from the combination of FIGS. 3a, 3b, 4a, 4b, 4c, 4d the first coupling element $24_1$ of first type is affixed both to a—here sectionally bent—inlet-side pipe segment of the first measuring tube $18_1$ extending between the first flow divider $20_1$ and the first oscillation sensor $19_1$, as well as also to an inlet-side pipe segment of the second measuring tube $18_2$ likewise extending between the first flow divider $20_1$ and the first oscillation sensor $19_1$, and the second coupling element $25_2$ of first type is affixed both to a—here likewise sectionally bent—outlet-side pipe segment of the first measuring tube $18_1$ extending between the second flow divider $20_2$ and the second oscillation sensor $19_2$, as well as also to an outlet-side pipe segment of the second measuring tube $18_2$ likewise extending between the second flow divider $20_2$ and the second oscillation sensor $19_2$. In an analogous manner, the third coupling element $24_3$ of first type is affixed both to a—here likewise sectionally bent—inlet-side pipe segment of the third measuring tube $18_3$ extending between the first flow divider $20_1$ and the third oscillation sensor $19_3$, as well as also to an inlet-side pipe segment of the fourth measuring tube $18_4$ likewise extending between the first flow divider $20_1$ and the third oscillation sensor $19_3$, and the fourth coupling element $25_4$ of first type is affixed both to a—here, in turn, sectionally bent—outlet-side pipe segment of the third measuring tube $18_3$ extending between the second flow divider $20_2$ and the fourth oscillation sensor $19_4$, as well as also to an outlet-side pipe segment of the fourth measuring tube $18_4$ likewise extending between the second flow divider $20_2$ and the fourth oscillation sensor $19_4$.

Figure 3B:
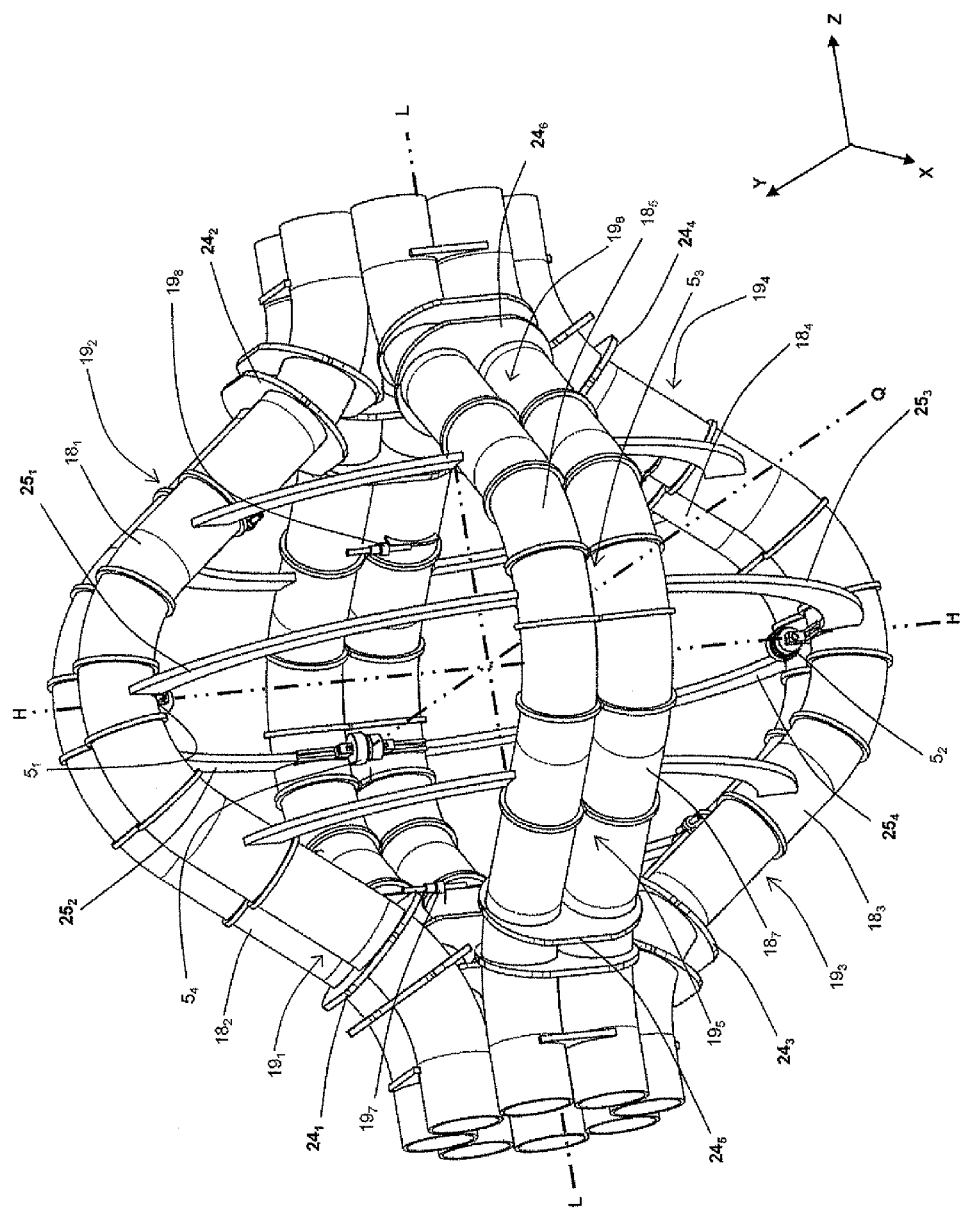

Each of the eighth aforementioned coupling elements $25_1$, $25_2$ of first type, which are especially constructed equally to one another, are, according to an additional embodiment of the invention, additionally embodied so as to be plate shaped, for example, in such a manner that, in each case, the coupling element has a rectangular base, or that in each case, as is also evident from FIGS. 3a, 3b, the coupling element has a rather oval base. The coupling elements of first type, which practically serve as node plates for oscillation nodes, can, accordingly, be stamped parts, for example, thin stamped parts, especially manufactured from the same or a similar material as the measuring tubes, which are provided with bores, which in each case, correspond in number and outer dimensions with the measuring tubes to be coupled to one another, and, in given cases, are additionally slitted toward the edge, so that said stamped parts can initially be clamped onto the respective measuring tubes $18_1$, $18_2$, or $18_3$, or $18_4$, and, in given cases, can thereafter be connected in a material-bonding manner with the respective measuring tube, for example, via hard soldering or welding.

As additionally evident from the combination of FIGS. 3a, 3b, 4a, 4b, 4c, 4d, the coupling elements of first type can additionally be embodied in such a manner and be placed in the measuring transducer in such a manner that they are symmetrical relative to the imaginary longitudinal section plane YZ and that they are arranged pairwise symmetrically relative to the imaginary longitudinal section plane XZ and relative to the imaginary cross sectional plane XY, and thus, as a result, a center of mass of each of the eight coupling elements of first type in each case has the same distance to a center of mass of the tube arrangement.

In consideration of the fact that by means of such coupling elements of first type, be it by their dimensioning and/or their positioning on the measuring tubes, mechanical eigenfrequencies of the measuring tubes and thus also mechanical eigenfrequencies of the tube arrangement formed by means of the eight measuring tubes including further components of the measuring transducer applied in addition, and consequently also the natural eigenfrequencies of oscillatory modes of the first and second type, and, in this respect, also the oscillatory behavior of the measuring transducer as a whole, can be targetedly influenced, in the context of a still simpler and still more exact adjusting of the oscillatory behavior of the measuring transducer, and/or for the purpose of minimizing mechanical stresses and/or vibrations potentially caused on the inlet side or on the outlet side in the transducer housing by the vibrating and, in given cases, also relatively large-dimensioned measuring tubes, it can additionally be quite advantageous, when the measuring transducer, as, for example, is provided in US-A 2006/0150750 and as is indicated in FIGS. 4a, 4b, 5a, 5b, moreover has still other such coupling elements of the aforementioned type acting as node plates; thus, for example, a total of 16, 24, or 32 such coupling elements of first type.

The aforementioned coupling elements $24_1$, $24_2$, $24_3$, $24_4$, $24_5$, $24_6$, $24_7$, $24_8$ of first type are, according to an additional embodiment of the invention, and as is also directly evident from the combination of FIGS. 4a, 4b, 5a, 5b, 6a, 6b, in each case only affixed on two of the measuring tubes forming the tube arrangement, but otherwise on no additional measuring tubes, so that, as a result, the first and second coupling elements $24_1$, $24_2$ of first type are affixed only on the first and second measuring tube and the third and fourth coupling element $24_3$, $24_4$ of first type are affixed only on the third and fourth measuring tube. As a result of this, the tube arrangement, and consequently also the measuring transducer can, for example, be produced in such a manner that initially, the first and second coupling elements $24_1$, $24_2$ of first type are each affixed, forming a first measuring tube package, on the (future) first and second measuring tube $18_1$, $18_2$; the third and fourth coupling element $24_3$, $24_4$ of first type are each affixed, forming a second measuring tube package, on the (future) third and fourth measuring tube $18_3$, $18_4$; the fifth and sixth coupling element $24_5$, $24_6$ of first type in are each affixed, forming a third measuring tube package, on the (future) fifth and sixth measuring tube $18_5$, $18_4$; and the seventh and eighth coupling elements $24_7$, $24_8$ of first type are each affixed, forming a fourth measuring tube package, on the (future) seventh and eighth measuring tube $18_7$, $18_8$. Thus, it is possible to join together the four measuring tube packages at a later point in time, for instance, directly before or also after insertion of all the measuring tube packages into the in part already manufactured and correspondingly prepared (future) transducer housing, by correspondingly later affixing the coupling elements $25_1$, $25_2$, $25_3$, or $25_4$ of second type on the respective associated measuring tube packages to form the tube arrangement, namely in their final installed position within the transducer housing. This has the advantage, not least of all also for the mentioned case, in which the measuring transducer is manufactured for large nominal diameters of more than 100 mm, that, in spite of the relatively large dimensions of its components—consequently the tube arrangement, the transducer housing, the flow dividers etc.—during the majority of the duration of the total manufacturing process, in which the measuring transducer is produced, the as a result relatively cantilevered tube arrangement need only first be treated as an entirety at a relatively late point in time. Moreover, thereby, such tube arrangements as have been used up to this point in conventional measuring transducers with a double tube arrangement can by all means be fallen back upon, which is associated with a considerable reduction in manufacturing and inventory costs. If required, however, coupling elements of first type, which, for example, are also correspondingly affixed on exactly four and/or on all measuring tubes can—alternatively or in supplementation—be provided.

According to an additional embodiment of the invention, each of the eight—here equally large—coupling elements of first type in each case have a maximum length, which is greater than twice a caliber, $D_{18}$, of the first measuring tube $18_1$. Particularly for the aforementioned case, in which each of the coupling elements of first type is affixed on only two of the measuring tubes, each of the coupling elements of first type is additionally embodied in such a manner that the maximum length is less than three times the caliber, $D_{18}$, of the first measuring tube $18_1$.

As is schematically presented in FIG. 4a, the tube forms of each of the measuring tubes, together with a minimum distance between the first and second coupling elements $24_1$, $24_2$ of first type—consequently thus in the case of application of 16 or more such coupling elements of first type, the coupling elements of first type in each case lying nearest the center of mass of the tube arrangement on the inlet and on the outlet side, and in this respect thus in each case the innermost coupling elements of first type on the inlet and on the outlet side—in each case define a wanted oscillatory length, $L_{18\text{-}11}$, of the first measuring tube, or of each of the measuring tubes. The wanted oscillatory length, $L_{18\text{-}II}$, of the particular measuring tube corresponds, in such case, as is also schematically presented in FIGS. 5a and 5b, to a length of the section of the bend line of said measuring tube extending between the two coupling elements $24_1$, $24_2$ of first type, wherein, according to an additional embodiment of the invention, the coupling elements of first type are placed in the measuring transducer in such a manner that, as a result, the wanted oscillatory length of each of the eight measuring tubes $18_1$, $18_2$, $18_3$, $18_4$, $18_5$, $18_6$, $18_7$, $18_8$, amounts, as a result, to less than 3000 mm, especially less than 2500 mm and/or more than 800 mm. Alternatively or in supplementation, it is additionally provided to construct the measuring tubes in such a manner and to arrange the coupling elements of first type in such a manner that the eight measuring tubes $18_1$, $18_2$, $18_3$, $18_4$, $18_5$, $18_6$, $18_7$, $18_8$, have, as a result, the same wanted oscillatory length, $L_{18\text{-}II}$. According to an additional embodiment of the invention, in addition, the first measuring tube and the second measuring tube, at least across the region extending between the first coupling element of first type and the second coupling element of first type—and consequently thus their respective wanted oscillatory lengths—are parallel to one another, and the third measuring tubes and the fourth measuring tubes, at least across the region extending between the third coupling element of first type and the fourth coupling element of first type—and consequently thus their respective wanted oscillatory lengths—are also parallel to one another. Equally parallel to one another are additionally, in such case—as is also evident from the combination of FIGS. 3a to 5—also the fifth and seventh measuring tubes, or also the sixth and eight measuring tubes.

For the purpose of setting oscillation characteristics of the tube arrangement, and consequently eigenfrequencies of natural oscillation modes of the tube arrangement—for instance, also oscillation modes of the tube arrangement usable for generating Coriolis forces in the medium flowing through the measuring tubes and/or for measuring a mass flow rate of the medium flowing through the measuring tubes—as well as also for the purpose of as simple as possible and equally as effective an implementing of a sufficient separating as regards their respective eigenfrequencies of the mentioned mode of oscillation of first type from additional oscillation modes of the tube arrangement, and consequently also from the oscillatory mode of second type, according to an additional embodiment of the invention, the measuring transducer additionally comprises at least a—for example, plate or rod, or bar, shaped—first coupling element $25_1$ of second type, in each case affixed, spaced apart from the two flow dividers, on the first measuring tube and on the fifth measuring tube, especially only on both of said measuring tubes, but otherwise on no others of the eight measuring tubes; a—for example, plate or rod, or bar, shaped—second coupling element $25_2$ of second type, affixed, spaced apart both from the first flow divider as well as also from the second flow divider, on the second measuring tube and on the sixth measuring tube, especially only on both of said measuring tubes, but otherwise on no others of the eight measuring tubes; a—for example, plate shaped or rod, or bar, shaped—third coupling element $25_3$ of second type, affixed, spaced apart from both the first flow divider as well as also from the second flow divider, on the third measuring tube and on the seventh measuring tube, especially only on both of said measuring tubes, but otherwise on no others of the eight measuring tubes; as well as a—for example, plate shaped or rod, or bar, shaped—fourth coupling element $25_4$ of second type, affixed, spaced apart from both the first flow divider as well as also from the second flow divider, especially only on both of said measuring tubes, but otherwise on no others of the eight measuring tubes. By the application of such coupling elements of second type, not only can the eigenfrequencies of the tube arrangement be optimized, but also the strong mechanical coupling of the measuring tubes already introduced by the coupling elements can additionally further be increased, and thus a still better equalizing of the oscillations simultaneously executed by the eight measuring tubes, at least the active excited bending oscillations in the wanted mode, can be brought about, this especially also in the case of deviations of the measuring tubes from the desired ideal form possibly caused by component tolerances or inequalities in the measuring tubes associated therewith.

The four especially equally constructed coupling elements of second type can, for example, in each case be produced by means of a monolithic blanked bending part, and are placed, as is also directly evident from the combination of FIGS. 3a, 3b, 4a, 4b, 4c and 4d, practically within one and the same imaginary cross sectional plane the tube arrangement; in the example of an embodiment shown here, namely within the mentioned imaginary cross sectional plane XY. Additionally, according to an additional embodiment of the invention, each of the four—here also equally large—coupling elements of the second type in each case has a length, in each case measured as the shortest distance between a first element end connected with one of the measuring tubes and a second element end connected with another of the measuring tubes, which is greater than a maximum length of the first coupling element of first type and/or the greater than three times the caliber, $D_{18}$, of the first measuring tube $18_1$, especially also greater than four times the caliber, $D_{18}$, of the first measuring tube $18_1$.

In an additional embodiment, the first coupling element of second type is furthermore affixed both on a pipe segment of the first measuring tube $18_1$ extending between the first coupling element of first type and the second coupling element of first type as well as also on a pipe segment of the fifth measuring tube $18_5$ extending between the fifth coupling element of first type and the sixth coupling element of first type—here especially in a region of an oscillation node of oscillations of the first measuring tube, as well as also in a region of an oscillation node of oscillations of the fifth measuring tube—and the second coupling element of second type is affixed both on a pipe segment of the second measuring tube $18_2$ extending between the first coupling element of first type and the second coupling element of first type, as well as also on a pipe segment of the sixth measuring tube $18_6$ extending between the fifth coupling element of first type and the sixth coupling element of first type—here especially in a region of an oscillation node of oscillations of the second measuring tube, as well as also in a region of an oscillation node of oscillations of the sixth measuring tube. Moreover, in an analogous manner, also the third coupling element of second type is affixed both on a pipe segment of the third measuring tube $18_3$ extending between the third coupling element of first type and the fourth coupling element of first type, as well as also on a pipe segment of the seventh measuring tube $18_7$ extending between the seventh coupling element of first type and the eighth coupling element of first type—here especially in a region of an oscillation node of oscillations of the third measuring tube, as well as also in a region of an oscillation node of oscillations of the seventh measuring tube, and the fourth coupling element of second type is affixed both on a pipe segment of the fourth measuring tube $18_4$ extending between the third coupling element of first type and the fourth coupling element of first type, as well as also on a pipe segment of the eighth measuring tube $18_8$ extending between the seventh coupling element of first type and the eighth coupling element of first type—here especially in a region of an oscillation node of oscillations of the fourth measuring tube, as well as also in a region of an oscillation node of oscillations of the eighth measuring tube.

If required—for example, because the measuring transducer is provided for measuring extremely hot media, or for measuring in applications with the operating temperature fluctuating over a broad range, for instance, as a result of cleaning procedures of the measuring transducer recurringly performed in-situ ("cleaning in process", "sterilizing in process" etc.), and, in this respect, notable thermal expansions of the measuring tubes are to be expected—f the coupling elements of second type can additionally be embodied in such a manner that they essentially expand in a manner equal to the respective measuring tubes coupled via them, and/or that they are at least sufficiently flexible with respect to forces, which act in the direction of a line of action extending through the peaks of the two measuring tubes connected with one another via the respective coupling elements of second type, for instance, coincident with the mentioned imaginary vertical axis H, or parallel thereto. The latter can, for example, be implemented via slits correspondingly formed in the particular coupling element of second type; for instance, slits extending essentially transversely to aforementioned line of action. Alternatively to or in supplementation of slits formed in the coupling elements, according to another embodiment of the invention, each of the two coupling elements of second type, not least of all for the purpose of achieving a sufficient flexibility in the direction of the imaginary vertical axis H, and as is also directly evident from the combination of FIGS. 4a, 4b, 5a, 5b, is embodied in a bulged manner.

Therefore, according to an additional embodiment of the invention, not least of all also for the purpose of enabling elastic deformations of the respective coupling element of second type as a result of opposite-equal relative movements of the respective two measuring tubes connected therewith and/or for the purpose of minimizing or preventing mechanical stresses caused by thermally related length changes of the respective coupling element and/or the two respective measuring tubes connected therewith, each of the four coupling elements of second type—here embodied in an essentially rod or plate shaped manner—are in each case at least sectionally curved; for example, essentially circular arc shaped. As a result, also a small change of the relative distance, for instance, as a result of thermally related strain, between measuring tubes is enabled, and indeed in a manner largely preventing the oscillatory behavior of the tube arrangement from significantly influencing elevations of mechanical stresses.

If required, for instance, for the purpose of an additional improving of the separating of eigenfrequencies and/or for the purpose of an additional strengthening of the mechanical coupling of the measuring tubes, also more than 4 such coupling elements of second type can, of course, be used, for instance—and as schematically indicated in FIGS. 3a, 3b, 4a, 4b, 4c, and 4d,—12 such coupling elements of second type, or—for example in case that said mode of oscillation of second type should excite—only 8 such coupling elements of second type. In that latter case of using only 8 coupling elements of second type the tube arrangement would not have the 4 middle ones of the 12 coupling elements as shown in FIGS. 3a, 3b, 4a, 4b, 4c, and 4d, respectively, consequently the tube arrangement would include the 4 inlet-side and the 4 outle-side coupling elements of second type as shown FIGS. 3a, 3b, 4a, 4b, 4c, and 4d.

For creation of as compact a measuring transducer of sufficiently high oscillation quality factor and high sensitivity as possible in the case of an as little pressure drop as possible, according to an additional embodiment of the invention, the measuring tubes $18_1$, $18_2$, $18_3$, $18_4$, $18_5$, $18_6$, $18_7$, $18_8$ are dimensioned, matched to the mentioned wanted oscillatory length, in such a manner that a caliber-to-oscillatory-length ratio $D_{18}/L_{18\text{-}II}$ of the measuring transducer, defined by a ratio of the caliber $D_{18}$ of the first measuring tube to the wanted oscillatory length $L_{18\text{-}II}$ of the first measuring tube, amounts to more than 0.03, especially more than 0.05 and/or less than 0.15. Alternatively or in supplementation to this, according to an additional embodiment of the invention, the measuring tubes $18_1$, $18_2$, $18_3$, $18_4$, $18_5$, $18_6$, $18_7$, $18_8$, are dimensioned, matched to the above mentioned installed length $L_{11}$ of the measuring transducer, in such a manner that an oscillatory-length-to-installed-length ratio $L_{18\text{-}II}/L_{11}$ of the measuring transducer, defined by a ratio of the wanted oscillatory length of the first measuring tube to the installed length $L_{11}$ of the measuring transducer, amounts to more than 0.55, especially more than 0.6 and/or less than 1.5. According to an additional embodiment of the invention, the oscillation sensors are arranged in the measuring transducer, matched to the wanted oscillatory length, in such a manner that a measuring-length-to-oscillatory-length ratio $L_{19}/L_{18\text{-}II}$ of the measuring transducer, defined by a ratio of the mentioned measuring length $L_{19}$ of the measuring transducer to the wanted oscillatory length $L_{18\text{-}II}$ of the first measuring tube, amounts to more than 0.3, especially more than 0.4 and/or less than 0.95. Additionally, measuring length, $L_{19}$, and/or measuring-length-to-oscillatory-length ratio $L_{19}/L_{18\text{-}II}$, can, moreover, also by all means be more exactly determined according to the criteria proposed in WO-A 2011/009683 or WO-A 2011/009684 for determining optimum measuring lengths or optimum measuring-length-to-oscillatory-length ratios for measuring transducers of vibration type.

Figure 7:
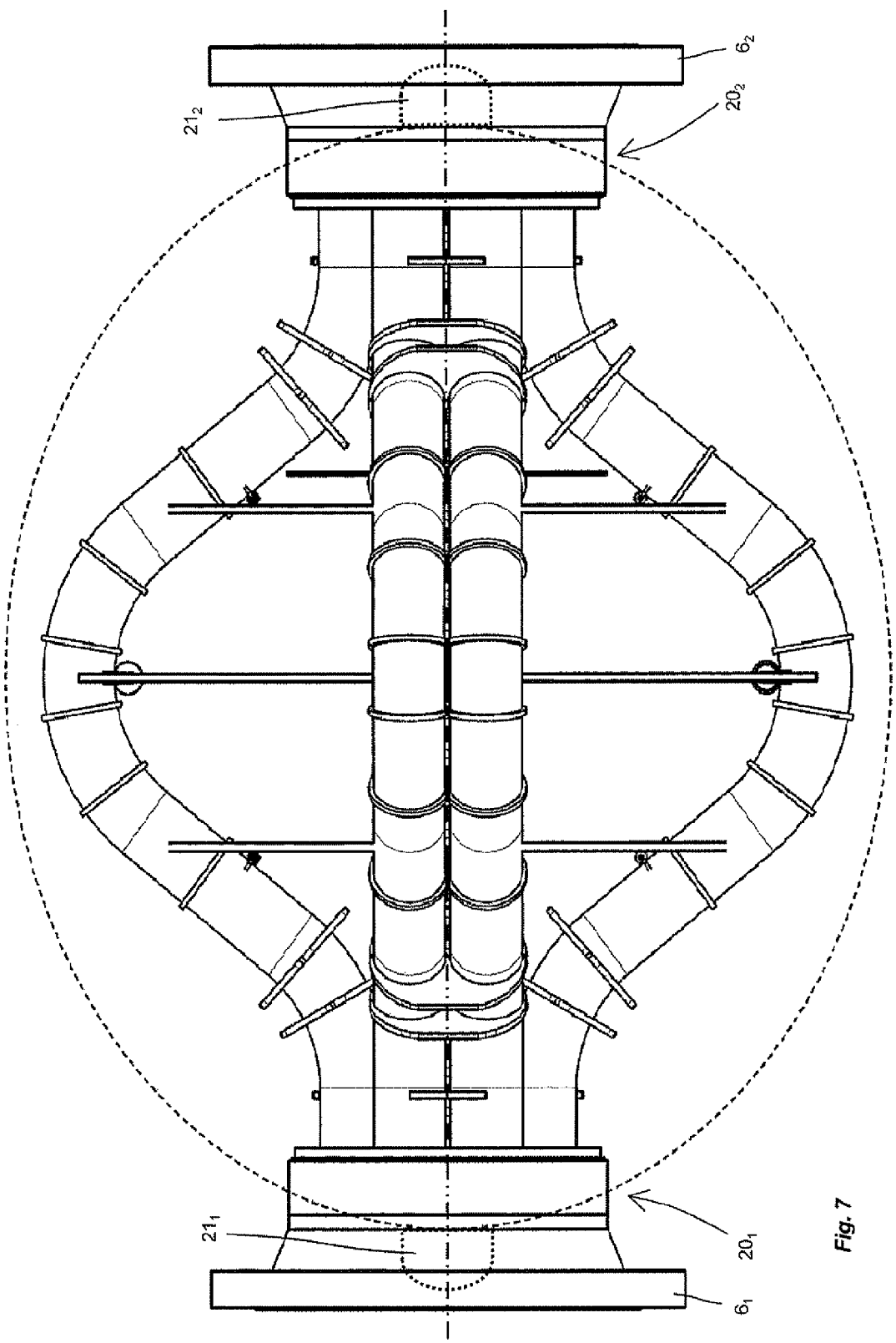
FIG. 7 in a side view, another variant of the measuring transducer of the invention.

For additional lessening of a flow resistance on the part of the measuring transducer counteracting the flowing medium in the case of a nevertheless compact construction and high sensitivity, according to an additional embodiment of the invention, a caliber-to-nominal diameter ratio, $D_{18}/D_{11}$, of the measuring transducer, defined by a ratio of the caliber, $D_{18}$, of the first measuring tube to the nominal diameter of the measuring transducer corresponding to the caliber of the pipeline, in whose course the measuring transducer is to be used, is selected so as to be larger than 0.21, for instance, via application of—for instance, funnel shaped—flow distributers $20_2$, $20_1$ with lumens in each case tapering toward the respective end of the measuring transducer, and consequently in each case tapering toward the connected pipeline, and/or is selected so as to be less than 0.4, especially less than 0.35. Alternatively thereto or in supplementation thereof, the flow resistance of the measuring transducer can be further reduced in that, as is schematically presented in FIG. 7, in the first flow divider $20_1$ and/or in the second flow divider $20_2$, an especially conical or paraboloid shaped flow body $21_1$, or $21_2$ is in each case placed between each of the respective flow openings.

For lessening possible cross sensitivities of the measuring transducer to pressure, not least of all also in the case of as high as possible a nominal diameter to installed length ratio $D_{11}/L_{11}$ of greater than 0.1 and an as low as possible an oscillatory-length-to-installed-length ratio $L_{18\text{-}II}/L_{11}$ of less than 1.5, advantageously, annular stiffening elements can additionally be used on the measuring tubes, of which each is placed on exactly one of the measuring tubes $18_1$, $18_2$, $18_3$, $18_4$, $18_5$, $18_6$, $18_7$, $18_8$ in such a manner that it surrounds the measuring tube along one of its especially circularly encompassing, imaginary peripheral lines; compare to this also the previously mentioned U.S. Pat. No. 6,920,798. In such case, it can especially be advantageous, when on each of the measuring tubes, at least four such stiffening elements, especially equally constructed stiffening elements, are placed. In such case, the stiffening elements can, for example, be placed in the measuring transducer 11 in such a manner that two adjoining stiffening elements mounted on the same measuring tube have a distance from one another, which amounts to at least 70% of a tube outer diameter of said measuring tube, but at most 150% of such tube outer diameter. In such case, a distance of neighboring stiffening elements relative to one another, which lies in the range of 80% to 120% of the tube outer diameter of the respective measuring tube has proved especially suitable. Via application of eight, rather than, as previously, two parallelly flowed-through, bent measuring tubes, it is thus also possible, on the one hand, to cost-effectively manufacture measuring transducers of the described type also for large mass flow rates or with large nominal diameters of far over 250 mm with an accuracy of measurement of over 99.8% in the case of an acceptable pressure drop, especially of less than 3 bar, and, on the other hand, to keep the installed mass, as well as also the empty mass of such measuring transducers within limits to such an extent that, in spite of large nominal diameters, the manufacture, transport, installation, as well as also the operation can still occur in an economically sensible manner. Especially also by implementing—individually or also in combination—previously explained measures further shaping the invention, measuring transducers of the type being discussed can, also in the case of large nominal diameters, be embodied in such a manner and dimensioned in such a manner that a mass ratio of the measuring transducer defined by a ratio of the mentioned empty mass of the measuring transducer to a total mass of the tube arrangement can be directly kept less than 3, especially less than 2.5. Additionally, those skilled in the art can easily recognize that the tube arrangement—in given cases, also ensuring its fourfold rotational symmetry about the mentioned imaginary longitudinal axis L or about the principal flow axis, can in a corresponding manner also directly be supplemented by a further $2^n$ measuring tubes, especially also by a further 8·n, (n>1, 2, 3, 4, ...) measuring tubes, and accordingly, also the respective flow dividers can be supplemented by a further $2^n$ (or by a further 8·n) flow openings, for instance for the purpose of further increasing the sensitivity and/or for the purpose of fulfillment of additional measuring tasks. Said additional measuring tubes or flow openings can, in such case, be arranged, for example, also along a concentric, imaginary envelope surface imaginarily enveloping the tube arrangement shown here. While the invention has been illustrated and described in detail in the drawings and forgoing description, such illustration and description is to be considered as exemplary not restrictive in character, it being understood that only exemplary embodiments have been shown and described and that all changes and modifications that come within the spirit and scope of the invention as described herein are desired to protected.

What is claimed is:

1. Measuring transducer of vibration type for registering at least one physical measured variable of a flowable medium conveyed in a pipeline and/or for producing Coriolis forces serving for registering a mass flow rate of a flowable medium conveyed in a pipeline, said measuring transducer comprising:
    a transducer housing, of which an inlet-side, first housing end is formed by means of an inlet-side, first flow divider including eight, mutually spaced apart flow openings and an outlet-side, second housing end is formed by means of an outlet-side, second flow divider including eight mutually spaced apart flow openings;
    a tube arrangement including, for conveying flowing medium,
        a bent first measuring tube opens with an inlet-side, first measuring tube end into a first flow opening of the first flow divider, and opens with an outlet-side, second measuring tube end into a first flow opening of the second flow divider,
        a bent second measuring tube, which is especially at least sectionally parallel to the first measuring tube, opens with an inlet-side, first measuring tube end into a second flow opening of the first flow divider and with an inlet-side, first measuring tube end into a second flow opening into of the second flow divider,
        a bent third measuring tube opens with an inlet-side, first measuring tube end into a third flow opening of the first flow divider and with an outlet-side, second measuring tube end into a third flow opening of the second flow divider,
        a bent fourth measuring tube, which is especially at least sectionally parallel to the third measuring tube, opens with an inlet-side, first measuring tube end into a fourth flow opening of the first flow divider, and with an outlet-side, second measuring tube end in to a fourth flow opening of the second flow divider,
        a bent fifth measuring tube, which is especially at least sectionally parallel to the fifth measuring tube, opens with an inlet-side, first measuring tube end into a sixth flow opening of the first flow divider of the first flow divider and with an outlet-side, second measuring tube end into a fifth flow opening of the second flow divider,
        a bent sixth measuring tube, which is especially at least sectionally parallel to the fifth measuring tube, opens with an inlet-side, first measuring tube end into a sixth flow opening of the first flow divider, and with an outlet-side, second measuring tube end into a sixth flow opening of the second flow divider,
        a bent seventh measuring tube opens with an inlet-side, first measuring tube end into a seventh flow opening of the first flow divider, and with an outlet-side, second measuring tube end into a seventh flow opening of the second flow divider, and
        a bent eighth measuring tube, which is especially at least sectionally parallel to the seventh measuring tube, opens with an inlet-side, first measuring tube end into an eighth flow opening of the first flow divider, and with an outlet-side, second measuring tube end into an eighth flow opening of the second flow divider; and
    an electro-mechanical exciter mechanism for producing and/or maintaining bending oscillations of each of said first, second, third, fourth, fifth, sixth, seventh, and eighth measuring tubes, especially oscillations corresponding to a natural oscillatory mode the tube arrangement.

2. The measuring transducer as claimed in claim 1, wherein:
    each of the first, second, third, fourth, fifth, sixth, seventh, and eighth measuring tubes is held oscillatably in the transducer housing only by means of said flow dividers, and/or
    the first, second, third, fourth, fifth, sixth, seventh, and eighth measuring tubes are equally constructed, and/or
    the first, second, third, fourth, fifth, sixth, seventh, and eighth measuring tubes are pairwise parallel to one another; and/or
    each of the first, second, third, fourth, fifth, sixth, seventh, and eighth measuring tubes is at least sectionally V shaped; and/or
    the exciter mechanism is adapted to excite, especially simultaneously, each of the first, second, third, fourth, fifth, sixth, seventh, and eighth measuring tubes to execute bending oscillations.

3. The measuring transducer as claimed in claim 1, wherein:
    the two flow dividers are embodied and arranged in the measuring transducer in such a manner,
        that an imaginary first connecting axis of the measuring transducer imaginarily connecting the first flow opening of the first flow divider with the first flow opening of the second flow divider extends parallel to an imaginary second connecting axis of the measuring transducer imaginarily connecting the second flow opening of the first flow divider with the second flow opening of the second flow divider, and
        that an imaginary third connecting axis of the measuring transducer imaginarily connecting the third flow opening of the first flow divider with the third flow opening of the second flow divider extends parallel to an imaginary fourth connecting axis of the measuring transducer imaginarily connecting the he fourth flow opening of the first flow divider with the fourth flow opening of the second flow divider.

4. The measuring transducer as claimed in claim 3, wherein:
the two flow dividers are embodied and arranged in the measuring transducer in such a manner,
that an imaginary fifth connecting axis of the measuring transducer imaginarily connecting the fifth flow opening of the first flow divider with the fifth flow opening of the second flow divider extends parallel to an imaginary sixth connecting axis of the measuring transducer imaginarily connecting the sixth flow opening of the first flow divider with the sixth flow opening of the second flow divider, and
that an imaginary seventh connecting axis of the measuring transducer imaginarily connecting the seventh flow opening of the first flow divider with the seventh flow opening of the second flow divider extends parallel to an imaginary eighth connecting axis of the measuring transducer imaginarily connecting the eighth flow opening of the first flow divider with the eighth flow opening of the second flow divider.

5. The measuring transducer as claimed in claim 1, wherein:
the measuring tubes are embodied and arranged in the measuring transducer in such a manner that the tube arrangement shows a first imaginary longitudinal section plane, which lies both between the first measuring tube and the third measuring tube and between the second measuring tube and the fourth measuring.

6. The measuring transducer as claimed in claim 5, wherein:
the measuring tubes are embodied and arranged in the measuring transducer in such a manner that the first imaginary longitudinal section plane is in each case parallel to the first, second, third and fourth measuring tubes; and/or
the measuring tubes are embodied and arranged in the measuring transducer in such a manner that tube arrangement is mirror symmetrical relative to the first imaginary longitudinal section plane.

7. The measuring transducer as claimed in claim 5, wherein:
the measuring tubes are embodied and arranged in the measuring transducer in such a manner that the tube arrangement shows a second imaginary longitudinal section plane, which lies both, between the fifth measuring tube and the sixth measuring tube and between the seventh measuring tube and the eighth measuring tube.

8. The measuring transducer as claimed in claim 7, wherein:
inherent to the tube arrangement is at least one natural oscillatory mode, especially an oscillatory mode excitable by means of the exciter mechanism and/or usable for the generating Coriolis forces in the medium flowing through the measuring tubes;
in said oscillatory mode each of the first and third measuring tubes executes or can execute bending oscillations, especially cantilever bending oscillations in each case about an imaginary oscillation axis parallel to at least two of the imaginary connecting axes and/or oscillations about a static resting position associated with the respective measuring tube, said bending oscillations of the first and third measuring tubes are opposite-equal, especially symmetric, relative to the first imaginary longitudinal section plane; and
in said oscillatory mode, each of the second and fourth measuring tubes executes or can execute bending oscillations, especially cantilever bending oscillations in each case about an imaginary oscillation axis parallel to at least two of the imaginary connecting axes and/or oscillations about a static resting position associated with the respective measuring tube, said bending oscillations of the second and fourth measuring tubes are opposite-equal, especially symmetric, relative to the first imaginary longitudinal section plane, especially such that, in relation to the second imaginary longitudinal section plane, said bending oscillations of the first measuring tube are opposite-equal to said bending oscillations of the second measuring tube and, in relation to the second imaginary longitudinal section plane, said bending oscillations of the third measuring tube are opposite-equal to said bending oscillations of the fourth measuring tube; and/or
in said oscillatory mode, each of the fifth and seventh measuring tubes executes or can execute bending oscillations, especially cantilever bending oscillations in each case about an imaginary oscillation axis parallel to at least two of the imaginary connecting axes and/or oscillations about a static resting position associated with the respective measuring tube, said bending oscillations of the fifth and seventh are opposite-equal, especially symmetric, relative to the first imaginary longitudinal section plane; and
in said oscillatory mode, each of the sixth and eighth measuring tubes executes or can execute bending oscillations, especially cantilever bending oscillations in each case about an imaginary oscillation axis parallel to at least two of the imaginary connecting axes and/or oscillations about a static resting position associated with the respective measuring tube, said bending oscillations of the sixth and eighth are opposite-equal, especially symmetric, relative to the first imaginary longitudinal section plane, especially such that, in relation to the second imaginary longitudinal section plane, said bending oscillations of the fifth measuring tube are opposite-equal to said bending oscillations of the sixth measuring tube and, in relation to the second imaginary longitudinal section plane, said bending oscillations of the seventh measuring tube are opposite-equal to said bending oscillations of the eighth measuring tube; and/or
in said oscillatory mode, the first and fifth measuring tube execute or can execute bending oscillations in a common mode, in each case about a static resting position associated with the respective measuring tube, especially cantilever bending oscillations in each case about an imaginary oscillation axis parallel to at least two of the imaginary connecting axes;
the second and sixth measuring tubes execute or can execute bending oscillations synchronously in each case about a static resting position associated with the respective measuring tube, especially cantilever bending oscillations in each case about an imaginary oscillation axis parallel to at least two of the imaginary connecting axes;
the third and seventh measuring tube execute or can execute bending oscillations synchronously in each case about a static resting position associated with the respective measuring tube, especially cantilever-bending oscillations in each case about an imaginary oscillation axis parallel to at least two of the imaginary connecting axes; and
the fourth and eighth measuring tubes execute or can execute bending oscillations synchronously, in each case about a static resting position associated with the respective measuring tube, especially cantilever bending oscillations in each case about an imaginary oscillation axis parallel to at least two of the imaginary connecting axes.

9. The measuring transducer as claimed in claim 7 wherein:
inherent to the tube arrangement is at least one natural oscillatory mode of first type, especially an oscillatory mode excitable by means of the exciter mechanism and/or usable for the generating Coriolis forces in the medium flowing through the measuring tubes;
in said oscillatory mode of first type, each of the first and third measuring tubes executes or can execute bending oscillations, especially cantilever bending oscillations in each case about an imaginary oscillation axis parallel to at least two of the imaginary connecting axes and/or oscillations about a static resting position associated with the respective measuring tube, said bending oscillations of the first and third measuring tubes are opposite-equal, especially symmetric, relative to the first imaginary longitudinal section plane;
in said oscillatory mode of first type, each of the second and fourth measuring tubes executes or can execute bending oscillations, especially cantilever bending oscillations in each case about an imaginary oscillation axis parallel to at least two of the imaginary connecting axes and/or oscillations about a static resting position associated with the respective measuring tube, said bending oscillations of the second and fourth measuring tubes are opposite-equal, especially symmetric, relative to the first imaginary longitudinal section plane;
in said oscillatory mode of first type, each of the fifth and seventh measuring tubes executes or can execute bending oscillations, especially cantilever bending oscillations in each case about an imaginary oscillation axis parallel to at least two of the imaginary connecting axes and/or oscillations about a static resting position associated with the respective measuring tube, said bending oscillations of the fifth and seventh are opposite-equal, especially symmetric, relative to the first imaginary longitudinal section plane;
in said oscillatory mode of first type, each of the sixth and eighth measuring tubes executes or can execute bending oscillations, especially cantilever bending oscillations in each case about an imaginary oscillation axis parallel to at least two of the imaginary connecting axes and/or oscillations about a static resting position associated with the respective measuring tube, said bending oscillations of the sixth and eighth are opposite-equal, especially symmetric, relative to the first imaginary longitudinal section plane;
with, in said oscillatory mode of first type, said bending oscillations of the first, second, third, fourth, fifth, sixth, seventh, and eighth measuring tubes are in such a manner;
that, relative to the second imaginary longitudinal section plane, said bending oscillations of the first measuring tube are opposite-equal to said bending oscillations of the second measuring tube and said bending oscillations of the third measuring tube are opposite-equal to said bending oscillations of the fourth measuring tube;
that, relative to the second imaginary longitudinal section plane, said bending oscillations of the fifth measuring tube are opposite-equal to said bending oscillations of the sixth measuring tube, and said bending oscillations of the seventh measuring tube are opposite-equal to said bending oscillations of the eighth measuring tube; and
that the bending oscillations of the first measuring tube are synchronous with the bending oscillations of the fifth measuring tube, the bending oscillations of the second measuring tube are synchronous with bending oscillations of the sixth measuring tube, the bending oscillations of the third measuring tube are synchronous with the bending oscillations of the seventh measuring tube, and the bending oscillations of the fourth measuring tube are synchronous with the bending oscillations of the eighth measuring tube.

10. The measuring transducer as claimed in claim 9, wherein:
inherent to the tube arrangement is at least one natural oscillatory mode of second type, especially an oscillatory mode excitable by means of the exciter mechanism and/or usable for the generating Coriolis forces in the medium flowing through the measuring tubes;
in said oscillatory mode of second type, each of the first and third measuring tubes executes or can execute bending oscillations, especially cantilever bending oscillations in each case about an imaginary oscillation axis parallel to at least two of the imaginary connecting axes and/or oscillations about a static resting position associated with the respective measuring tube, said bending oscillations of the first and third measuring tubes are opposite-equal, especially symmetric, relative to the first imaginary longitudinal section plane;
in said oscillatory mode of second type, each of the second and fourth measuring tubes executes or can execute bending oscillations, especially cantilever bending oscillations in each case about an imaginary oscillation axis parallel to at least two of the imaginary connecting axes and/or oscillations about a static resting position associated with the respective measuring tube, said bending oscillations of the second and fourth measuring tubes are opposite-equal, especially symmetric, relative to the first imaginary longitudinal section plane;
in said oscillatory mode of second type, each of the fifth and seventh measuring tubes executes or can execute bending oscillations, especially cantilever bending oscillations in each case about an imaginary oscillation axis parallel to at least two of the imaginary connecting axes and/or oscillations about a static resting position associated with the respective measuring tube, said bending oscillations of the fifth and seventh are opposite-equal, especially symmetric, relative to the first imaginary longitudinal section plane;
in said oscillatory mode of second type, each of the sixth and eighth measuring tubes executes or can execute bending oscillations, especially cantilever bending oscillations in each case about an imaginary oscillation axis parallel to at least two of the imaginary connecting axes and/or oscillations about a static resting position associated with the respective measuring tube, said bending oscillations of the sixth and eighth are opposite-equal, especially symmetric, relative to the first imaginary longitudinal section plane; and
with, in said oscillatory mode of second type, said bending oscillations of the first, second, third, fourth, fifth, sixth, seventh, and eighth measuring tubes are in such a manner, that, relative to the second imaginary longitudinal section plane, said bending oscillations of the first measuring tube are opposite equal to said bending oscillations of the second measuring tube and said bending oscillations of the third measuring tube are opposite-equal to said bending oscillations of the fourth measuring tube, that, relative to the second imaginary longitudinal section plane, said bending oscillations of the fifth measuring tube are opposite-equal to said bending oscillations of the sixth measuring tube, and said bending oscillations of the seventh measuring tube are opposite-equal to said bending oscillations of the eighth measuring tube, and that the bending oscillations of the first measuring tube are opposite-equal to the bending oscillations of the fifth measuring tube, the bending oscillations of the second measuring tube are opposite-equal to execute bending oscillations of the sixth measuring tube, the bending oscillations of the third measuring tube are opposite-equal to the bending oscillations of the seventh measuring tube, and the bending oscillations of the fourth measuring tube are opposite-equal to the bending oscillations of the eighth measuring tube.

11. The measuring transducer as claimed in claim 10, wherein:
   an eigenfrequency, $f_{18\text{-}IIX}$—especially measurable in the case of a tube arrangement filled only with air—of the oscillatory mode of a first type is different from an eigenfrequency, $f_{18}$—especially measurable in the case of a tube arrangement filled only with air and/or measurable at the same time for eigenfrequency, $f_{18\text{-}I}$—of the oscillatory mode of second type, especially by more than 10 Hz, and especially in such a manner that said eigenfrequency, $f_{18\text{-}I}$, of the oscillatory mode of first type is more than 10 Hz greater than said eigenfrequency, $f_{18\text{-}II}$, of the oscillatory mode second type, or that said eigenfrequency, $f_{18\text{-}I}$, of the oscillatory mode of first type is more than 10 Hz less than said eigenfrequency, $f_{18\text{-}II}$, of the oscillatory mode of second type.

12. The measuring transducer as claimed in claim 7, wherein:
   the exciter mechanism is embodied in such a manner that the first measuring tube and the second measuring tube are excitable to execute bending oscillations which are opposite-equal, especially symmetric, relative to the second imaginary longitudinal section plane, and the third measuring tube and the fourth measuring tube are excitable to execute bending oscillations which are opposite-equal, especially symmetric, relative to the second imaginary longitudinal section plane; and/or
   the exciter mechanism is embodied in such a manner that therewith, the fifth measuring tube and the sixth measuring tube are excitable to execute bending oscillations which are opposite-equal, especially symmetric, relative to the first imaginary longitudinal section plane, and the seventh measuring tube and the eighth measuring tube are excitable to execute bending oscillations which are opposite-equal, especially symmetric, relative to the first imaginary longitudinal section plane; and/or
   the second imaginary longitudinal section plane is in each case parallel to the fifth, sixth, seventh and eight measuring tubes; and/or
   the second imaginary longitudinal section plane is perpendicular to the imaginary first longitudinal section plane.

13. The measuring transducer as claimed in claim 1, further comprising:
   a first coupling element of first type, especially a plate shaped first coupling element of the first type, which, for setting the eigenfrequencies of natural oscillation modes of the tube arrangement not least of all usable for generating Coriolis forces in the medium flowing through the measuring tubes and/or for measuring a mass flow rate of the medium flowing through the measuring tubes, and/or for forming inlet-side or outlet-side oscillation nodes for vibrations, especially bending oscillations, of the first measuring tube, and for vibrations, especially bending oscillations, of the second measuring tube opposite-equal thereto, is affixed, spaced apart from the first flow divider on the inlet side, on (especially only on) the first measuring tube and on the second measuring tube, especially otherwise on no others of the eight measuring tubes;
   a second coupling element of a first type, especially a plate shaped second coupling element of the first type and/or one constructed equally to the first coupling element of the first type, which, for setting the eigenfrequencies of natural oscillation modes of the tube arrangement not least of all usable for generating Coriolis forces in the medium flowing through the measuring tubes and/or for measuring a mass flow rate of the medium flowing through the measuring tubes, and/or for forming inlet-side or outlet-side oscillation nodes for vibrations, especially bending oscillations, of the first measuring tube, and for vibrations, especially bending oscillations, of the second measuring tube opposite-equal thereto, is affixed, spaced apart from the second flow divider on the outlet side, on (especially only on) the first measuring tube and on the second measuring tube, especially otherwise on no others of the eight measuring tubes;
   a third coupling element of a first type, especially a plate shaped third coupling element of the first type and/or one constructed equally to the first coupling element of the first type and/or parallel to the second coupling element of the first type, which, for setting the eigenfrequencies of natural oscillation modes of the tube arrangement not least of all usable for generating Coriolis forces in the medium flowing through the measuring tubes and/or for measuring a mass flow rate of the medium flowing through the measuring tubes, and/or for forming inlet-side or outlet-side oscillation nodes for vibrations, especially bending oscillations, of the third measuring tube, and for vibrations, especially bending oscillations of the fourth measuring tube opposite-equal thereto, is affixed, spaced apart from the first flow divider, on the inlet side, on (especially only on) the third measuring tube and on the fourth measuring tube, especially otherwise on no others of the eight measuring tubes;
   a fourth coupling element of a first type, especially a plate shaped fourth coupling element of the first type and/or one constructed equally to the first coupling element of the first type and/or parallel to the first coupling element of the first type, which, for setting the eigenfrequencies of natural oscillation modes of the tube arrangement not least of all usable for generating Coriolis forces in the medium flowing through the measuring tubes and/or for measuring a mass flow rate of the medium flowing through the measuring tubes, and/or for forming inlet-side or outlet-side oscillation nodes for vibrations, especially bending oscillations, of the third measuring tube, and for vibrations, especially bending oscillations, of the fourth measuring tube opposite-equal thereto, is affixed, spaced apart from the second flow divider, on the outlet side on (especially only on) the third measuring tube and on the fourth measuring tube, especially otherwise on no others of the eight measuring tube;
   a fifth coupling element of a first type, especially a plate shaped fifth coupling element of the first type and/or one constructed equally to the first coupling element of the first type, which, for setting the eigenfrequencies of natural oscillation modes of the tube arrangement not least of all usable for generating Coriolis forces in the medium flowing through the measuring tubes and/or for measuring a mass flow rate of the medium flowing through the measuring tubes, and/or for forming inlet-side or outlet-side oscillation nodes for vibrations, especially bending oscillations, of the fifth measuring tube, and for vibrations, especially bending oscillations, of the sixth measuring tube opposite-equal thereto, is affixed, spaced apart from the second flow divider, on the outlet side on (especially only on) the fifth measuring tube and on the sixth measuring tube, especially otherwise on no others of the eight measuring tubes;

a sixth coupling element of a first type, especially a plate shaped sixth coupling element of the first type and/or one constructed equally to the fifth coupling element of the first type, which, for setting the eigenfrequencies of natural oscillation modes of the tube arrangement not least of all usable for generating Coriolis forces in the medium flowing through the measuring tubes and/or for measuring a mass flow rate of the medium flowing through the measuring tubes, and/or for forming inlet-side or outlet-side oscillation nodes for vibrations, especially bending oscillations, of the fifth measuring tube, and for vibrations, especially bending oscillations, of the sixth measuring tube opposite-equal thereto, is affixed, spaced apart from the second flow divider, on the outlet side on (especially only on) the fifth measuring tube and on the sixth measuring tube, especially otherwise on no others of the eight measuring tubes;

a seventh coupling element of a first type, especially a plate shaped seventh coupling element of the first type and/or one constructed equally to the fifth coupling element of the first type and/or parallel to the sixth coupling element of the first type, which, for forming inlet-side or outlet-side oscillation nodes for vibrations, especially bending oscillations, of the seventh measuring tube, and for vibrations, especially bending oscillations, of the eighth measuring tube opposite-equal thereto, is affixed, spaced apart from the first flow divider on the inlet side on (especially only on) the seventh measuring tube and on the eighth measuring tube, especially otherwise on no others of the eight measuring tubes; and an eighth coupling element of a first type, especially a plate shaped eighth coupling element of the first type and/or one constructed equally to the first coupling element of the first type and/or parallel to the fifth coupling element of the first type, which, for setting the eigenfrequencies of natural oscillation modes of the tube arrangement not least of all usable for generating Coriolis forces in the medium flowing through the measuring tubes and/or for measuring a mass flow rate of the medium flowing through the measuring tubes, and/or for forming inlet-side or outlet-side oscillation nodes for vibrations, especially bending oscillations, of the seventh measuring tube, and for vibrations, especially bending oscillations, of the eighth measuring tube opposite-equal thereto, is affixed, spaced apart from the first flow divider on the inlet side on (especially only on) the seventh measuring tube and on the eighth measuring tube, especially otherwise on no others of the eight measuring tubes.

14. The measuring transducer as claimed in claim 13, further comprising:

a first coupling element of a second type, especially a plate shaped or rod, or bar, shaped first coupling element of a second type, for setting the eigenfrequencies of natural oscillation modes of the tube arrangement not least of all usable for generating Coriolis forces in the medium flowing through the measuring tubes and/or for measuring a mass flow rate of the medium flowing through the measuring tubes, which is affixed, spaced apart from both the first flow divider and from the second flow divider, on (especially only on) the first measuring tube and on the fifth measuring tube, especially otherwise on no others of the eight measuring tubes;

a second coupling element of the second type, especially a plate shaped or rod, or bar, shaped second coupling element of the second type, for setting the eigenfrequencies of natural oscillation modes of the tube arrangement not least of all usable for generating Coriolis forces in the medium flowing through the measuring tubes and/or for measuring a mass flow rate of the medium flowing through the measuring tubes, which is affixed, spaced apart from both the first flow divider and from the second flow divider, on (especially only on) the second measuring tube and on the sixth measuring tube, especially otherwise on no others of the eight measuring tubes;

a third coupling element of the second type, especially a plate shaped or rod, or bar, shaped third coupling element of the second type, for setting the eigenfrequencies of natural oscillation modes of the tube arrangement not least of all usable for generating Coriolis forces in the medium flowing through the measuring tubes and/or for measuring a mass flow rate of the medium flowing through the measuring tubes, which is affixed, spaced apart from both the first flow divider and from the second flow divider, on (especially only on) on the third measuring tube and on the seventh measuring tube, especially otherwise on no others of the eight measuring tubes; and a fourth coupling element of the second type, especially a plate shaped or rod, or bar, shaped fourth coupling element of the second type, for setting the eigenfrequencies of natural oscillation modes of the tube arrangement not least of all usable for generating Coriolis forces in the medium flowing through the measuring tubes and/or for measuring a mass flow rate of the medium flowing through the measuring tubes, which is affixed, spaced apart from both the first flow divider and from the second flow divider, on (especially only on) on the fourth measuring tube and on the eighth measuring tube, especially otherwise on no others of the eight measuring tubes.

15. The measuring transducer as claimed in claim 14, wherein:

the first coupling element of a second type is affixed both on a pipe segment of the first measuring tube extending between the first coupling element of the first type and the second coupling element of the first type, and on a pipe segment of the fifth measuring tube extending between the fifth coupling element of the first type and the sixth coupling element of the first type, especially in a region of an oscillation node of oscillations of the first measuring tube, and in a region of an oscillation node of oscillations of the fifth measuring tube, the second coupling element of the second type is affixed both on a pipe segment of the second measuring tube extending between the first coupling element of the first type and the second coupling element of the first type, and on a pipe segment of the sixth measuring tube extending between the fifth coupling element of the first type and the sixth coupling element of the first type, especially in a region of an oscillation node of oscillations of the second measuring tube, and in a region of an oscillation node of oscillations of the sixth measuring tube, the third coupling element of the second type is affixed both on a pipe segment of the third measuring tube extending between the third coupling element of the first type and the fourth coupling element of the first type, and on a pipe segment of the seventh measuring tube extending between the seventh coupling element of the first type and the eighth coupling element of the first type, especially in a region of an oscillation node of oscillations of the third measuring tube, and in a region of an oscillation node of oscillations of the seventh measuring tube; and the fourth coupling element of the second type is affixed both on a pipe segment of the fourth measuring tube extending between the third coupling element of the first type and the fourth coupling element of the first type, and on a pipe segment of the eighth measuring tube extending between the seventh coupling element of the first type and the eighth coupling element of the first type, especially in a region of an oscillation node of oscillations of the fourth measuring tube, and in a region of an oscillation node of oscillations of the eighth measuring tube.

16. The measuring transducer as claimed in claim 14, wherein:

each of the eight coupling elements of the first type—especially equally large coupling elements of first type—in each case shows a maximum length, which is greater than twice a caliber, of the first measuring tube, and is especially less than three times the caliber, of the first measuring tube; and/or each of the four coupling elements—especially equally constructed coupling elements—of the second type are in each case at least sectionally curved, for the purpose of enabling elastic deformations of the respective coupling element of the second type as a result of opposite-equal relative movements of the respective two measuring tubes connected therewith and/or for the purpose of minimizing or preventing mechanical stresses caused by thermally related length changes of the respective coupling element and/or the two respective measuring tubes connected therewith; and/or each of the four—especially equally large—coupling elements of the second type in each case shows a length, in each case measured as the shortest distance between a first element end connected with one of the measuring tubes and a second element end connected with another of the measuring tubes, which is greater than a maximum length of the first coupling element of first type and/or the greater than three times the caliber, of the first measuring tube, especially also greater than four times the caliber, of the first measuring tube.

17. The measuring transducer as claimed in claim 13, wherein:

a wanted oscillatory length, corresponding to a length of a section of a bend line of the first measuring tube, and especially of each of the measuring tubes, extending between the first coupling element of the first type and the second coupling element of the first type, amounts to less than 3000 mm, especially less than 2500 mm and/or more than 800 mm.

18. The measuring transducer as claimed in claim 3, wherein:

the two flow dividers are embodied and arranged in the measuring transducer in such a manner that a first imaginary longitudinal section plane of the measuring transducer, within which its first imaginary connecting axis—which is especially parallel to a principal flow axis of the measuring transducer aligning with the pipeline—and its second imaginary connecting axis extend, is parallel to a second imaginary longitudinal section plane of the measuring transducer, within which its imaginary third connecting axis and its imaginary fourth connecting axis extend; especially in such a manner that the first imaginary longitudinal section plane of the tube arrangement lies between the first and second imaginary longitudinal section plane of the measuring transducer and/or is parallel to the first and second imaginary longitudinal section plane of the measuring transducer.

19. The measuring transducer as claimed in claim 18, wherein:

the two flow dividers are embodied and arranged in the measuring transducer in such a manner that a third imaginary longitudinal section plane of the measuring transducer, within which its imaginary first connecting axis and its imaginary third connecting axis extend, is parallel to a fourth imaginary longitudinal section plane of the measuring transducer, within which its imaginary second connecting axis and its imaginary fourth connecting axis extend; especially in such a manner that the second imaginary longitudinal section plane of the tube arrangement lies between the third imaginary longitudinal section plane of the measuring transducer and the fourth imaginary longitudinal section plane of the measuring transducer and/or is parallel to the third and fourth imaginary longitudinal section plane of the measuring transducer.

20. The measuring transducer as claimed in claim 19, wherein:

the two flow dividers are embodied and arranged in the measuring transducer in such a manner that a fifth imaginary longitudinal section plane of the measuring transducer, within which its fifth imaginary connecting axis—which is especially parallel to a principal flow axis of the measuring transducer aligning with the pipeline—and its sixth imaginary connecting axis extend, is parallel to a sixth imaginary longitudinal section plane of the measuring transducer, within which its seventh imaginary connecting axis and its imaginary eighth connecting axis extend; especially in such a manner that the first imaginary longitudinal section plane of the tube arrangement lies between the fifth and sixth imaginary longitudinal section plane of the measuring transducer and/or is parallel to the fifth and sixth imaginary longitudinal section plane of the measuring transducer.

21. The measuring transducer as claimed in claim 20, wherein:

the two flow dividers are embodied and arranged in the measuring transducer in such a manner that a seventh imaginary longitudinal section plane of the measuring transducer, within which its fifth imaginary connecting axis and its seventh imaginary connecting axis extend, is parallel to an eighth imaginary longitudinal section plane of the measuring transducer, within which its sixth imaginary connecting axis and its eighth imaginary connecting axis extend; especially in such a manner that the second imaginary longitudinal section plane of the tube arrangement lies between the seventh imaginary longitudinal section plane of the measuring transducer and the eighth imaginary longitudinal section plane of the measuring transducer and/or is parallel to the seventh and eighth imaginary longitudinal section plane of the measuring transducer; and/or the measuring tubes are embodied and arranged in such a manner:

that the third imaginary longitudinal section plane of the measuring transducer in each case imaginarily intersects both the first measuring tube and the third measuring tube lengthwise, that the fourth imaginary longitudinal section plane of the measuring transducer in each case imaginarily intersects both the second measuring tube and the fourth measuring tube lengthwise, that the fifth imaginary longitudinal section plane of the measuring transducer in each case imaginarily intersects both the fifth measuring tube and the sixth measuring tube lengthwise, and that the sixth imaginary longitudinal section plane of the measuring transducer in each case imaginarily intersects both the seventh measuring tube and the eighth measuring tube lengthwise.

22. The measuring system as claimed in claim 1, wherein:
each of the first, second, third, and fourth measuring tubes shows a measuring tube peak, defined as the greatest perpendicular distance of the respective measuring tube from the first imaginary longitudinal section plane, and each of the fifth, sixth, seventh, and eighth measuring tubes shows a measuring tube peak, defined as the greatest perpendicular distance of the respective measuring tube from the second imaginary longitudinal section plane.

23. The measuring system as claimed in claim 1, wherein:
the tube arrangement shows an imaginary cross sectional plane, in each case perpendicular both to the first imaginary longitudinal section plane and to the second imaginary longitudinal section plane.

24. The measuring transducer as claimed in claim 23, wherein:
a center of mass of the tube arrangement lies in the imaginary cross sectional plane; and/or the tube arrangement is mirror symmetrical relative to the imaginary cross sectional plane; and/or the first measuring tube, the second measuring tube, the third measuring tube and the fourth measuring tube in each case show a measuring tube peak, defined as greatest perpendicular distance of the respective measuring tube from the first imaginary longitudinal section plane, and the fifth measuring tube, the sixth measuring tube, the seventh measuring tube and the eighth measuring tube in each case show a measuring tube peak, defined as greatest perpendicular distance of the respective measuring tube from the second imaginary longitudinal section plane, and wherein the imaginary cross sectional plane intersects each of the eight measuring tubes in its respective measuring tube peak.

25. The measuring transducer as claimed in claim 1, wherein:
the first measuring tube shows a caliber, which is equal to a caliber of the second measuring tube, and especially also equal to a caliber of the third measuring tube and equal to a caliber of the fourth measuring tube; and/or wherein the eight measuring tubes are of equal construction as regards a material, of which their tube walls are composed, and/or as regards their geometric tube dimensions, especially a measuring tube length, a tube wall thickness, of a tube outer diameter and/or a caliber; and/or a material, of which the tube walls of the eight measuring tubes are at least partially composed, is titanium and/or zirconium and/or stainless steel and/or duplex steel and/or super duplex steel; and/or the transducer housing, the flow dividers and tube walls of the eight measuring tubes are in each case composed of steel, especially stainless and/or high strength steel.

26. The measuring transducer as claimed in claim 1, wherein:
each of the at least eight measuring tubes—especially equally large measuring tubes—shows a caliber, which amounts to more than 10 mm, especially more than 30 mm; and/or the measuring tubes are bent in such a manner and are arranged in such a manner that a caliber to height ratio, of the tube arrangement, defined by a ratio of a caliber, of the first measuring tube to a maximal lateral expansion, of the tube arrangement, measured from a measuring tube peak of the first measuring tube to a measuring tube peak of the third measuring tube, amounts to more than 0.05, especially more than 0.07 and/or less than 0.5, especially less than 0.4; and/or a caliber-to-nominal diameter ratio, of the measuring transducer, defined by a ratio of a caliber, of the first measuring tube to a nominal diameter, of the measuring transducer corresponding to a caliber of the pipeline, in whose course the measuring transducer is to be used, is less than 0.4, especially less than 0.35 and/or greater than 0.21; and/or a nominal diameter of the measuring transducer corresponding to a caliber of the pipeline, in whose course the measuring transducer is to be used, amounts to more than 50 mm, and especially is greater than 100 mm; and/or for reducing a flow resistance of the first flow divider, the first flow divider includes a flow body, especially a conical or paraboloid shaped flow body, placed between its flow openings, and for reducing a flow resistance of the second flow divider, the second flow divider includes a flow body, especially a conical or paraboloid shaped flow body, placed between its flow openings; and/or a measuring tube length, of the first measuring tube corresponding to a length of a section of a bend line of the first measuring tube extending between the first flow opening of the first flow divider and the first flow opening of the second flow divider amounts to more than 1000 mm, especially more than 1200 mm and/or less than 3000 mm, especially less than 2500 mm.

27. The measuring transducer as claimed in claim 1, wherein:
the first flow divider includes a flange for connecting the measuring transducer to a pipe segment of the pipeline serving for supplying medium to the measuring transducer, and the second flow divider includes a flange for the connecting the measuring transducer to a pipe segment of the pipeline serving for removing medium from the measuring transducer.

28. The measuring transducer as claimed in claim 27, wherein:
each of the flanges in each case includes a sealing surface for fluid-tight connecting of the measuring transducer with the respective corresponding pipe segment of the pipeline; and a distance between the sealing surfaces of both flanges defines an installed length, of the measuring transducer, which especially amounts to more than 1200 mm and/or less than 3000 mm, especially less than 2500 mm.

29. The measuring transducer as claimed in claim 1, further comprising:
a sensor arrangement reacting to vibrations, especially bending oscillations excited by means of the exciter mechanism, of the measuring tubes, especially an electro-dynamic sensor arrangement and/or one formed by means of oscillation sensors constructed equally to one another, this sensor arrangement serving for producing oscillation signals representing vibrations, especially bending oscillations, of the measuring tubes.

30. The measuring transducer as claimed in claim 29, wherein:
the sensor arrangement comprises:
an inlet-side, first oscillation sensor, especially an electro-dynamic inlet-side, first oscillation sensor and/or one differentially registering oscillations of the first measuring tube relative to the second measuring tube,
an outlet-side, second oscillation sensor, especially an electrodynamic outlet-side, second oscillation sensor and/or one differentially registering oscillations of the first measuring tube relative to the second measuring tube,
an inlet-side third oscillation sensor, especially an electrodynamic inlet-side third oscillation sensor and/or one differentially registering oscillations of the third measuring tube relative to the fourth measuring tube and/or electrically connected in series with the first oscillation sensor,
an outlet-side fourth oscillation sensor, especially an electrodynamic outlet-side fourth oscillation sensor and/or one differentially registering oscillations of the third measuring tube relative to the fourth measuring tube and/or electrically connected in series with the second oscillation sensor, an inlet-side fifth oscillation sensor, especially an electrodynamic inlet-side fifth oscillation sensor and/or one differentially registering oscillations of the fifth measuring tube relative to the sixth measuring tube and/or electrically connected in series with the first oscillation sensor,
an outlet-side sixth oscillation sensor, especially an electrodynamic outlet-side sixth oscillation sensor and/or one differentially registering oscillations of the fifth measuring tube relative to the sixth measuring tube and/or electrically connected in series with the second oscillation sensor,
an inlet-side seventh oscillation sensor, especially an electrodynamic inlet-side seventh oscillation sensor and/or one differentially registering oscillations of the seventh measuring tube relative to the eighth measuring tube and/or electrically connected in series with the first oscillation sensor, and an outlet-side eighth oscillation sensor, especially an electrodynamic outlet-side eighth oscillation sensor and/or one differentially registering oscillations of the seventh measuring tube relative to the eighth measuring tube and/or electrically connected in series with the second oscillation sensor.

31. The measuring transducer as claimed in claim 1, wherein:
the exciter mechanism comprises:
a first oscillation exciter acting, especially differentially, on the first and second measuring tube;
a second oscillation exciter acting, especially differentially, on the third and fourth measuring tube;
a third oscillation exciter acting, especially differentially, on the fifth and seventh measuring tube; and
a fourth oscillation exciter acting, especially differentially, on the sixth and eighth measuring tube.

32. The measuring system for measuring density and/or a mass flow rate, especially also a total mass flow totalled over a time interval, of a medium, at least at times, flowing in a pipeline, especially with a mass flow rate of more than 1000 t/h, especially a gas, a liquid, of a powder or other flowable material, wherein this measuring system, which is especially embodied as an in-line measuring device and/or a measuring device in compact construction, comprises a measuring transducer comprising:
a measuring transducer of vibration type for registering at least one physical measured variable of a flowable medium conveyed in a pipeline and/or for producing Coriolis forces serving for registering a mass flow rate of a flowable medium conveyed in a pipeline, said measuring transducer comprising:
a transducer housing, of which an inlet-side, first housing end is formed by means of an inlet-side, first flow divider including eight, mutually spaced apart flow openings and an outlet-side, second housing end is formed by means of an outlet-side, second flow divider including eight mutually spaced apart flow openings;
a tube arrangement including, for conveying flowing medium,
a bent first measuring tube opens with an inlet-side, first measuring tube end into a first flow opening of the first flow divider, and opens with an outlet-side, second measuring tube end into a first flow opening of the second flow divider,
a bent second measuring tube, which is especially at least sectionally parallel to the first measuring tube, opens with an inlet-side, first measuring tube end into a second flow opening of the first flow divider and with an inlet-side, first measuring tube end into a second flow opening into of the second flow divider,
a bent third measuring tube opens with an inlet-side, first measuring tube end into a third flow opening of the first flow divider and with an outlet-side, second measuring tube end into a third flow opening of the second flow divider,
a bent fourth measuring tube, which is especially at least sectionally parallel to the third measuring tube, opens with an inlet-side, first measuring tube end into a fourth flow opening of the first flow divider, and with an outlet-side, second measuring tube end in to a fourth flow opening of the second flow divider,
a bent fifth measuring tube, which is especially at least sectionally parallel to the fifth measuring tube, opens with an inlet-side, first measuring tube end into a sixth flow opening of the first flow divider of the first flow divider and with an outlet-side, second measuring tube end into a fifth flow opening of the second flow divider,
a bent sixth measuring tube, which is especially at least sectionally parallel to the fifth measuring tube, opens with an inlet-side, first measuring tube end into a sixth flow opening of the first flow divider, and with an outlet-side, second measuring tube end into a sixth flow opening of the second flow divider,
a bent seventh measuring tube opens with an inlet-side, first measuring tube end into a seventh flow opening of the first flow divider, and with an outlet-side, second measuring tube end into a seventh flow opening of the second flow divider, and
a bent eighth measuring tube, which is especially at least sectionally parallel to the seventh measuring tube, opens with an inlet-side, first measuring tube end into an eighth flow opening of the first flow divider, and with an outlet-side, second measuring tube end into an eighth flow opening of the second flow divider; and
an electro-mechanical exciter mechanism for producing and/or maintaining bending oscillations of each of said first, second, third, fourth, fifth, sixth, seventh, and eighth measuring tubes, especially oscillations corresponding to a natural oscillatory mode the tube arrangement; and a transmitter electronics, said transmitter electronics being electrically coupled with the measuring transducer, and said transmitter electronics serving for activating the measuring transducer, especially its exciter mechanism, and for evaluation of oscillation signals delivered by the measuring transducer.

33. The measuring system as claimed in claim 32, wherein:
during operation, the eight measuring tubes, excited by the exciter mechanism, simultaneously execute bending oscillations, especially bending oscillations in a natural oscillatory mode inherent to the tube arrangement; and/or the transmitter electronics arranged in an electronics housing mechanically connected with the transducer housing.

34. The measuring system as claimed in claim 32, wherein:
the transmitter electronics is adapted to feed electrical excitation power, especially with a variable maximal voltage level and/or a variable maximal electrical current level, into the exciter mechanism by means of at least one electrical driver signal, which is supplied to the exciter mechanism and which is variable with at least one signal frequency corresponding to a resonance frequency of a natural mode of oscillation of the tube arrangement and/or is, at least at times, periodic; and the exciter mechanism is adapted to convert the electrical excitation power—which is especially dependent on a voltage level and an electrical current level of the at least one driver signal—at least partially both into execute bending oscillations of the first measuring tube and bending oscillations of the second measuring tube opposite-equal to the bending oscillations of the first measuring tube relative to the second imaginary longitudinal section plane of the tube arrangement, and into execute bending oscillations of the third measuring tube and bending oscillations of the fourth measuring tube opposite-equal to the bending oscillations of the third measuring tube relative to the second imaginary longitudinal section plane of the tube arrangement.

35. The measuring system as claimed in claim 34, wherein:
the exciter mechanism is adapted to convert the electrical excitation power at least partially also into both in bending oscillations of the fifth measuring tube and bending oscillations of the sixth measuring tube opposite-equal to the bending oscillations of the fifth measuring tube relative to the first imaginary longitudinal section plane of the tube arrangement, and into execute bending oscillations of the seventh measuring tube and bending oscillations of the eighth measuring tube opposite-equal to the bending oscillations of the seventh measuring tube relative to the first imaginary longitudinal section plane of the tube arrangement; and/or the at least one driver signal is fed to the first oscillation exciter, especially in such a manner that its cylindrical coil is flowed through by a first exciter current driven by a variable first exciter voltage provided by means of the first driver signal; and/or the at least one driver signal includes a plurality of signal components with signal frequencies differing from one another, and wherein at least one of the signal components—especially a signal component dominating as regards a signal power—of the first driver signal shows a signal frequency corresponding to a resonance frequency of a natural mode of oscillation the tube arrangement, in which each of the eight measuring tubes executes bending oscillations.

36. The measuring system as claimed in claim 32, wherein:
the exciter mechanism is adapted to effect oscillations of the measuring tubes in that an exciter force generated by means of the first oscillation exciter and acting on the first measuring tube is opposite, especially opposite-equal, to an exciter force generated at the same time by means of the first oscillation exciter and acting on the second measuring tube; and/or the transmitter electronics is adapted to generate, based on electrical excitation power converted in the exciter mechanism, a viscosity measured value representing viscosity of the flowing medium; and/or the transmitter electronics is adapted to generate, based on oscillation signals delivered by the measuring transducer, a mass flow measured value representing a mass flow rate of the flowing medium and/or a density measured value representing density of the flowing medium.

37. The use of a measuring transducer according to claim 1, for measuring density and/or a mass flow rate, especially also a total mass flow totalled over a time interval, and/or a viscosity and/or a Reynolds number of a medium flowing in a process line—especially a pipeline—, at least at times, with a mass flow rate of more than 1000 t/h, especially more than 1500 t/h, especially a gas, a liquid, a powder or other flowable material.

38. The use of a measuring transducer according to claim 32, for measuring density and/or a mass flow rate, especially also a total mass flow totalled over a time interval, and/or a viscosity and/or a Reynolds number of a medium flowing in a process line—especially a pipeline—, at least at times, with a mass flow rate of more than 1000 t/h, especially more than 1500 t/h, especially a gas, a liquid, a powder or other flowable material.

* * * * *